United States Patent
Kawasaki et al.

[11] Patent Number: 6,082,783
[45] Date of Patent: Jul. 4, 2000

[54] HOSE CONNECTING STRUCTURE

[75] Inventors: Minoru Kawasaki; Atsuo Miyajima; Hiroyuki Ichikawa, all of Komaki, Japan

[73] Assignee: Tokai Rubber Industries, Ltd., Komaki, Japan

[21] Appl. No.: 08/917,940

[22] Filed: Aug. 27, 1997

Related U.S. Application Data

[62] Division of application No. 08/746,252, Nov. 7, 1996, abandoned, which is a continuation of application No. 08/570,825, Dec. 12, 1995, abandoned, which is a continuation of application No. 08/068,710, May 28, 1993, abandoned.

[30] Foreign Application Priority Data

| May 30, 1992 | [JP] | Japan | 4-164101 |
| May 30, 1992 | [JP] | Japan | 4-164102 |
| May 30, 1992 | [JP] | Japan | 4-164103 |
| May 29, 1992 | [JP] | Japan | 4-164218 |

[51] Int. Cl.[7] .................................................. F16L 39/00
[52] U.S. Cl. ........................................ 285/321; 285/276
[58] Field of Search .............................. 285/319, 305, 285/321, 308, 380, 276

[56] References Cited

U.S. PATENT DOCUMENTS

| 2,440,542 | 4/1948 | Smith | 285/321 X |
| 2,788,992 | 4/1957 | Vienne et al. | |
| 2,886,355 | 5/1959 | Wurzel | 285/321 X |
| 2,898,130 | 8/1959 | Hansen | 285/321 X |
| 3,112,939 | 12/1963 | Graham | 285/374 X |
| 3,394,954 | 7/1968 | Sarns | |
| 3,428,340 | 2/1969 | Pelton | 285/308 X |
| 3,539,205 | 11/1970 | Johnson, Jr. | 285/374 X |
| 3,574,362 | 4/1971 | Divernon | 285/321 |
| 3,606,402 | 9/1971 | Medney | 285/305 |
| 3,746,376 | 7/1973 | Gold | |

(List continued on next page.)

FOREIGN PATENT DOCUMENTS

| 683367 | 3/1964 | Canada | 285/321 |
| 0 002 197 | 6/1979 | European Pat. Off. | |
| 0 223 495 | 5/1987 | European Pat. Off. | |
| 287446 | 10/1988 | European Pat. Off. | 285/321 |
| 0 385 465 | 9/1990 | European Pat. Off. | |
| 0 435 360 | 7/1991 | European Pat. Off. | |
| 0 459 812 | 12/1991 | European Pat. Off. | |
| 0 469 949 | 2/1992 | European Pat. Off. | |
| 36 15 904 | 2/1987 | Germany | |
| 38 15 168 | 9/1989 | Germany | |
| 5-60281 | 3/1993 | Japan | 285/321 |
| 1036459 | 7/1966 | United Kingdom | |
| 2 153 028 | 8/1985 | United Kingdom | |
| 2 217 419 | 10/1989 | United Kingdom | |
| 2 244 774 | 12/1991 | United Kingdom | |

*Primary Examiner*—H. Shackelford
*Attorney, Agent, or Firm*—Jacobson, Price, Holman & Stern, PLLC

[57] ABSTRACT

A hose connecting structure includes a hose whose central and engaging portion having a thermal flexibility resin which is molded by a blow molding method and a mating member which is inserted into the edge opening of the hose. The hose connecting structure further includes a ring-shaped sealing material and a first engaging portion which is disposed in the axial direction by a predetermined distance to the sealing material at either the edge portion of the hose or the mating member and second engaging portion which is directly or indirectly engaged with the first engaging portion at either the edge portion of the hose or the mating member. The central and the engaging portion of the hose connecting structure includes a thermal flexibility resin which is molded by a blow molding method. Therefore, the most suitable soft and hard resin for the appropriate portion can be used. When the engaging portion with the mating member and the central portion are molded integrally, the working efficiency is improved. The sealing material such as an O-ring is used for the engaging surface. Therefore soft resin is not used for the engaging surface, and a free selection of resin is achieved. Moreover, the polishing of the engaging surface is not required.

13 Claims, 38 Drawing Sheets

U.S. PATENT DOCUMENTS

| | | | |
|---|---|---|---|
| 3,759,553 | 9/1973 | Carter | 285/305 X |
| 3,838,713 | 10/1974 | Tubbs . | |
| 3,873,137 | 3/1975 | Yamaguchi | 285/235 |
| 4,123,091 | 10/1978 | Cosentino et al. . | |
| 4,270,776 | 6/1981 | Tolliver | 285/226 |
| 4,486,034 | 12/1984 | Sauer | 285/319 X |
| 4,487,437 | 12/1984 | Dickirson | 285/319 |
| 4,603,890 | 8/1986 | Huppee | 285/239 |
| 4,632,435 | 12/1986 | Polyak | 285/319 X |
| 4,679,827 | 7/1987 | Law | 285/423 X |
| 4,682,798 | 7/1987 | Saur . | |
| 4,753,459 | 6/1988 | Potier | 285/174 |
| 4,850,622 | 7/1989 | Suzuki | 285/351 X |
| 4,972,875 | 11/1990 | Beer et al. | 285/903 |
| 5,029,904 | 7/1991 | Hunt | 285/319 X |
| 5,039,139 | 8/1991 | McElroy et al. . | |
| 5,060,983 | 10/1991 | Lee | 285/903 |
| 5,228,729 | 7/1993 | McElroy et al. . | |
| 5,255,945 | 10/1993 | Toon | 285/305 |
| 5,267,757 | 12/1993 | Dal Palu . | |

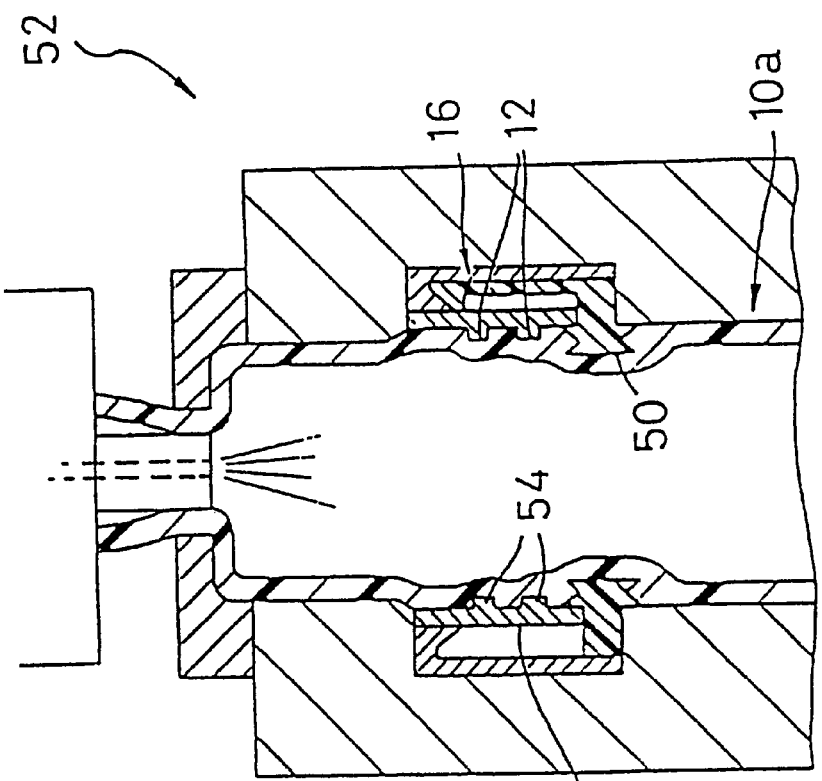
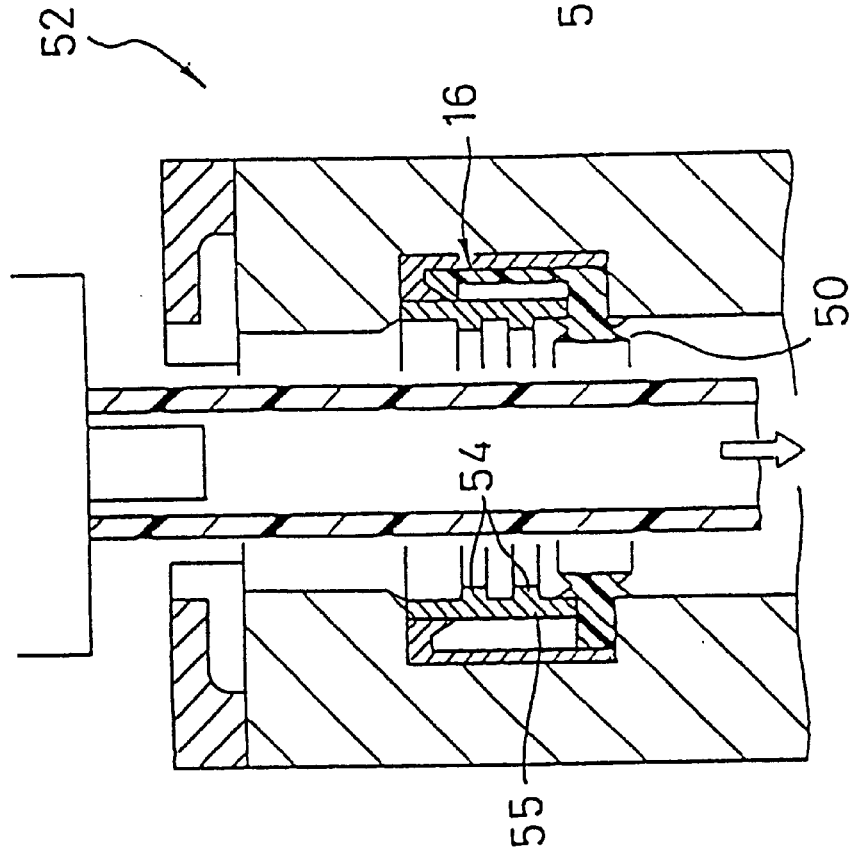

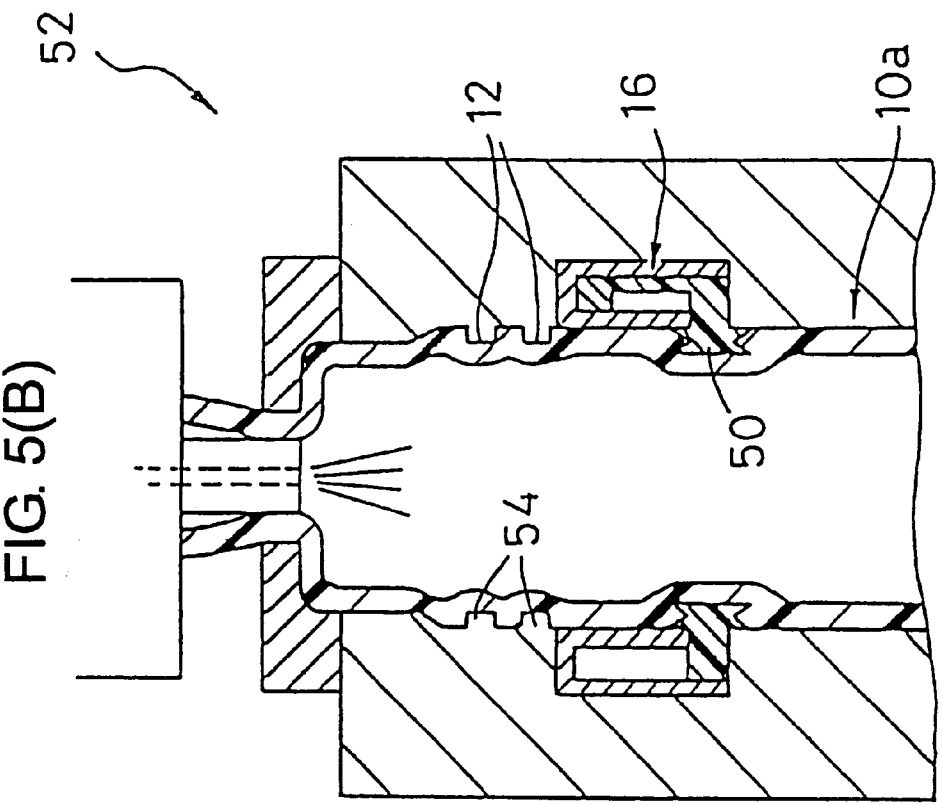
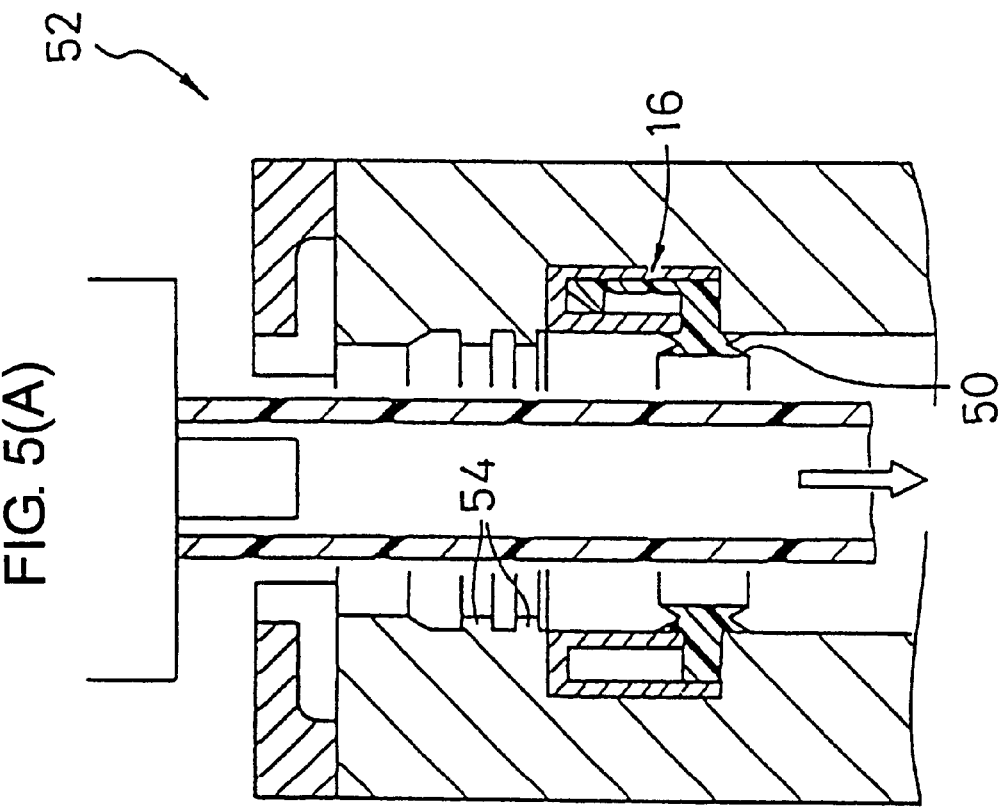

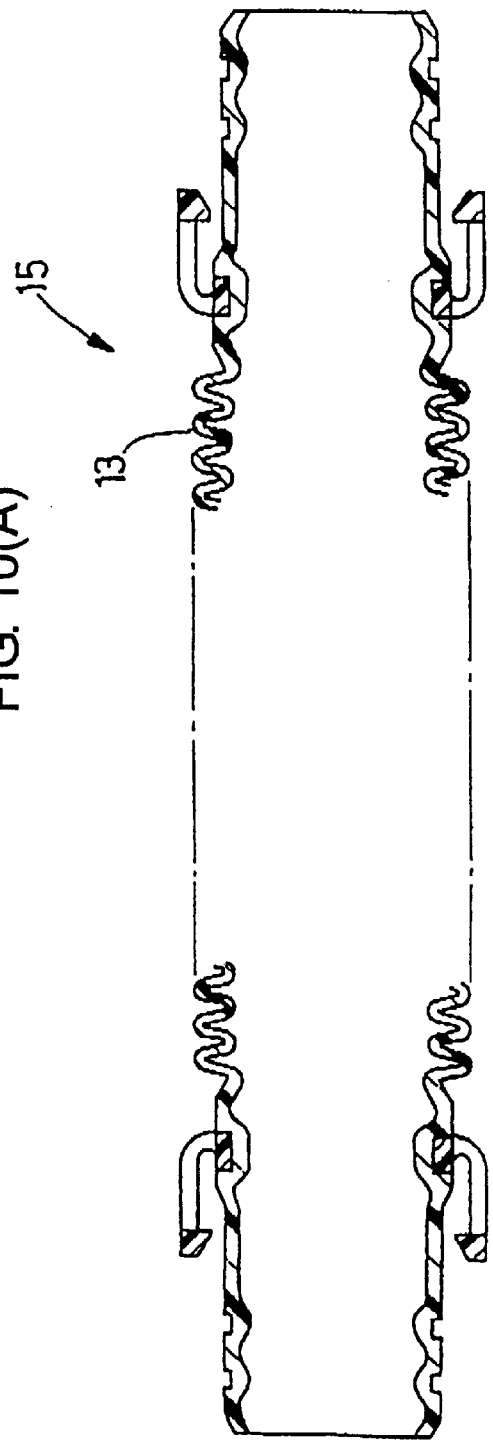
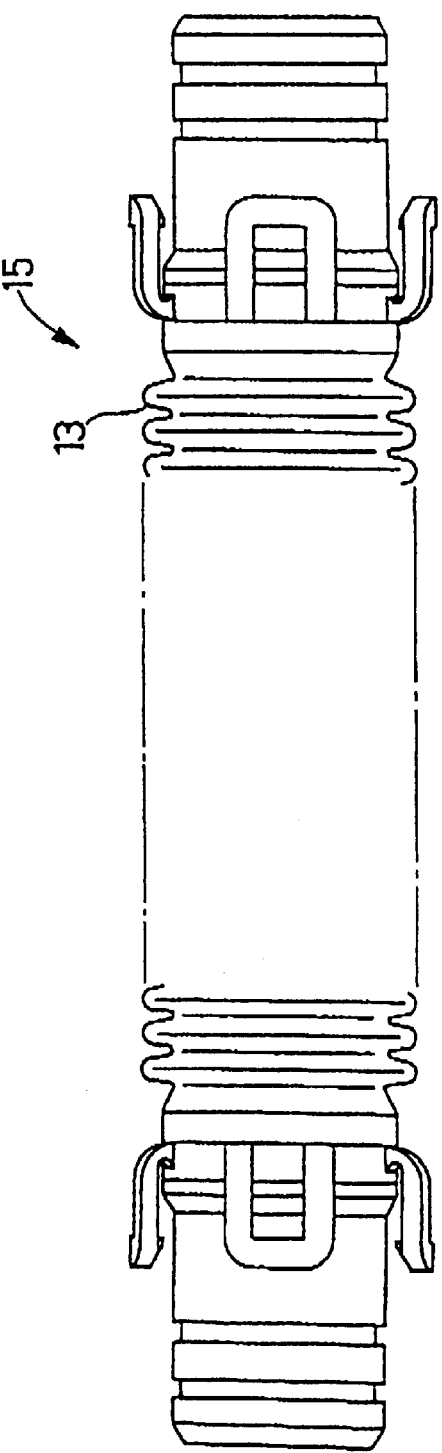
FIG. 10(A)
FIG. 10(B)

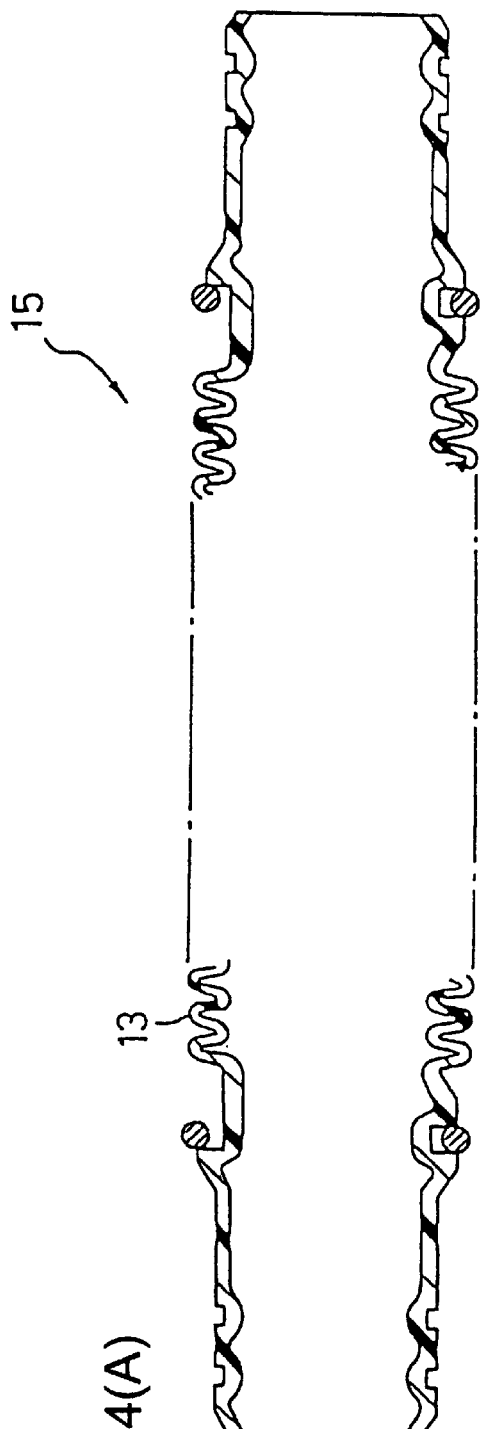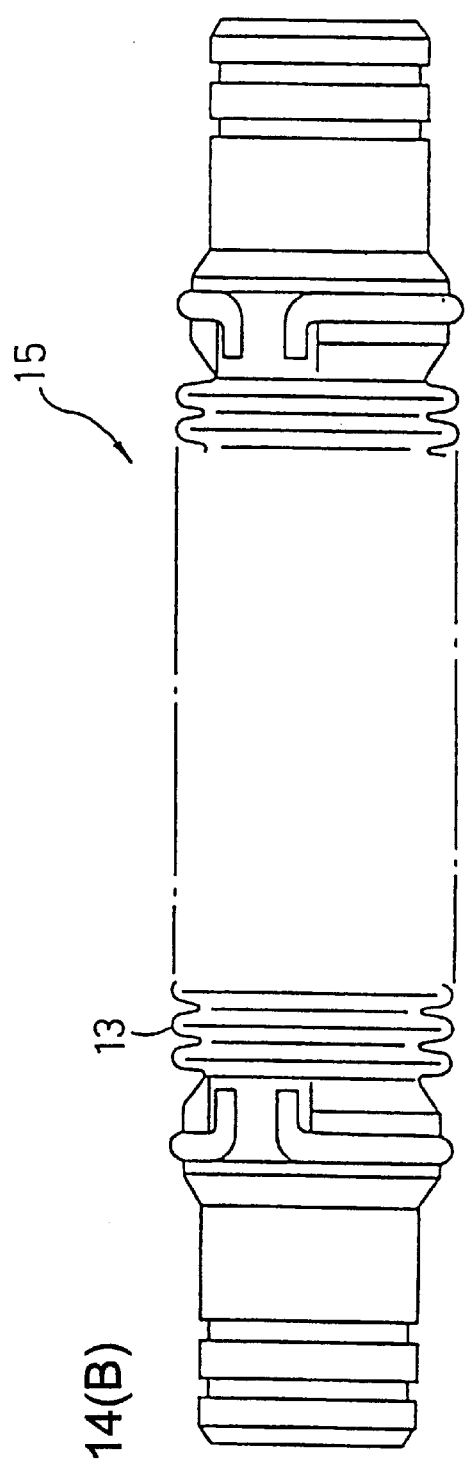
FIG. 14(A)
FIG. 14(B)

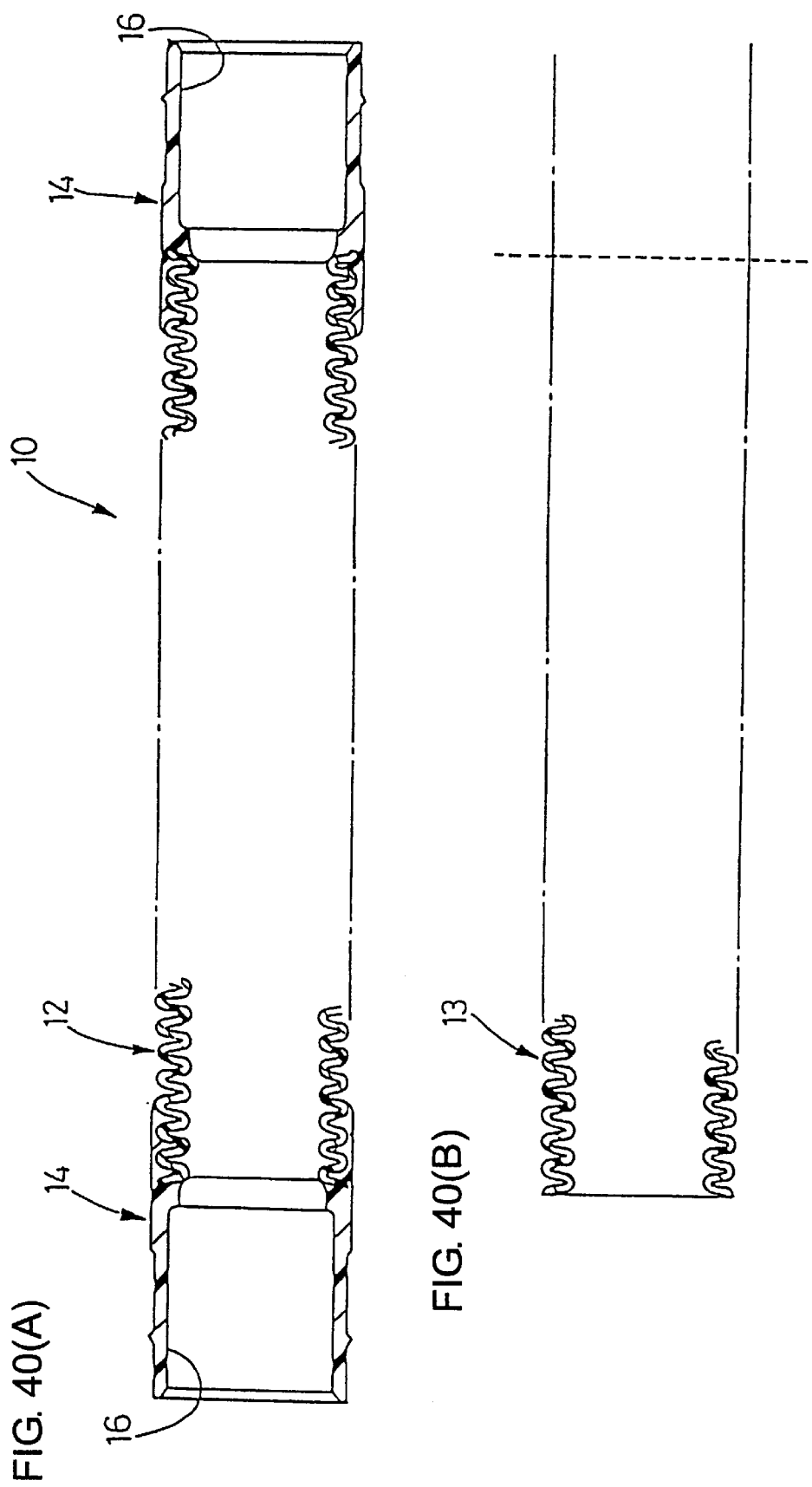

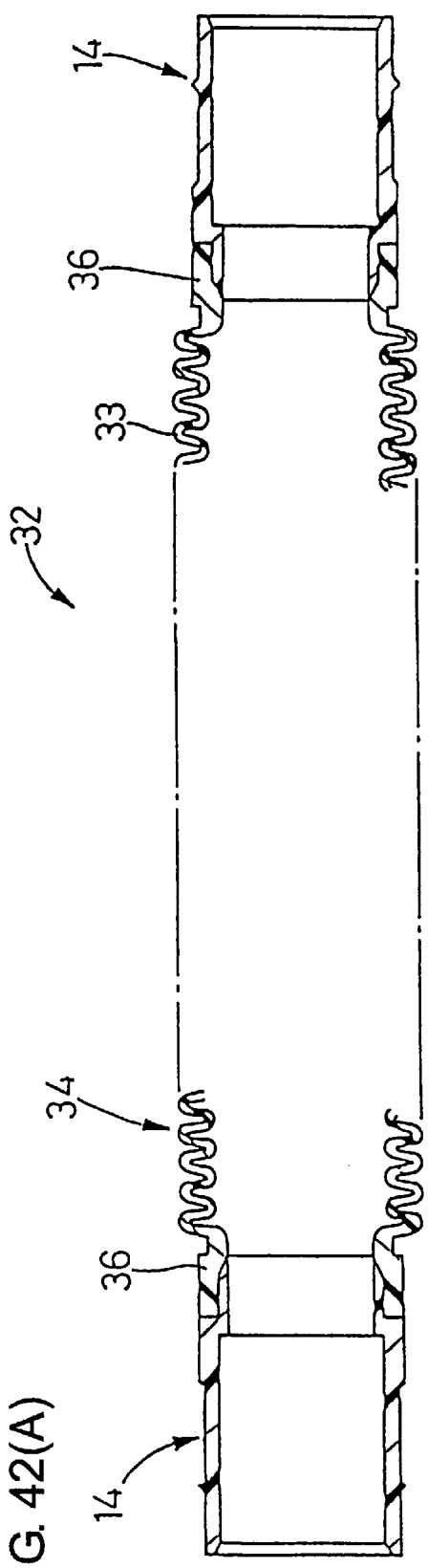
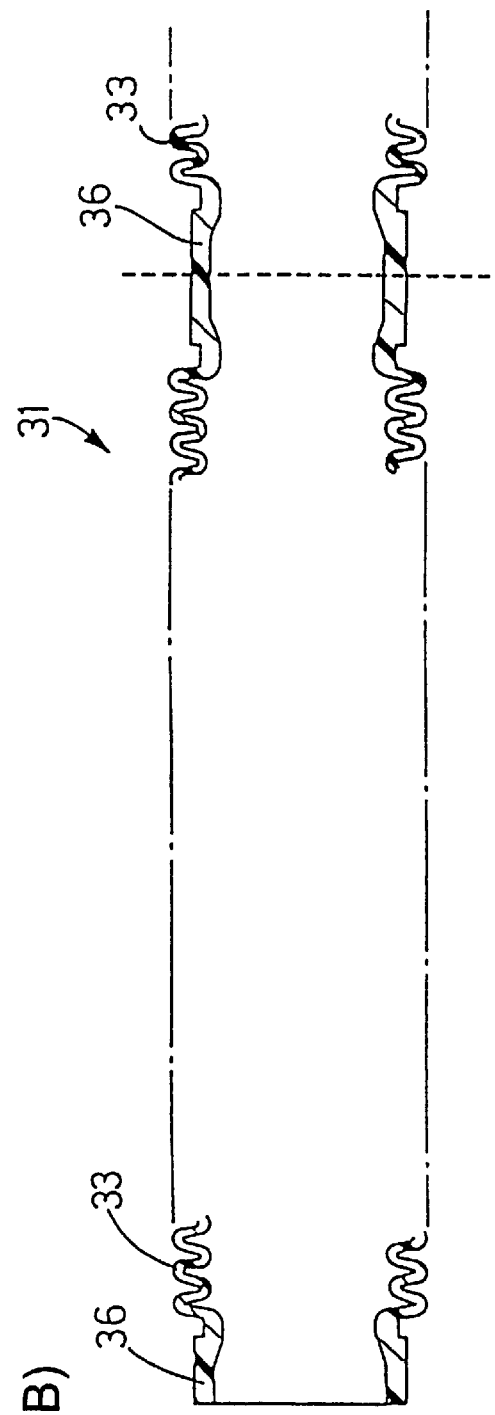
FIG. 42(A)
FIG. 42(B)

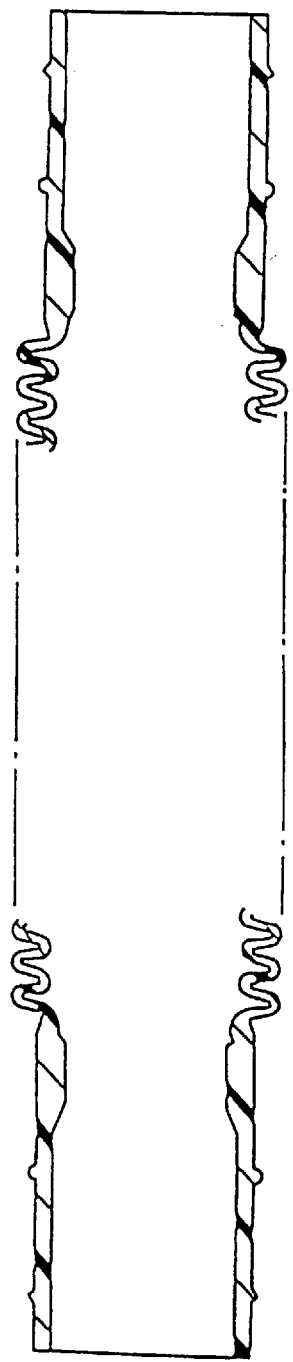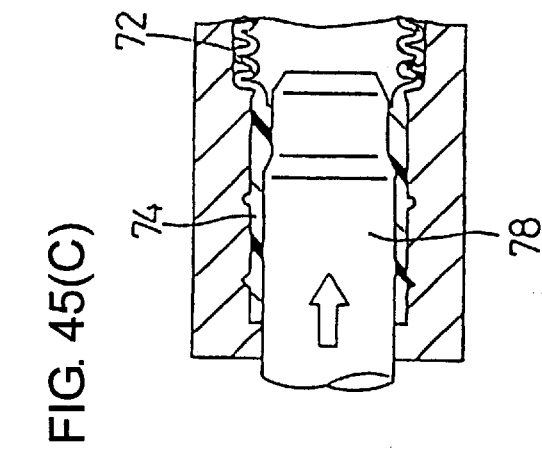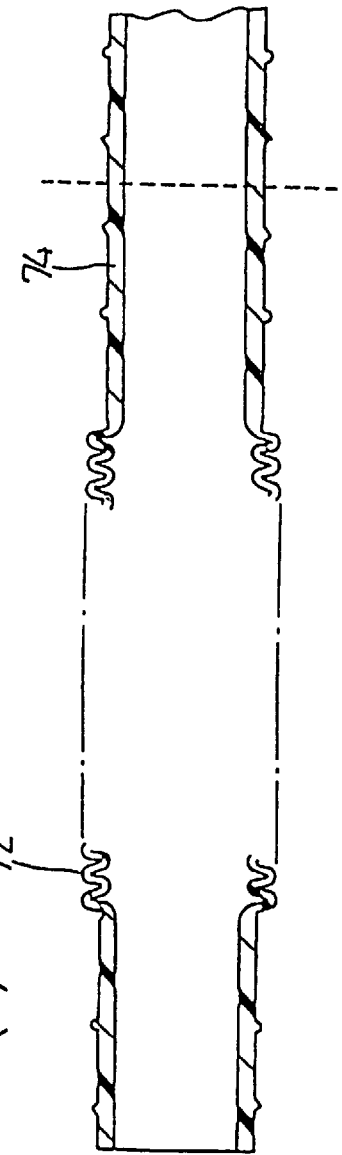
FIG. 45(A)
FIG. 45(B)
FIG. 45(C)

HOSE CONNECTING STRUCTURE

This is a DIVISIONAL of application Ser. No. 08/746,252, filed Nov. 7, 1996, abandoned, which in turn is a continuation of application Ser. No. 08/570,825, filed Dec. 12, 1995, abandoned, which in turn is a continuation of application Ser. No. 08/068,710, filed May 28, 1993 abandoned.

BACKGROUND OF THE INVENTION

1. Field of the Invention

The present invention relates to a hose connecting structure which is suitable for use as a connecting structure and also relates to a method for forming a hose which is suitable for use as a connection when an air duct hose or a filler hose is connected with a mating member.

2. Description of the Related Art

In an air hose or a filler hose for an automobile, it has recently been practiced that a resin hose has been used instead of a rubber hose. When the resin hose is used as the air hose for the automobile, a negative pressure is applied on the air hose. It is better that the resin hose be made of a hard resin material in order to obtain resistance to the negative air pressure.

Conventionally, the air hose is incorporated into the automobile in the following manner. A mating pipe is inserted into a hose edge opening to connect the hose edge portion and the mating pipe. At that time, a clamp member clamps the hose edge portion and the mating pipe from an outer surface of the hose. This clamping prevents the hose edge portion from becoming lose. The hose edge portion is elastically adhered to the mating pipe so that the sealing is ensured.

Therefore, in this conventional connecting structure, the hose is required that has a hose edge portion that is closely adhered to the mating pipe. Although, when the hose is made of a hard resin material, the hose edge portion cannot be fully adhered to the mating pipe. Thus, in an air hose made of resin, it is desirable that the body portion of the hose is made of a hard resin material, and the edge portion of the hose is made of a soft resin material.

This is true for a filler hose or other hoses. For example, in the filler hose, it is considered that the body portion of the hose is made of a hard resin material in order to obtain oil resistance. It is further considered that the edge portion of the hose is made of a soft resin material.

Since the above resin hose requires a curved portion and a bellows portion, a blow molding method is preferably used to form the hose. In the blow molding method, a tubular or a bladder-like parison is expanded with air so that the parison closely contacts an inner surface of the mold. As a result, the parison is formed in the predetermined shape. Thus, the outer surface of the molded hose is accurately formed in the predetermined shape by the mold, but the inner surface of the molded hose is formed under a stress free condition. Therefore, the inner surface of the molded hose includes poor characteristics in its shape and dimensional accuracy.

In an air hose, a mating member such as a metal pipe is inserted into a hose edge opening, and a clamp member clamps the mating pipe and a hose edge portion. As a result, the hose edge portion is closely adhered to the mating member so that the sealing capacity is ensured. Therefore, when the hose includes poor characteristics in its shape of the inner surface of the hose edge opening and in its dimensional accuracy, i.e. the inner diameter and the thickness shows unevenness, the sealing capacity cannot be satisfactorily achieved.

In the resin hose formed by the blow molding method, the inner surface of the edge portion is polished so that the hose is formed in the predetermined shape and dimension.

When the polishing is performed, a hose forming step becomes complicated, and polishing powders remain at and around the polished portion. Therefore, a washing step is needed, and the hose forming step becomes even more complicated. As a result, the forming cost is increased.

The above problems are concerned with the resin hose which is formed by the blow molding method. When the hose edge portion is made of a soft resin material, the following problems arise.

There are few kinds of soft resin materials which ensure excellent sealing capacity. The selection of the soft resin materials is restricted by the need to satisfy other characteristics of the hose.

Oil resistance, for example, is required for the filler hose. Recently, regulation of oil penetration resistance has become strict, and the soft resin material cannot meet such demands.

The air hose loaded on a turbo engine car requires heat resistance. In this case, the soft resin material cannot meet such a demand.

The air hose or the filler hose for automobiles determine their shape with respect to its attachment space and the mating member.

When the above hoses are formed, the body portion of the hose is formed in the predetermined shape at the molding stage. Furthermore, each edge portion is preformed to connect to the mating member.

The length and the shape of the hose is different according to the type of the car, the shape and the kind of the mating member, or the attachment space. In this case, each hose must be formed in each different mold according to each different length and shape.

When the above hoses each require different molds, the cost for molds becomes expensive. Especially, when a few variety of hoses are formed, the forming cost is high.

SUMMARY OF THE INVENTION

It is an object of the present invention to solve the above problems. The hose connecting structure according to the present invention comprises a hose comprising a thermal flexibility resin which is molded by a blow molding method, and a mating member which is inserted into the edge opening of the hose or to which the edge portion of the hose is inserted. The hose connecting structure further comprises a ring-shaped sealing material and a first engaging portion which is disposed in the axial direction at a predetermined distance to the sealing material at one of the edge portion of the hose and the mating member, and a second engaging portion which is directly or indirectly engaged with the first engaging portion at the other of the edge portion of the hose and the mating member.

At least the central and the engaging portion of the hose connecting structure according to the present invention comprises a thermal flexibility resin which is molded by a blow molding method. The mating member comprises resin, metal and other structural materials. The mating member can be inserted into the edge portion opening of the hose or the edge portion of the hose can be inserted into the opening of the mating member.

The hose has a ring-shaped sealing material. Usually, an O-ring is used as the sealing material. When the engaging clearance is largely varied, other sealing materials such as cross sectional V-shaped, Y-shaped, W-shaped and X-shaped sealing material can be used. The hose has a sealing groove and the sealing material can be held in the sealing groove. The sealing groove is a ring-shaped groove which encircles the engaging surface of the edge portion of the hose in the circumferential direction. The hose can have one sealing material or more than two sealing materials. The sealing material can be held to the mating member.

The hose has a first engaging portion which is disposed in the axial direction with a predetermined distance to the sealing material. The first engaging portion can be disposed either at the edge surface side or at the central side from the viewpoint of the sealing material. The second engaging portion is disposed at the mating member. The first engaging portion and the second engaging portion have the relationship that one can be engaged with or released from the other and vice versa. The structure of these engaging portions can be conventional. For example, the first engaging portions can be a ring-shaped groove for rigidly holding a lock ring, an engaging claw or one of the pair of engaging structures which is formed by the projection and the recess.

When the first engaging portion is formed as the ring-shaped groove for rigidly holding the lock ring, it is preferable that a part of the ring-shaped groove has a wide length so as to enlarge or decrease the diameter of the lock ring for the purpose of releasing the engagement of the lock ring. The lock ring is disposed at the opening edge portion of the mating member, and a tapered guide surface whose inner periphery diameter is increased is disposed at an opening side at which an opening is elastically deformed in the shaft center direction.

The engaging claw can be an engaging arm comprising an arm portion which projects from the outer periphery surface in the centrifugal direction toward the top side, and an engaging claw which is disposed at the top of the arm portion. A plurality of the engaging arms are preferably disposed at the outer periphery surface of the hose in the circumferential direction. These engaging arms are molded by the injection molding method. In this method, the body portion of the hose which has the edge portion and which is molded by the molding method is inserted in a mold. The engaging arm which is formed by injection molding is inserted in the mold to be formed integrally with the hose. In order to achieve the rigid connection between the engaging arm and the body portion of the hose, a ring-shaped groove is formed at the outer periphery surface of the resin hose, and the base portion of the engaging arm is incorporated into the groove by insert molding, thereby integrally forming the base portion and the arm portion. In this structure, the engaging arm is rigidly and mechanically engaged with the body portion of the hose, and both are integrally combined.

When the mating member has the engaging claw, the first engaging portion of the resin hose can be a ring-shaped projection streak or a groove. The engaging groove is contacted to and engaged with the side surface of the projection streak or the groove. The side surface is preferably reverse-tapered toward the shaft center so that the engaging claw can be moved forward. Therefore, the engaging claw is energized in the shaft center direction to be firmly engaged.

It is preferable that the hose has a ring-shaped first contacting surface which faces towards the top side and which is disposed at the outer or inner periphery surface of the hose. The first contacting surface is contacted with a ring-shaped second contacting surface which is formed on the engaging surface of the mating member. Since the first contacting surface is engaged with the second contacting surface, the insertion of the hose to the mating member is controlled. The first contacting surface and the second contacting second contacting surface can be the edge surface of the hose or the edge surface of the mating member.

The edge portion of the hose has a first backlash prevention portion comprising at least three projection portions which are elastically deformed by the engaging surface of the mating member and which extend from the engaging surface toward the mating member and which are arranged in the circumferential direction. The first backlash prevention portion is deformed in the direction which is perpendicular to the axis of said hose so that the hose is elastically contacted to the integral mating member. Since there is no backlash between the engaging surface of the hose and the mating member, the damage on the engaging surface caused by vibration collision is prevented. Furthermore, the sealing material improves its sealing capacity.

Two pairs of said first backlash prevention portions are disposed in the axial direction with the predetermined distance. Therefore, the fluctuation of the hose and the mating member can be prevented, and both are integrally fixed.

The projection can be a projection portion of a semicircular groove, a long projection streak in the axial direction, or a bellows portion which encircles in the circumferential direction and which has a crest and a rill in the axial direction.

The engaging portion of the hose has a second backlash prevention portion which makes an elastically compressive-deformation or an elastic elongation-deformation in the axial direction. The backlash caused by the relative movement of the hose and the mating member in the axial direction is prevented by the second backlash prevention portion.

The second backlash prevention portion can be the bellows portion in which the crest or the rill extends in the circumferential direction. The second backlash prevention portion can be a ring-shaped projection streak which extends in the circumferential direction. The projection streak has preferably a wide length so as to enable large deformation. The second backlash prevention portion must be compressed or elongated in the axial direction for normal operation. In other words, the second backlash prevention portion must be pressed to the mating member in the axial direction. The power for inserting the hose into the mating member or the power for drawing out the hose from the mating member is used as the power for pressing the second backlash prevention portion. In order to make the elastic compressive-deformation or the elastic elongation-deformation by utilizing the above power, a contacting surface or a hook in which the hose is contacted to the mating member in the axial direction is required.

The hose has preferably both the first backlash prevention portion and the second backlash prevention portion.

As described above, the hose comprises the resin material which is molded by the blow molding method. The edge portion is inserted in the inner surface of the mating member by way of the sealing material such as an O-ring.

In the present invention, the edge portion of the hose molded by the blow molding method is engaged with the inside of the mating member. In other words, the outer surface of the edge portion of the hose in which the dimensional accuracy is excellent is used as the engaging surface of the connecting portion. Furthermore, the sealing of the connecting portion is achieved by the sealing material such as an O-ring, not by the elastic adhesion of the edge portion of the hose to the mating member.

As a result, after the blow molding of the edge portion of the hose, the step of polishing the inner surface of the edge portion and the step of washing the polishing powder are omitted. Therefore, the step of forming the hose is simplified.

Since the polishing step is omitted, the disadvantages caused by the residue of the polishing powder can be overcome.

In the present invention, when the hose is made of resin material, the edge portion of the hose can be made of soft resin material or hard resin material. As a result, the selection of soft resin materials is restricted for satisfying other characteristics of the hose.

In the conventional way, a connection metal fitting is fixed to the edge portion of the hose by the caulking method for the connection of the hose. Generally, the connection metal fitting is fixed to the mating member.

In the above case, it is required that the metal fitting having a complicated structure is fixed to the edge portion of the hose. Therefore, many components are required, and the hose connecting structure becomes complicated. Furthermore, the cost is high.

In the present invention, the engaging portion for the connection and the edge portion of the hose are integrally formed. Therefore, the conventional metal fitting is not required, and many other components are not required. Furthermore, the cost is low.

Moreover, the edge portion made of resin material is engaged with the mating member. In other words, the edge portion is used as a part of the connection coupling, so the connecting structure is simplified.

It is preferable that the first engaging portion of the edge portion of the hose is elastically engaged with the second engaging portion of the mating member. Thus, the connection of the hose can be achieved by one touch.

In the present invention, the engaging portion is disposed at each of the edge portions of the hose and the mating member. Since one engaging portion is engaged with the other engaging portion in the axial direction by way of the lock ring which is deformable, the hose cannot be drawn out.

The first engaging portion is disposed at the top side from the holding portion of the sealing material, and the second engaging portion is disposed at a corresponding portion. In this case, when the edge portion of the hose is inserted into the mating member, the sealing material doesn't pass through the second engaging portion. Therefore, the sealing material is not damaged by the connection or contact between the sealing material and the second engaging portion.

The first engaging portion is disposed at the side to which the sealing material is held, so the first engaging portion does not contact the sealing material. Since the sealing material is not contacted against the second engaging portion, the second engaging portion can be disposed near the sealing material in a direction which is perpendicular to the axis. Therefore, the second engaging portion does not project toward the outside or the inside in the direction which is perpendicular to the axis.

When the hose is molded by the blow molding method, the step of polishing of the edge portion is not required for increasing the dimension. Therefore, the step of washing the polishing powder can be omitted, and the step of forming the hose is simplified. Since the polishing can be omitted, the disadvantages caused by the residue of the polishing powder is solved. Furthermore, the edge portion is made of hard resin material, so the cost for the material is lowered.

As compared with the case in which the outer periphery surface is used as the engaging surface, the same effect is achieved when the inner periphery surface of the edge portion of the hose is used as the engaging surface. In this case, the molding accuracy of the blow molding is not enough, so attention is required for the selection of the sealing material and the prevention of the backlash. The sealing material is selected in order to cover a relatively large clearance. Morever, the backlash prevention portion is selected so as to allow large variation in the direction which is perpendicular to the axis.

When the inner periphery surface is used as the engaging surface, the inner periphery surface is dissolved again and remolded by blow molding. The sealing groove which holds the sealing material is dissolved again to be remolded.

The long molding body which is used as the material of the hose is cut at the predetermined portion, and the necessary step is performed at the edge portion to form the hose as the final product. In this case, the cutting portion of the long molding body is selected, so the desirable length of the hose can be obtained. Therefore, hoses having various lengths can be formed by using only one mold for the hose. Moreover, the cost for the mold is remarkably reduced.

BRIEF DESCRIPTION OF THE DRAWINGS

FIG. 1(A) is a main plan view, partly in cross section, before connecting. FIG. 1(B) is a main plan view, partly in cross section, after connecting. FIG. 1(C) is a perspective view for showing the edge portion of the resin hose.

FIG. 3(A) is a main cross sectional view for showing the mold when the body portion of the hose is inserted.

FIGS. 4(A) and (B) are explanatory drawings for showing the process of the other method for forming the resin hose of the First Embodiment. FIG. 4(A) is a main cross sectional view before clamping the mold. FIG. 4(B) is a main cross sectional view where compressed gas is introduced.

FIGS. 5(A) and (B) are explanatory drawings for showing the process of the method for forming the variation of the resin hose of the First Embodiment. FIG. 5(A) is a main cross sectional view before clamping the mold. FIG. 5(B) is a main cross sectional view where compressed gas is introduced.

FIG. 6(A) is a main cross sectional view when the other mating member is used. FIG. 6(B) is a main cross sectional view when the other mating member and the other first engaging portion are used. FIG. 6(C) is a main cross sectional view when a further mating member is used. FIG. 6(D) is a main cross sectional view when a further mating member is used. FIG. 6(E) is a main cross sectional view when a further mating member is used. FIG. 6(F) is a main cross sectional view when a further mating member is used.

FIG. 7(A) is a main cross sectional view when the other mating member is used. FIG. 7(B) is a main cross sectional view when the other first engaging portion is used. FIG. 7(C) is a main cross sectional view when a further first engaging portion is used. FIG. 7(D) is a main cross sectional view when a further first engaging portion is used. FIG. 7(E) is a main cross sectional view when a further mating member is used.

FIG. 8(A) is a main cross sectional view when the other mating member is used. FIG. 8(B) is a main cross sectional view when the other first engaging portion is used. FIG. 8(C) is a main cross sectional view for showing the connecting structure when a further first engaging portion is used. FIG. 8(D) is a main cross sectional view when a further mating member is used. FIG. 8(E) is a main cross sectional view for showing the internal structure of the first engaging portion. FIG. 8(F) is a main cross sectional view for showing the internal structure of a further first engaging portion.

FIG. 9(A) is main cross sectional view when the other resin hose and the other mating member are used. FIG. 9(B) is a main cross sectional view when the other mating member is used. FIG. 9(C) is a main cross sectional view when a further mating member is used. FIG. 9(D) is a main cross sectional view when a further mating member is used. FIG. 9(E) is a main cross sectional view when a further mating member is used. FIG. 9(F) is a main cross sectional view when a further mating member is used.

FIGS. 10(A) and (B) are drawings for showing the other resin hose which is used for the hose connecting structure of the First Embodiment. FIG. 10(A) is a cross sectional view. FIG. 10(B) is a plan view.

FIG. 11(A) is a main cross sectional view taken parallel to the axis. FIG. 11(B) is a main cross sectional view taken vertical to the axis. FIG. 11(C) is a perspective view for showing the edge portion of the resin hose.

FIG. 13(A) is a main cross sectional view taken parallel to the axis for showing the releasing condition of the lock ring.

FIGS. 14(A) and (B) are drawings for showing the other resin hose which is alternative to the resin of the Second Embodiment. FIG. 14(A) is a cross sectional view. FIG. 14(B) is a plan view.

FIG. 15(A) is a main cross sectional view taken parallel to the axis. FIG. 15(B) is a main cross sectional view taken vertical to the axis. FIG. 15(C) is a perspective view for showing the edge portion of the resin hose.

FIG. 16(A) is a perspective view for showing the lock ring releasing apparatus. FIG. 16(B) (a) is a main cross sectional view when the lock ring releasing apparatus is attached to the hose. FIG. 16(B) (b) is a main cross sectional view when the lock ring is released by the lock ring releasing apparatus. FIG. 16(C) is a cross sectional view taken vertical to the axis.

FIG. 17(A) is a main cross sectional view when one lock ring is used. FIG. 17(B) is a main cross sectional view when another lock ring is used. FIG. 17(C) (a) is a main cross sectional view when the other lock ring is used. FIG. 17(C) (b) is a perspective view for showing the other lock ring.

FIG. 18(A) is a cross sectional view when one mating member is used.

FIG. 20(A) is a main cross sectional view for showing one hose and one mating member. FIG. 20(B) is a main cross sectional view for showing the other hose and the other mating member. FIG. 20(C) is a main cross sectional view for showing a further hose and a further mating member. FIG. 20(D) is a main cross sectional view for showing a further hose and a further mating member.

FIG. 21(A) is a main cross sectional view taken parallel to the axis.

FIG. 22(A) is a main cross sectional view for showing one hose and one mating member. FIG. 22(B) is a main cross sectional view for showing the other hose and the other mating member. FIG. 22(C) is a main cross sectional view for showing a further hose and a further mating member. FIG. 22(D) is a main cross sectional view for showing a further hose and a further mating member.

FIG. 23(A) is a main cross sectional view.

FIG. 24(A) is a main cross sectional view.

FIG. 25(A) is a main cross sectional view. FIG. 25(B) is a perspective view for showing the edge portion of the resin hose. FIG. 25(C) is a main cross sectional view for showing the other hose connecting structure.

FIG. 27(A) is a main cross sectional view.

FIG. 28(A) is a main cross sectional view of one modification. FIG. 28(B) is a main cross sectional view of another modification. FIG. 28(C) is a main cross sectional view of the other modification.

FIG. 30(A) is a main cross sectional view.

FIG. 33(A) is a cross sectional view for showing the connecting condition.

FIG. 34(A) is a main plan view, partly in cross section, for showing the hose connecting structure of the Ninth Embodiment. FIG. 34(B) is a main cross sectional view for showing the hose connecting structure of the modification. FIG. 34(C) is a main cross sectional view for showing the hose connecting structure of the other modification. FIG. 34(D) is a main cross sectional view for showing the hose connecting structure of a further modification.

FIG. 35(A) is a main cross sectional view.

FIGS. 40(A) and (B) are drawings for showing the resin hose which is used for the method for forming the hose of the Eleventh Embodiment according to the present invention. FIG. 40(A) is a cross sectional view for showing the resin hose. FIG. 40(B) is a cross sectional view for showing the body portion of the hose which is used for the method of forming the resin hose.

FIG. 41(A) is a cross sectional view for showing the resin hose.

FIGS. 42(A) and (B) are drawings for showing the resin hose which is used for the method of forming the hose according to the present invention. FIG. 42(A) is a cross sectional view for showing the resin hose. FIG. 42(B) is a cross sectional view for showing the body portion of the hose which is used for the method of forming the resin hose.

FIG. 44(A) is a plan view, partly in cross section, for showing the resin hose.

FIGS. 45(A) and (B) are drawings for showing the resin hose which is formed by the method of forming the hose of the Fifteenth Embodiment. FIG. 45(A) is a cross sectional view for showing the resin hose. FIG. 45(B) is a main cross sectional view for showing the method of molding the edge portion and the body portion of the hose which are used for the method of forming the resin hose.

FIG. 46(A) is a cross sectional view for showing the edge portion of the resin hose.

FIG. 47(A) is a cross sectional view for showing the edge portion of the resin hose.

FIG. 48(A) is a cross sectional view for showing the edge portion of the resin hose.

FIG. 49(A) shows the condition before the mandrel for molding the inner periphery surface is inserted. FIG. 49(B) shows the inner periphery surface being molded. FIG. 49(C) shows the condition of the resin hose and the molding apparatus before the sealing groove is processed. FIG. 49(D) shows the molding apparatus being inserted into the resin hose at the predetermined position. FIG. 49(E) shows the sealing groove being processed. FIG. 49(F) shows the sealing groove being processed.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

The Preferred Embodiment according to the present invention will be hereinafter described with reference to FIGS. 1 through 48.

The First Embodiment

Figure 2:
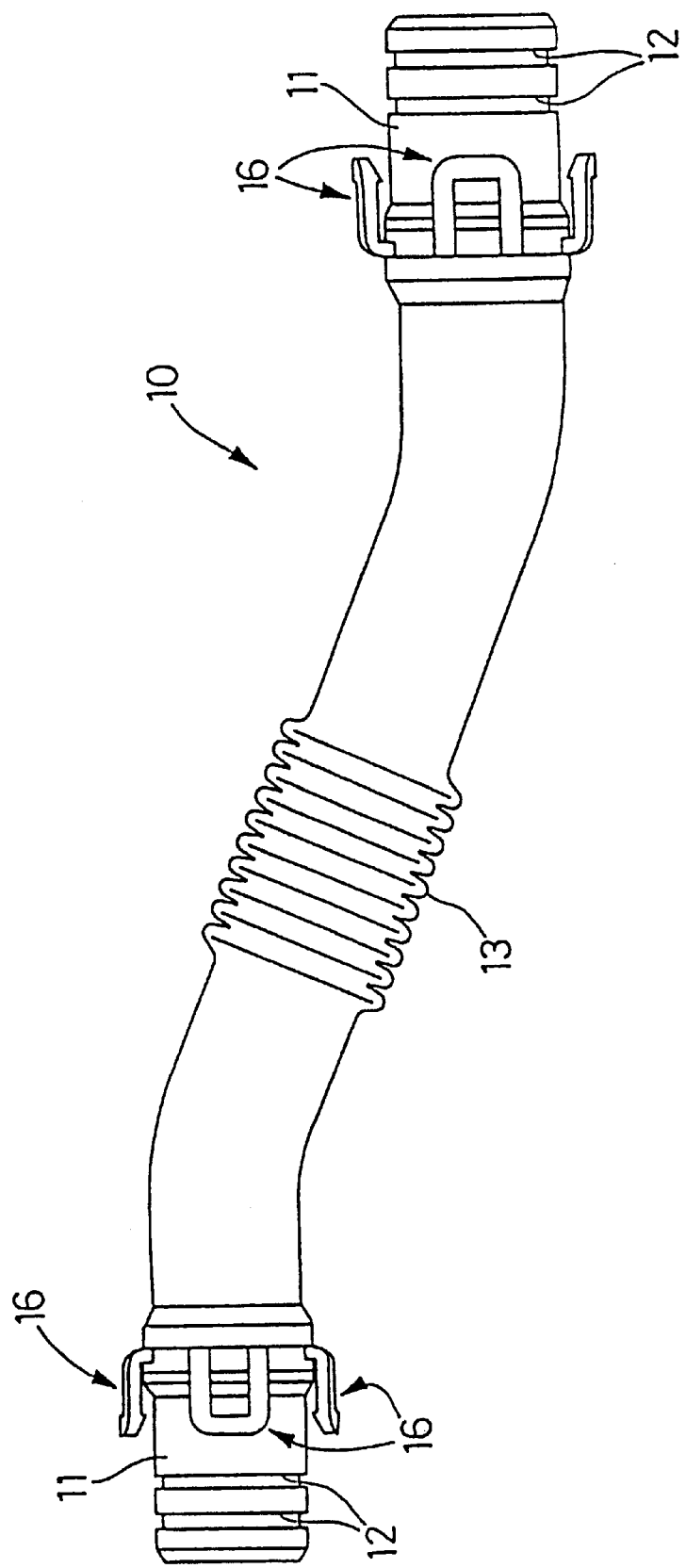
FIG. 2 is a plan view for showing the whole structure of the resin hose described in FIG. 1.

FIG. 2 is the plan view showing the hose 10. This hose 10 comprises a body portion, which is made by a blow molding method and which has a predetermined curved shape, and a plurality of the first engaging portions 16 which are integrally fixed to the body portion of the hose. The middle portion of the hose 10 has a bellows portion 13 which comprises a soft resin material. The rest of the middle portion comprises a hard resin material.

Each of the first engaging portions 16 comprises: a base 18 which is integrally welded and fixed on the outer peripheral portion of the body portion of the hose; a pair of rising portions 19 and 19 which rise up from both ends of this base 18; a pair of elastic arms 20 and 20 which extend parallel from the upper edge of the rising portions 19; and an engaging claw 22 which is disposed for connecting the tips of elastic arms 20 and 20. A plurality of these first engaging portions 16 form the ring which makes a circle by being connected by ring connecting portions 24 with one another in the circumferential direction.

The base 18 and the connecting portion 24 are incorporated into the inner side of a ring groove 26 which is formed on the hose 10 and it is integrated by welding with the groove 26. So, the surface of the connecting portion 24 is on a level with the outer surface of the hose 10.

The cross-sectional structure of the hose 10 can be a single layer structure or a lamination structure.

Figure 1A:
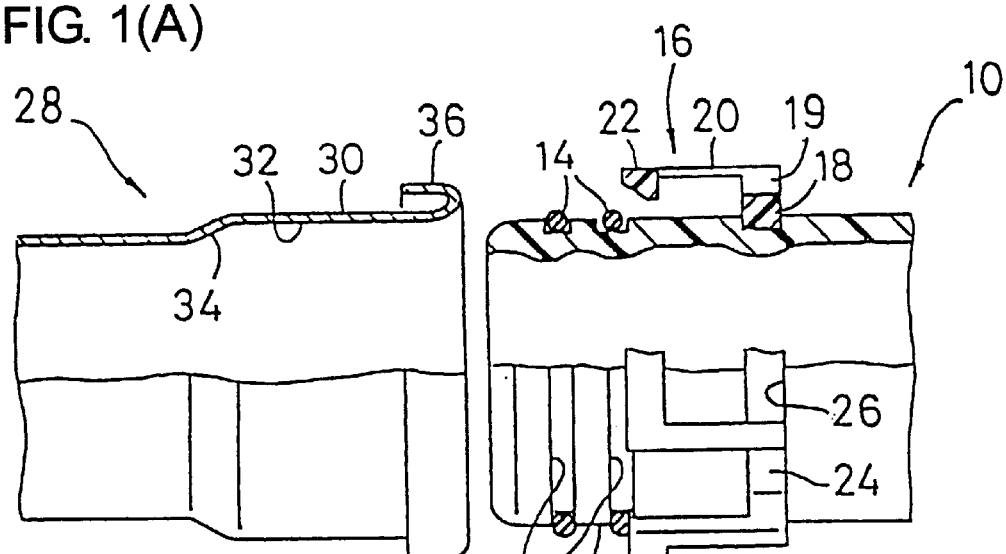
FIGS. 1(A) to (C) show the hose connecting structure of the First Embodiment according to the present invention.
Figure 1B:
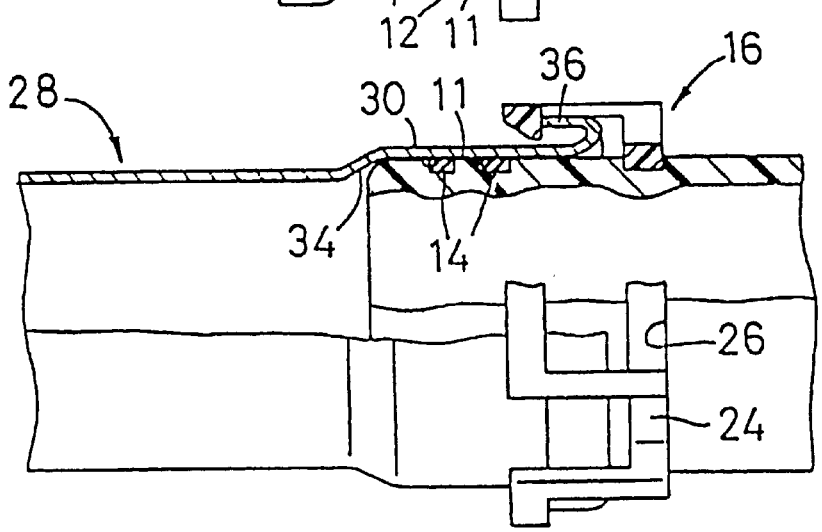
Figure 1C:
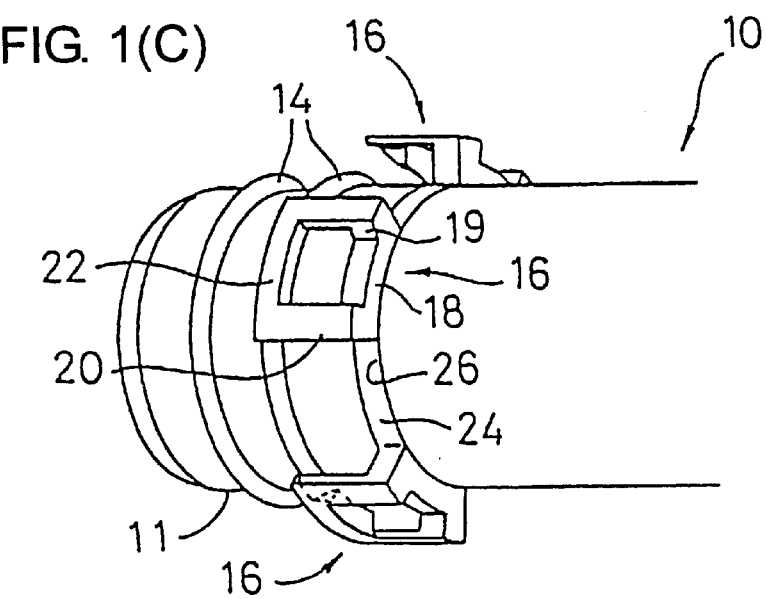

As shown in FIG. 1, two O-ring grooves 12 and 12 are formed on a tip portion periphery surface 11 of the hose 10, and two O-rings 14 and 14 are attached to the O-ring grooves 12 and 12 respectively for sealing the hose 10. When the O-ring 14 is used for a filler hose, it is best to use materials such as NBR or FKM. The O-ring 14 can comprise other materials.

A pipe-shaped mating member 28 comprises a metal material for connecting with the hose 10. The mating member 28 has a large-diameter portion 30 at the edge side, and the inner surface of the large-diameter portion 30 is an engaging surface 32. The large-diameter portion 30 is tapered at the bottom portion, and this tapered portion is a stopper portion 34. The stopper portion 34 contacts with the hose 10 to control and excessive push towards first engaging portion 16.

The large-diameter portion 30 is curved and folded over at the edge portion, and this curved return portion is a second engaging portion 36 for engaging with the first engaging portion 16.

In the hose connecting structure according to the present invention, when the edge portion of the hose 10 is inserted into the inner portion of the mating member 28, the first engaging portion 16 is elastically engaged with the second engaging member 36 to secure the hose 10 to the mating member 28. The stopper portion 34 connects with the edge portion of the hose 10 to control an excessive pushing force between the hose 10 and mating member 28.

FIG. 1(B) shows the enlarged cross-sectional view showing the major portion in the connecting state of the hose and the mating member.

The excess push can be controlled by contacting the edge portion of the mating member 28 and the rising portion 19 of the first engaging portion 16.

When the edge portion of the hose 10 is inserted into the inner portion of the mating member 28, the edge portion outer surface 11 is engaged with the inner surface 32 of the mating member 28 through the O-ring 14 which is used for sealing the engaging portions.

Since the body portion of the hose 10 is made by a blow molding method, the outer surface 11 has a high dimensional accuracy. In the present invention, it is advantageously possible to use the outer surface 11 as the engaging surface when the hose 10 is inserted into the inner portion of the mating member 28.

FIG. 3 shows the method for producing the first engaging portion 16 of the hose 10. In FIG. 3, 38 is a core die, and 40 is the body die. The body die 40 comprises two split dies 42 and 44 to form a molding cavity 46.

Figure 3A:
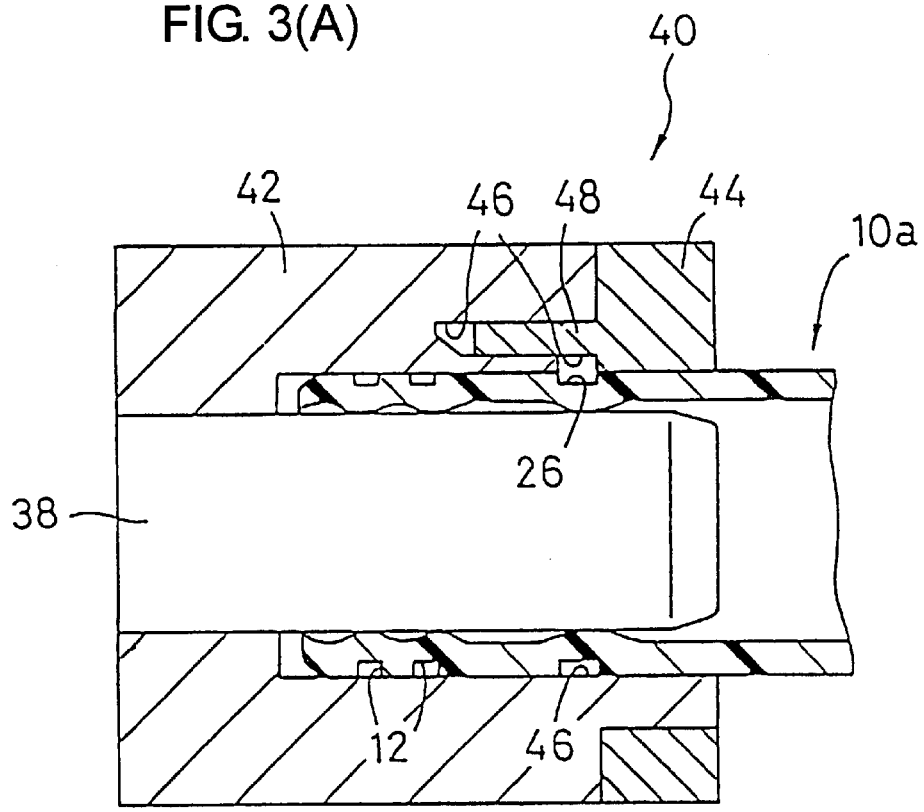
FIGS. 3(A) and (B) are explanatory drawings for showing the method for forming the edge portion of the resin hose described in FIG. 1(C).

In this method, as shown in FIG. 3(A), a resin material is injected into the molding cavity 46 under the condition that the body portion of the hose 10a is set in the molding die. The resin material is solidified to integrally form the first engaging portion 16 with the hose 10. The base 18 and the connecting portion 24 of the first engaging portion 16 are deposited to the inner surface of the groove 26 of the body portion of the hose 10a by means of the heat caused by the injection molding. As a result, the base portion 18 and the connecting portion 24 are stably fixed to the groove 26.

If the deposition is not enough, the base portion 18 and the connecting portion 24 are physically engaged with the inner surface of the groove 26, so that they are firmly fixed to the groove 26.

Figure 3B:
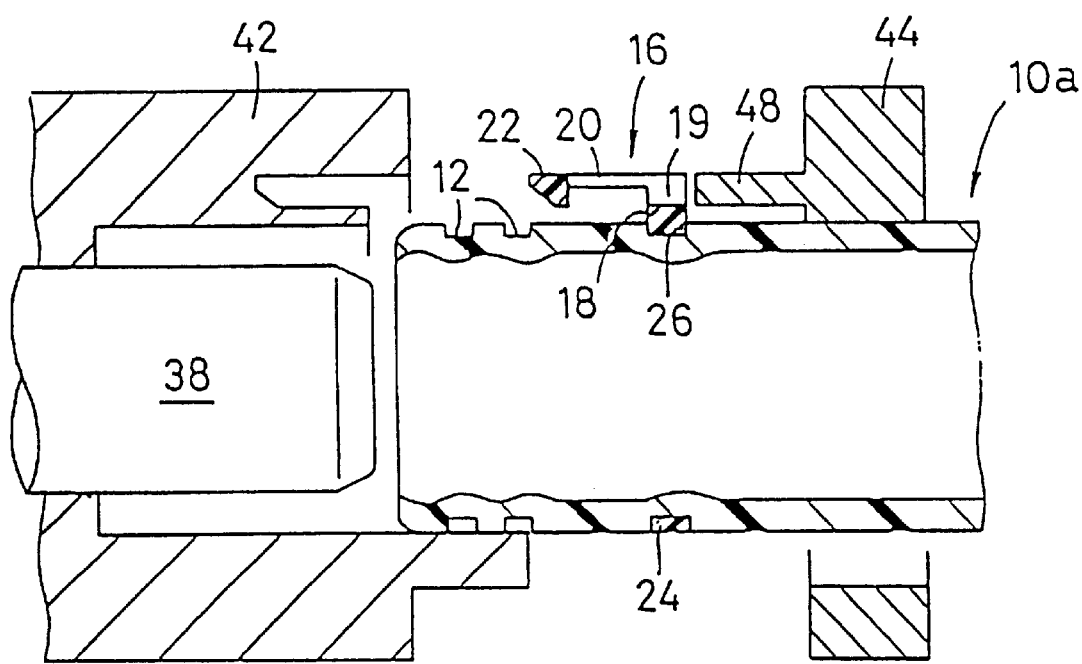
FIG. 3(B) is a main cross sectional view when the mold is opened.

After the first engaging portion 16 is molded, as shown in FIG. 3(B), the split dies 42 and 44 are separated in the direction of the hose axis to obtain the formed products. The split die 44 is rotated at the predetermined angle around the hose. Then after the molding portion 48 of the engaging claw 22 in the first engaging portion 16 is positioned between the engaging portions 16 and 16, the split die 44 is shifted in the direction of the axis so as to go through the space between the first engaging portions 16 and 16. As the result, the split die 44 can be pulled out from the hose 10.

In this embodiment, the split dies 42 and 44 are shifted to the direction of the hose axis and are separated so as to pull out the hose. By means of providing two or four engaging claws 22 of the first engaging portions 16, the split die 42 and 44 can be separated by shifting them in the direction which is perpendicular to the axis. The connecting portion 24 is fully incorporated into the inner side of the groove 26 of the hose 10, so this connecting portion 24 doesn't prevent the split die 44 from extracting.

In the above-mentioned Embodiment, the body portion of the hose 10a is molded at first and it is set in the injection molding die. In this position, the first engaging portion 16 is injection molded. FIGS. 4(A) and 4(B) show another method of molding. As shown in FIGS. 4(A) and 4(B), the first engaging portion 16 is injection molded in advance and it is set in a blow molding die, then the body portion of the hose 10a may be blow molded. In this case, the base and the connecting portion 24 of the first engaging portion 16 can be formed so as to enter into the inside of the body portion of the hose 10a.

An O-ring groove can also be molded at the body portion 10a at the same time of the blow molding by providing the projection 54 at the insert die (support die) in the blow molding die 52.

Furthermore as shown in FIGS. 5(A) and 5(B), the projection 54 is provided at the body die of the blow molding and the O-ring groove can be molded by this projection 54.

The above-mentioned first engaging portion 16 and the second engaging portion 36 show only examples of this invention. So they can be realized in various forms as shown in FIG. 6.

Figure 6A:
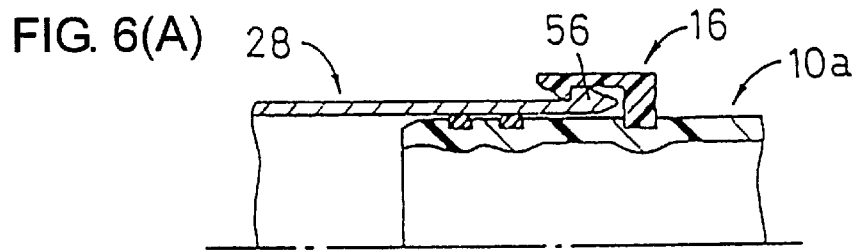
FIGS. 6(A) to (F) are drawings for showing other modifications of the hose connecting structure of the First Embodiment.
Figure 6B:
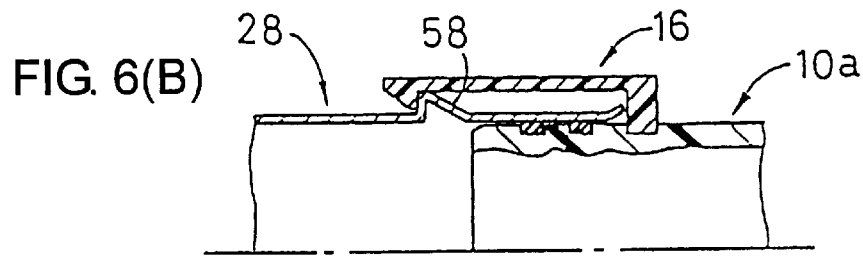

For example, as shown in FIG. 6(A), a thick-walled portion is provided at the edge portion and the second engaging portion 56 can be formed there. Further, as shown in FIG. 6(B), a part, which is apart from the edge of the mating member 28 at the predetermined distance, projects radially outside, so that the second engaging portion 58 can be formed.

Figure 6C:
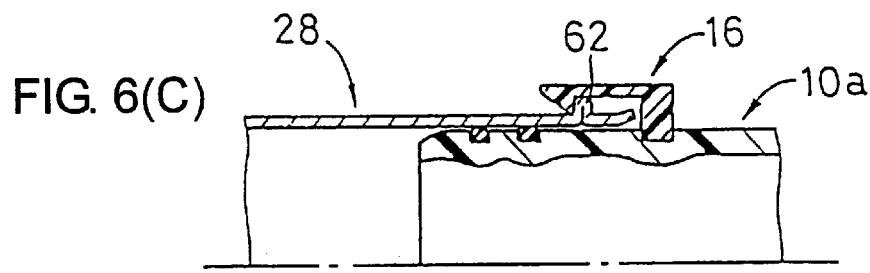
Figure 6D:
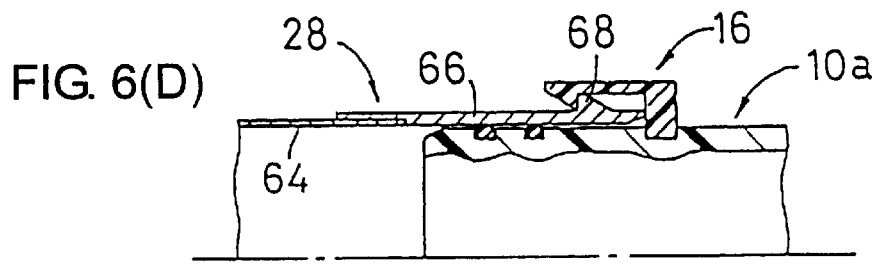
Figure 6E:
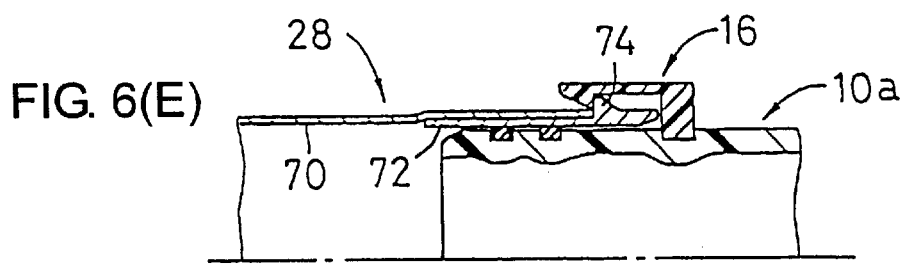

As shown in FIG. 6(C), a part of the mating member 28 projects radially outside and is crushed in the axial direction so that the second engaging portion 62 can be provided. Also as shown in FIGS. 6(D) and (E), separate members 66 and 72 are fixed to the bodies 64 and 70 of the mating member 28 and the second engaging portion 68 and 74 can be provided at the separate members 66 and 72 respectively.

Figure 6F:
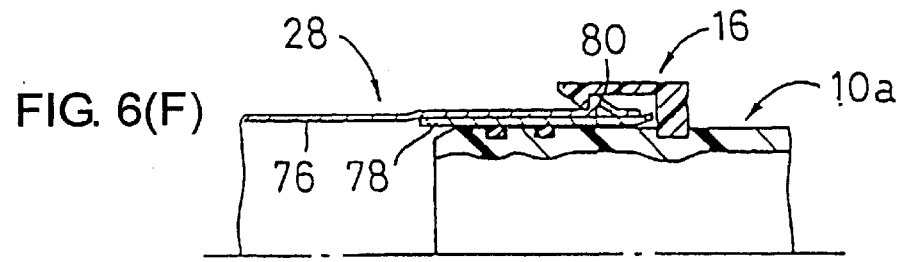

Also as shown in FIG. 6(F), a separate member 78 is fixed to a body 76 and the second engaging portion 80 can be formed at the side of the body 76.

FIGS. 7 and 8 show other modifications.

Figure 7A:
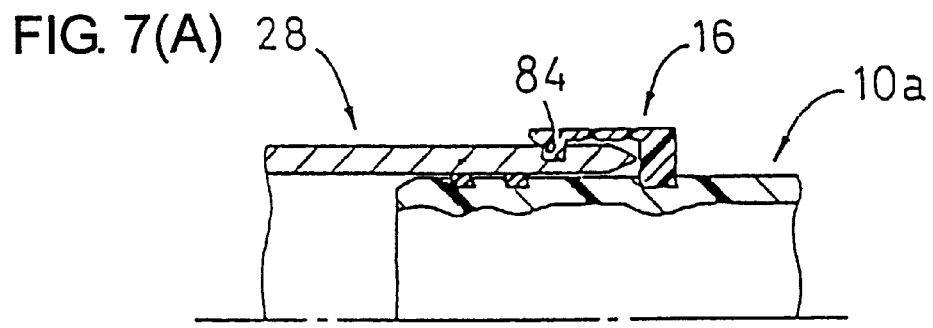
FIGS. 7(A) to (E) are drawings for showing further modifications of the hose connecting structure of the First Embodiment.
Figure 7B:
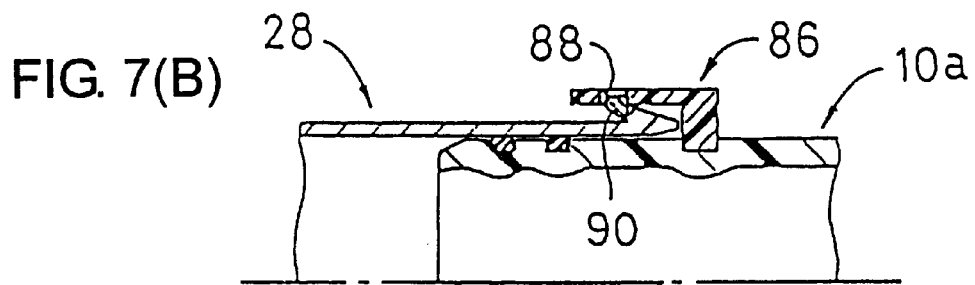
Figure 7C:
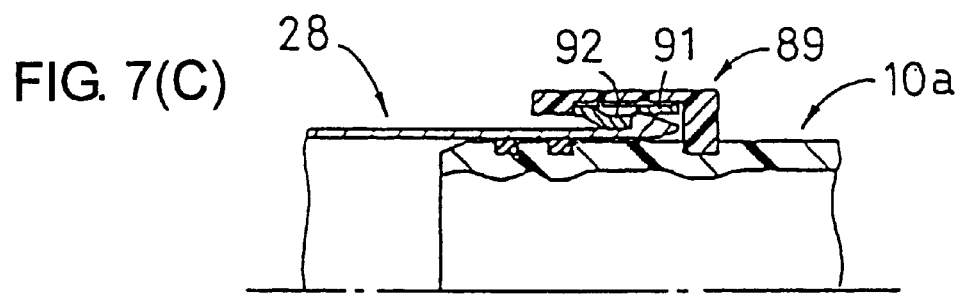
Figure 7D:
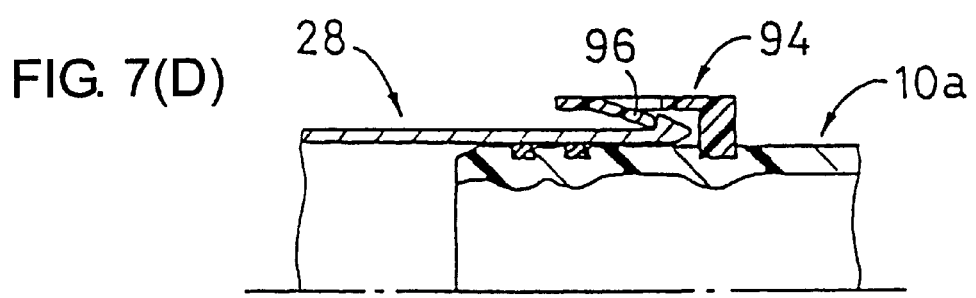
Figure 7E:
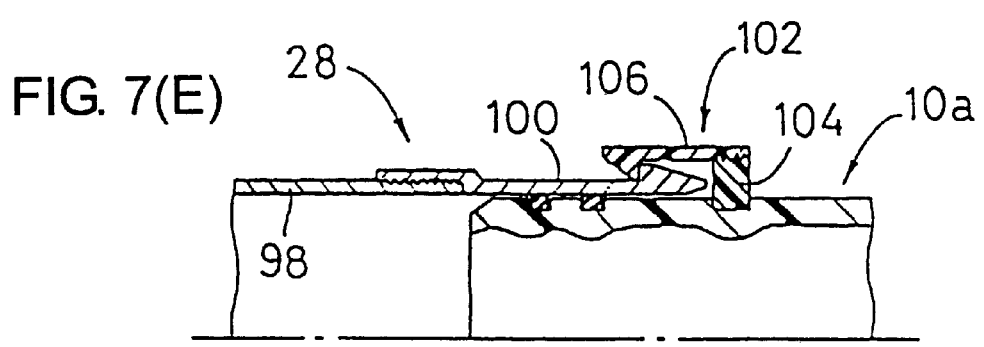

In FIG. 7(G), a ring groove is formed at the mating member 28 and this forms the second engaging portion 84. In FIG. 7(H), an elastic ring, whose diameter can be enlarged and reduced, is attached to the groove 88 of the first engaging portion 86 and this forms an engaging claw 90.

In FIG. 7(I), a claw member 91 is attached to the first engaging portion 89 and an elastic claw 92 is formed by cutting up a part of this claw member 91. In FIG. 7(J), an elastic claw 96 is formed by cutting up a part of the arm of the first engaging portion 94.

In FIG. 7(K), a separate member 100 is fixed by being screwed to the body 98 of the mating member 28 and an arm 106 is fixed by screwing to the base 104 of the first engaging portion 102.

Figure 8A:
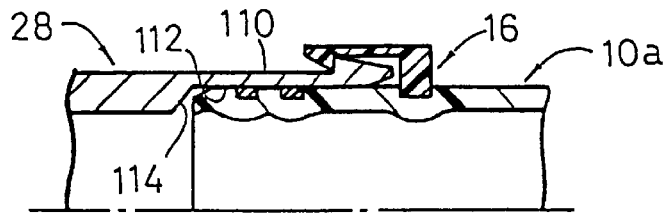
FIGS. 8(A) to (F) are drawings for showing further modifications of the hose connecting structure of the First Embodiment.
Figure 8B:
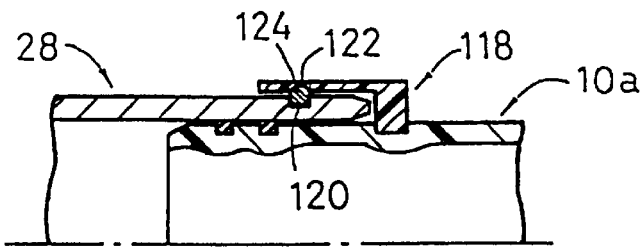
Figure 8C:
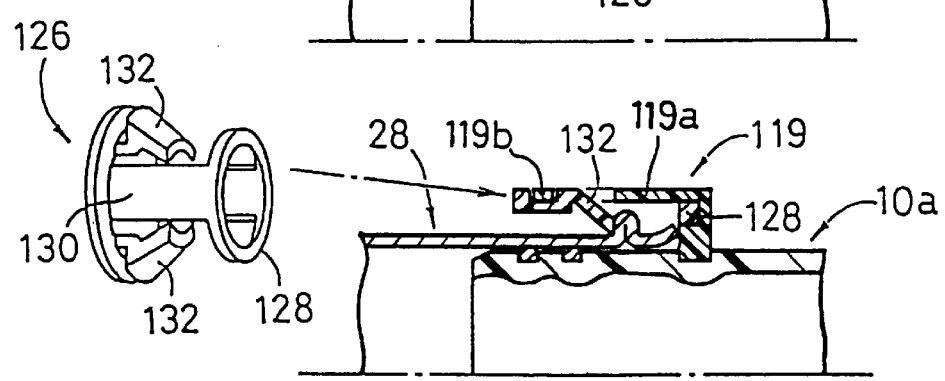
Figure 8D:
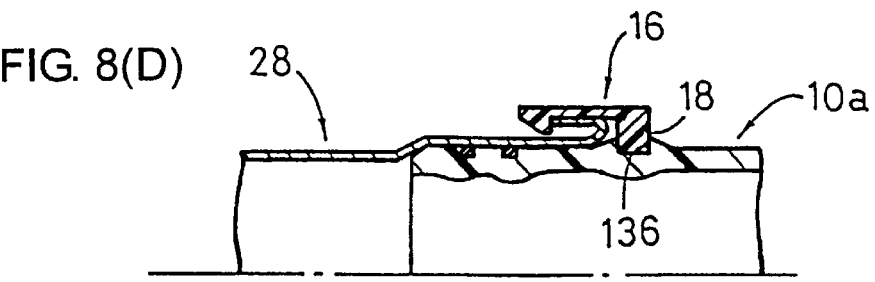
Figure 8E:
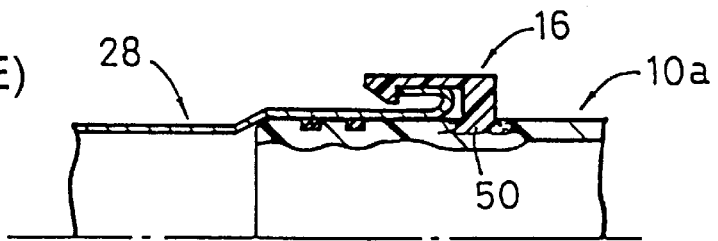
Figure 8F:
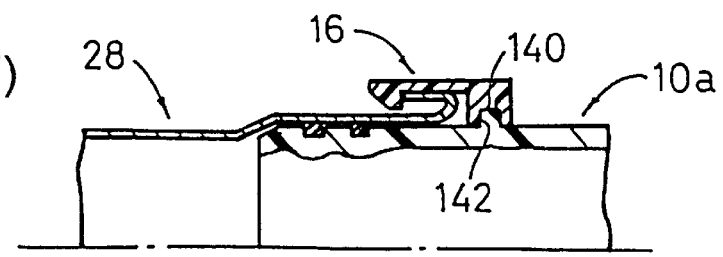

Furthermore, in FIG. 8(L), thin-walled portion 110 is provided at the side of the mating member 28 in order to form an engaging surface 112 and a stopper portion 114. In FIG. 8(M), the grooves 120 and 122 are formed at the mating member 28 and the first engaging portion 118 respectively and elastic rings whose diameter can be enlarged and reduced are engaged there.

In FIG. 8(N), the first engaging portion 119 is formed so that a retainer 126 comprising a ring connecting portion 128, an arm 130 and an elastic claw 132 is integrally detachably held to the lip portion 119*b* of the tube portion 119*a*.

FIGS. 8(O), (P) and (Q) show the constitutional modifications of the portion connecting the body portion of the hose 10*a* and the first engaging portion. FIG. 8(O) shows the modification in which the body portion of the hose 10*a* is partly uplifted so as to form the groove 136 and engage the base 18 of the first engaging portion 16 at this groove.

As shown in FIGS. 4 and 5, FIG. 8(P) shows the modification in which the base portion 50, provided with the projection projecting to the axial direction of the hose, is incorporated into the body portion of the hose 10*a*. Furthermore, FIG. 8(Q) shows the modification in which the projection 140 is formed at the body portion of the hose 10*a*, the groove 142 is formed at the first engaging portion 16 and this projection and this groove are engaged with each other.

The above mentioned examples are modifications in which the engaging claw is provided at the side of the first engaging portion. It is also possible to provide the engaging claw at the side of the second engaging portion.

FIG. 9 shows other examples. FIG. 9(A) shows the modification in which he second engaging portion 146, having an elastic arm 148 and an engaging claw 150, is integrally molded with the mating member 28. FIG. 9(B) shows the modification in which the separate member is integrated with the body portion 156 of the mating member 28 and the second engaging portion 162 having an elastic arm 158 and an engaging claw 160 is provided.

Figure 9A:
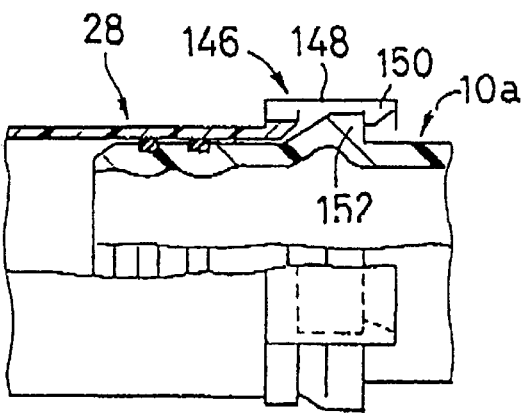
FIGS. 9(A) to (F) are drawings for showing further modifications of the hose connecting structure of the First Embodiment.
Figure 9B:
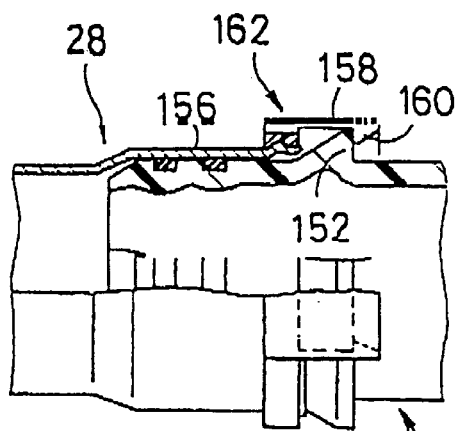
Figure 9C:
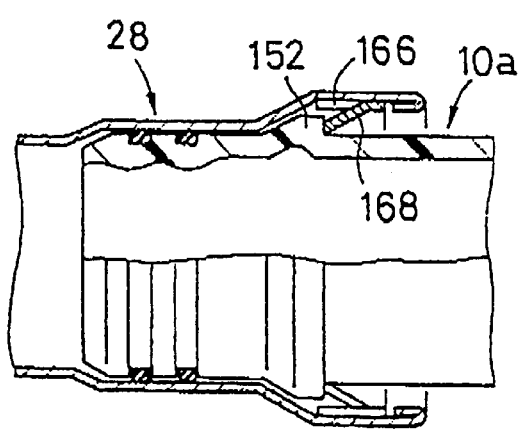

Furthermore, FIG. 9(C) shows the modification in which the C-shaped tube retainer 166 is attached to the side of the mating member 28 and an elastic claw 168, which is formed by cutting up a part of the claw member 166, engages with the flange shaped first engaging portion 152 at the side of the hose 10.

Figure 9D:
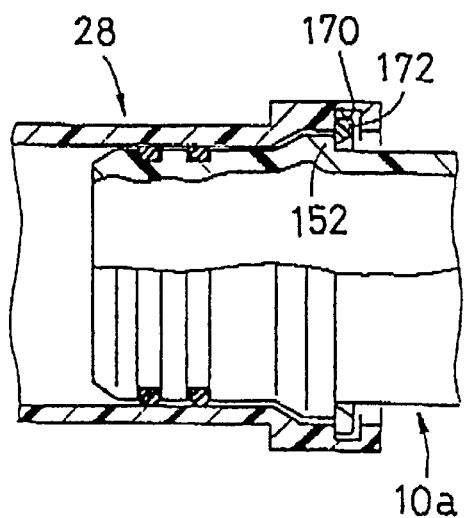

FIG. 9(D) shows the modification in which a groove 170 is provided at the side of the mating member 28; an elastic lock ring 172, whose diameter can be enlarged and reduced, is installed in the groove; and the elastic lock ring 172 is engaged with the first engaging portion 152 at the side of the hose 10.

Figure 9E:
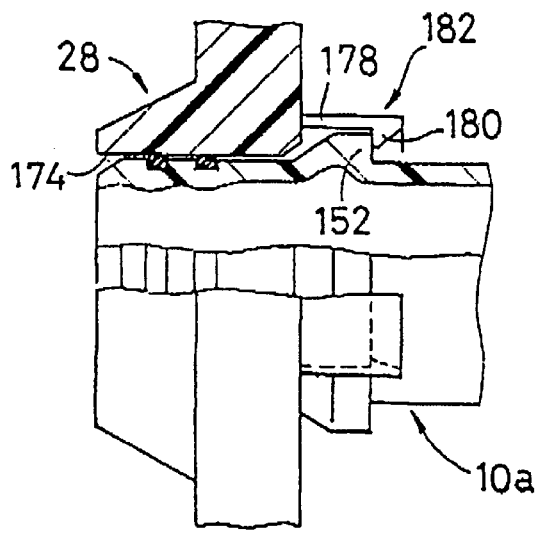

FIG. 9(E) shows the modification in which the second engaging portion 182, having an elastic arm 178 and an engaging claw 180, is provided at the side of the non-pipe shaped mating member 28 with an opening 174 and this second engaging portion is engaged with the first engaging portion 152 at the side of the hose 10.

Figure 9F:
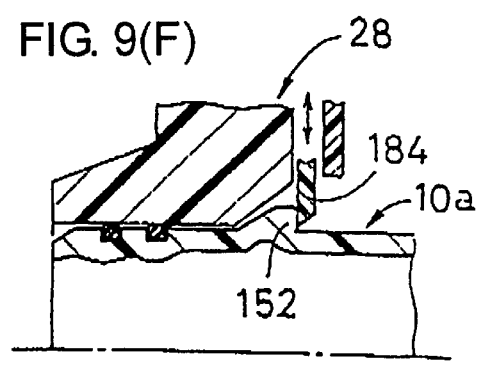

FIG. 9(F) shows the modification in which an elastic claw member 184 is installed on the side of non-pipe shaped mating member 28 and this elastic claw member is engaged with the first engaging portion at the side of the hose 10.

The above-mentioned modifications shown in FIG. 9 have the following advantages. Not only the body portion of the hose and the edge portion for connecting can be molded by going through only one process i.e. blow molding, but also the first engaging portion can be molded at the same time. Accordingly the production process can be simplified so that the cost of it can be reduced. Also the structure of the second engaging portions can be formed in the shape and structure which correspond to the types of mating member 28.

One of the preferred Embodiments of this invention has been detailed so far, but this invention is not limited thereto and may be realized in other forms. For instance, as shown in FIGS. 10(A) and 10(B) of this invention, the hose may be a blow hose 15 in which the whole of the body portion of the hose may be a bellows portion 13. And this invention is applicable to this blow hose and other various forms of hoses.

The Second Embodiment

Figure 11A:
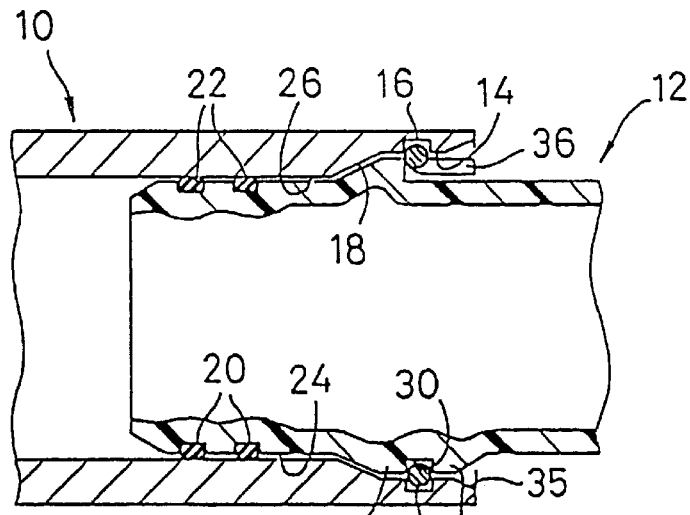
FIGS. 11(A) to (C) are drawings for showing the hose connecting structure of the Second Embodiment according to the present invention.
Figure 11B:
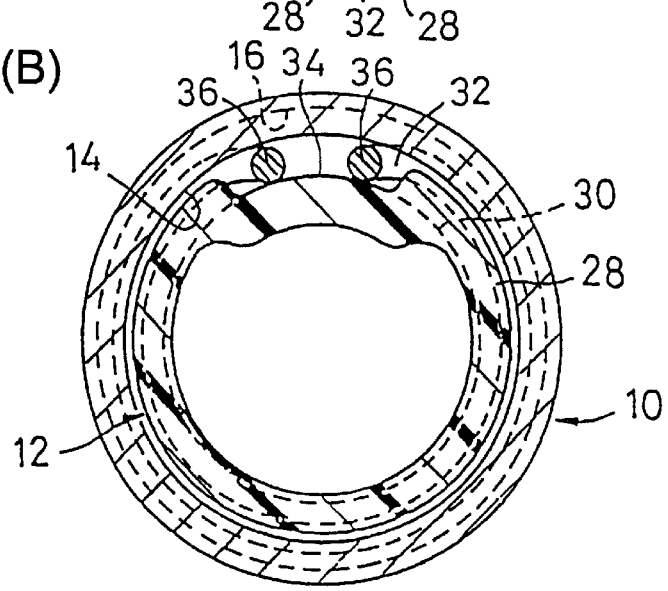
Figure 11C:
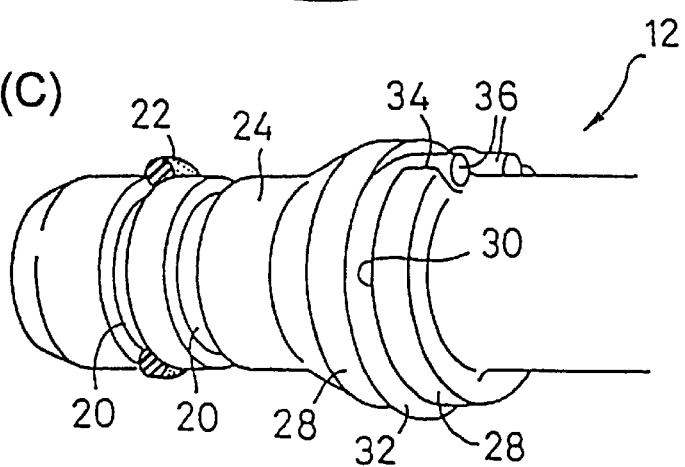
Figure 12:
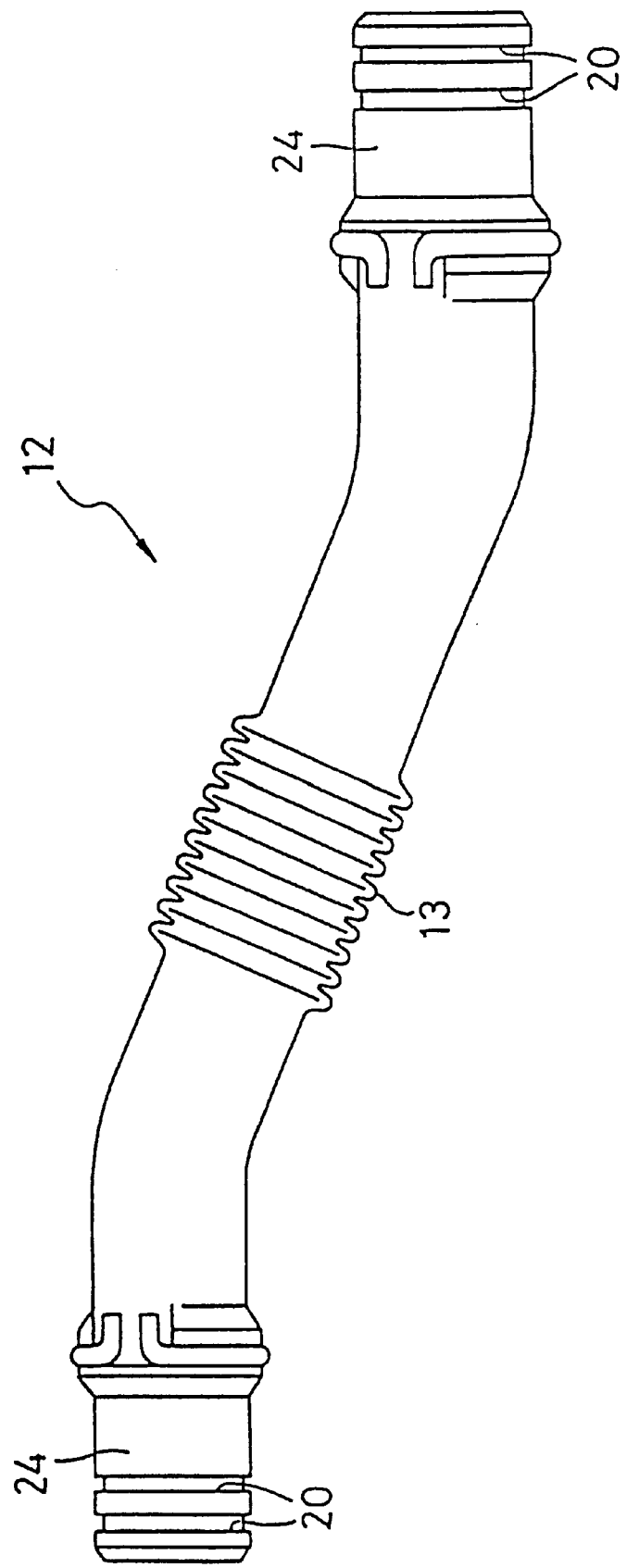
FIG. 12 is a plan view for showing the whole structure of the resin hose described in FIG. 11.

Another preferred embodiment of this invention is shown in FIGS. 11 and 12.

The hose connecting structure of this embodiment comprises: a hose 12 formed by blow molding; a pipe-shaped mating member 12 comprising metal; an O-ring 12 and an elastic lock ring 32 comprising metal. The mating member 10 is provided with a larger-diameter portion 14 having a large inside diameter in its opening side and a ring engaging groove 16 is provided there. The base portion in the axial direction of the large diameter portion 14 is formed in a tapered shape and that portion functions as a stopper portion 18 which prevents the hose 12 from being inserted with excessive force into the mating member.

The hose 12 is a resin hose having a predetermined curved form and this hose is used as the air hose for an automobile (refer to FIG. 2). The body portion and the edge portion of the hose 12 are integrally molded through the same molding process in which the resin material is blow molded.

This hose 12 has a bellows portion 13 at the middle portion of its body portion. This bellows portion mainly comprises a soft resin material and the rest of the portion mainly comprises a hard resin material. The cross-sectional structure of the hose 12 can be a single layer structure or a lamination layer structure having a plurality of layers.

As shown in FIGS. 11(A), 11(B) and 11(C), on an edge portion periphery surface 24 of the hose 12, two O-ring grooves 20 and 20 are formed and two O-rings 22 and 22 are attached to the O-ring grooves 20 and 20 respectively. The edge portion periphery surface 24 of the hose 12 engages with the inner surface 26 of the mating member 10 through these O-rings 22. When the O-ring 22 is used for a filler hose, it is best to use materials such as NBR and FKM which are superior in oil resistance and gasoline resistance. O-ring 22 can comprise other materials.

At the surface of the hose 12, two ring-shaped projection portions 28 and 28 which project to the longitudinal outside direction are integrally molded in the vicinity of O-rings 22 and 22. Between these projections 28 and 28, an engaging groove 30 which corresponds to the engaging groove 16 of said mating member 10 is formed. An elastic lock ring 32 comprising metal is installed so as to extend over the engaging grooves 16 and 30. Through this lock ring 32, a pair of engaging grooves 16 and 30 are engaged with each other in the axial direction. By this arrangement the hose 12 is prevented from separating from mating member 10 owing to the locking effect of the lock ring 32.

In this embodiment, the lock ring 32 is engaged with the engaging groove 30 of the hose 12, and in this state, the edge portion of the hose is inserted into the mating member 10. Due to this insertion, the lock ring 32 can be installed in the position which extends over the engaging grooves 16 and 30, based on the elastic deformation of the lock ring 32.

Once of (the right side one in FIG. 11(A)) these projections 28 and 28 of the hose 12 is provided with a notch 34 as shown in FIG. 11(B). Through this notch 34, operation handles 36 and 36 provided in the lock ring 32 project the longitudinal outside direction namely the outside of the engaging groove 30.

The tips of the operation handles 36 and 36 are provided at almost the same position of the tip of the mating member 10. All of the operation handles 36 and 36 are provided in the position hidden inside of the mating member 10.

Figure 13A:
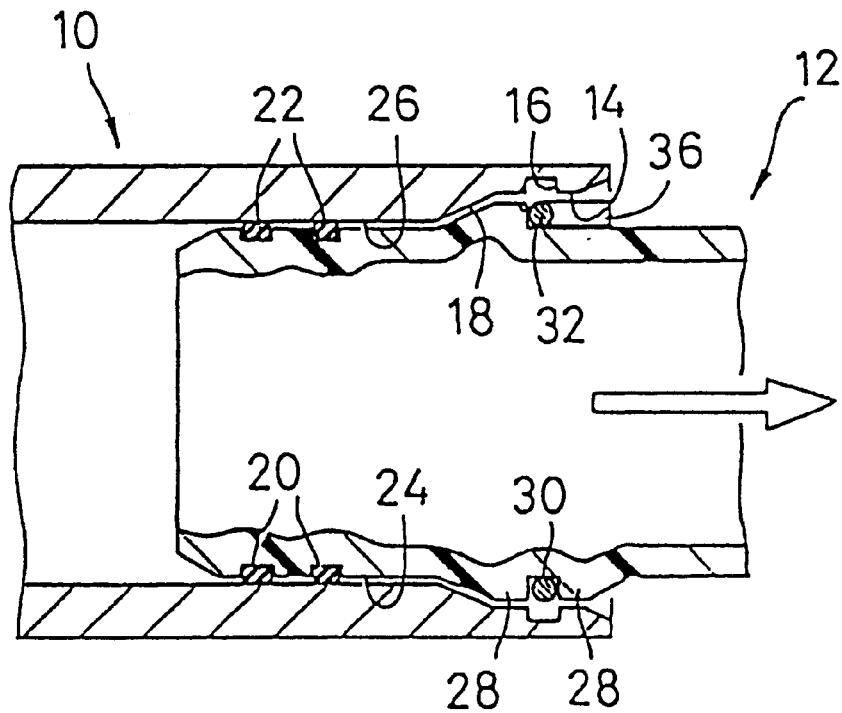
FIGS. 13(A) and (B) are explanatory drawings for showing the method for drawing out the hose of the hose connecting structure of the Second Embodiment according to the present invention.
Figure 13B:
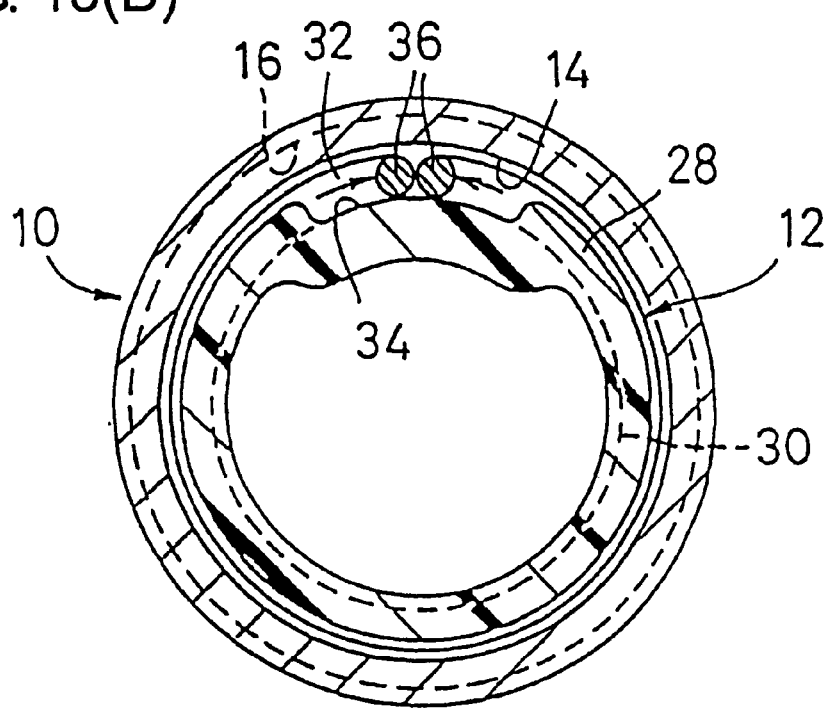
FIG. 13(B) is a main cross sectional view taken vertical to the axis.

The lock ring 32 has the shape extending over the engaging groove 16 of the mating member 10 and the engaging grooves 30 of the hose 12 in the free condition. In this condition, this lock ring 32 can be elastically deformed in a radially inward direction. In the state of reduced diameter, the lock ring is moved out of the engaging groove 16 and has a reduced peripheral diameter. This state is shown in FIG. 13(B). The engagement of the engaging grooves 16 and 30 can be released by the following conditions: As shown in FIG. 13, by pinching the operation handles 36 through the notch 34 and adding the force in the direction in which the operation handles 36 come close together, the lock ring 32 is deformed so as to have the reduced diameter, and the lock ring 32 can thereby be released from the engaging groove 16. Accordingly the engagement of the engaging grooves 16 and 30 can be released. By moving the hose 12 relatively in the right direction in FIG. 13(A) in this state, the hose 12 can be pulled out from the mating member 10.

Conversely when connecting the hose 12 with the mating member 10, it is only necessary to stuff the hose 12 into the inside of the mating member in the state in which the lock ring 32 is installed in the engaging groove 30. When the edge portion of the hose 12 is pushed into the inside of the mating member 10, the diameter of lock ring 32 is once reduced by the effect of the taper-shaped guide surface 35 of the tip of the mating member 10. The edge portion of the hose 12 is inserted into the inside of the mating member 10 in this state. Then when the edge portion of the hose 12 reaches the engaging groove 16, the edge portion of the hose 12 is expanded by its elasticity in the free condition and a part of it moves into the inside of the engaging groove 16. In this state, the engaging grooves 16 and 30 are engaged with each other in the axial direction through the lock ring 32 and the hose 12 is prevented from disengaging.

In the hose connecting structure of this embodiment, the lock ring is provided in the position hidden inside of the mating member 10, and the notch 34 and the operation handle 36 projected from the notch 34 are similarly hidden inside of the mating member 10. Accordingly, the engagement of the mating member 10 and the hose 12 is not released by accident owing to application of an external force.

In the hose connecting structure of this embodiment, the edge portion of the hose 12 is engaged with the mating member 10 through the O-ring 22. Accordingly, sealing is ensured even without elastic contact, so that even though the edge portion of the hose 12 comprises a hard resin material, sufficient sealing can be obtained. The selecting of materials of the hose 12 and its edge portion can be conducted more freely.

In the hose connecting structure of this embodiment, the edge portion of the hose which is used directly for connecting and the body portion of the hose are both molded through the same blow molding process. At the same time, O-ring grooves 20 and 20, a pair of projections 28 and 28 of the hose 12 and the engaging groove 30 between them are formed under the same blow molding process. This is advantageous in reducing the production cost.

Instead of using the hose 12 of this Embodiment, a hose 15 shown in FIGS. 14(A) and 14(B) can be employed. A bellows portion 13 of this hose 15 extends across the whole middle portion of the hose. FIG. 14(A) shows the sectional view of the hose 15 to which the lock ring is attached. FIG. 14(B) shows the plan view of the hose 15.

The Third Embodiment

Another Embodiment of this invention will be hereinafter described with reference to FIGS. 15 and 16.

Figure 15A:
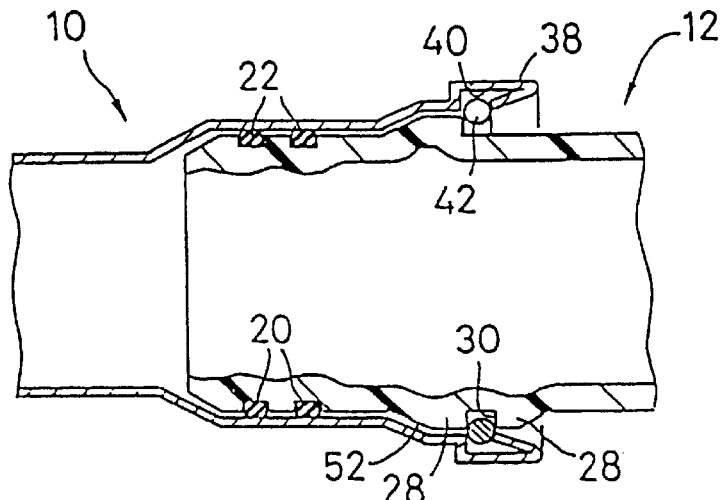
FIGS. 15(A) to (C) are drawings for showing the hose connecting structure of the Third Embodiment according to the present invention.

In this embodiment, as shown in FIG. 15(A), the mating member 10 comprises a metallic pipe. At the tip of the mating member 10, a ring-shaped increasing diameter end portion 38 is formed by increasing the diameter. And at the same time, the tip of this projection 38 is bent to the inside and an engaging groove 40 is formed there. This engaging groove 40 functions to engage with an engaging groove 30 of the hose 12 through the lock ring 42.

Figure 15B:
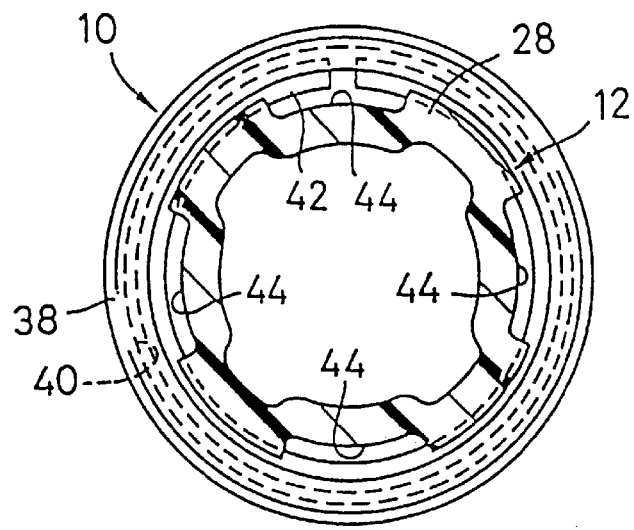
Figure 15C:
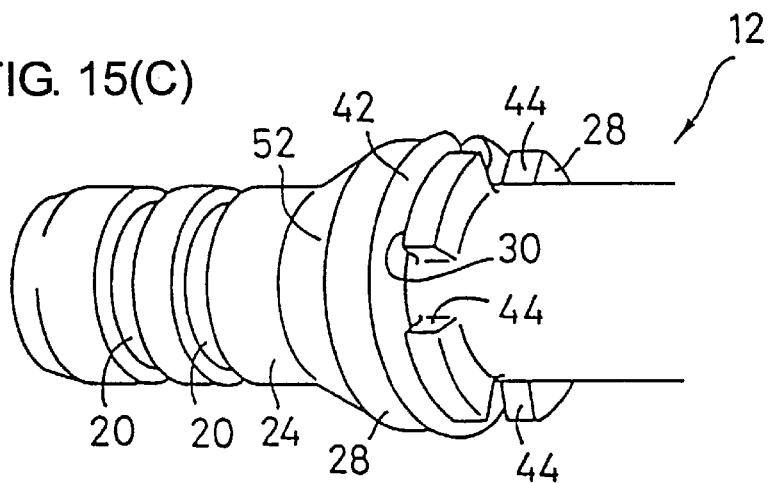

As shown in FIGS. 15(B) and 15(C), around the projection 28 of the hose 12, four notches 44 are formed in four spots respectively. By these notches 44, the enlarged diameter can be handled.

Figure 16A:
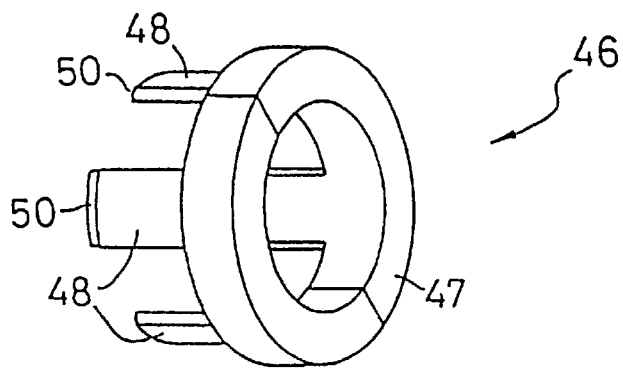
FIGS. 16(A) to (C) are drawings for showing the method for drawing out the hose of the hose connecting structure of the Third Embodiment according to the present invention.

FIG. 16(A) shows the tool for enlarging the diameter of the lock ring 42. As shown in FIG. 16(A), this tool comprises the ring-shaped portion 47 comprising two parts which can be divided in the direction which is perpendicular to the axis, four claws 48 which extend from this ring-shaped portion 47 and four taper-shaped guide surfaces 50 at the tips of these claws 48 respectively.

Figure 16B:
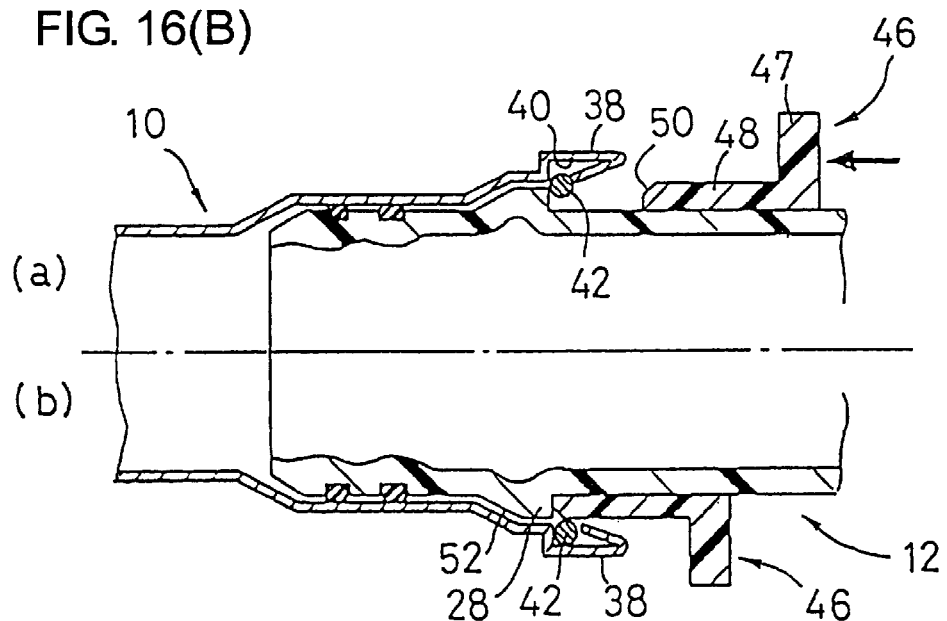
Figure 16C:
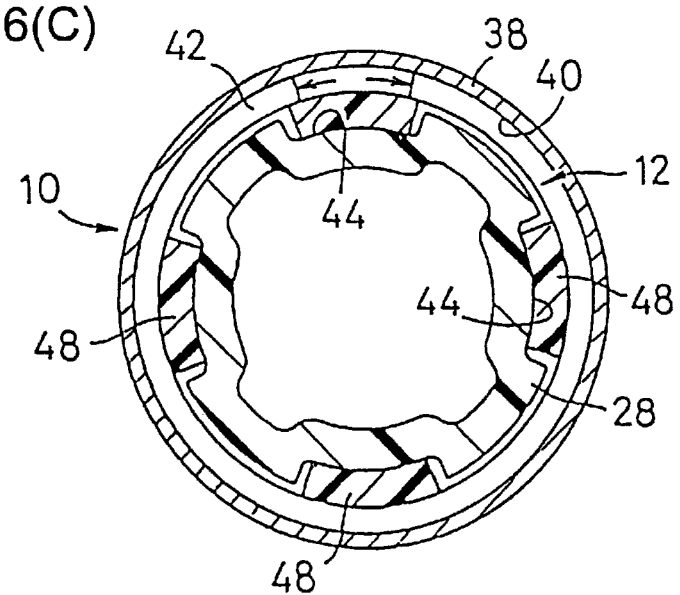

In this embodiment, the engagement between the engaging grooves 30 and 40 is released as follows: As shown in FIG. 16(B), the tool 46 is installed at the outer surface of the hose 12 and the claws 48 are positioned at the place corresponding to the notches 44. In the above-mentioned situation, if the tool is pushed in the axial direction (the left direction shown by the arrow in FIG. 16(B)), the lock ring 42 is extended by the effect of the guide surfaces 50 of the tips of the claws 48, as shown in FIG. 16(C). The lock ring 42 is released from the engaging groove 30. Accordingly, the engagement of the engaging grooves 30 and 40 is released. In this way, the hose 12 can be disengaged from the mating member 10 by relatively shifting the hose 12 in the right direction.

When connecting the hose 12 to the mating member, it is only necessary to insert the hose 12 in the left direction shown in FIG. 16(B). At first, the lock ring 42 is secured in the inside of the engaging groove 40 of the mating member 10. Then the hose 12 is inserted to the left direction shown in FIG. 16(B), and the lock ring 42 is once extended by the effect of taper-shaped guide surface 52 of the projection 28 which is at the front side of the those 12. The lock ring 42 has its diameter reduced in the free condition by the effect of its elasticity at the same time as the passage of the projection 28 at the front side. And the engaging groove 40 and 30 are engaged. Accordingly, the lock ring 42 gets into the use condition.

Next, FIG. 17 shows some other modifications of the above-mentioned lock ring.

Figure 17A:
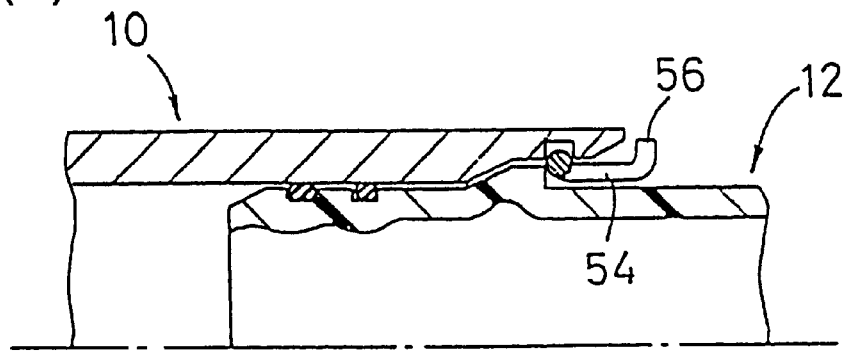
FIGS. 17(A) to (C) are drawings for showing three kinds of other representative lock rings which are used for the hose connecting structure of the Third Embodiment.
Figure 17B:
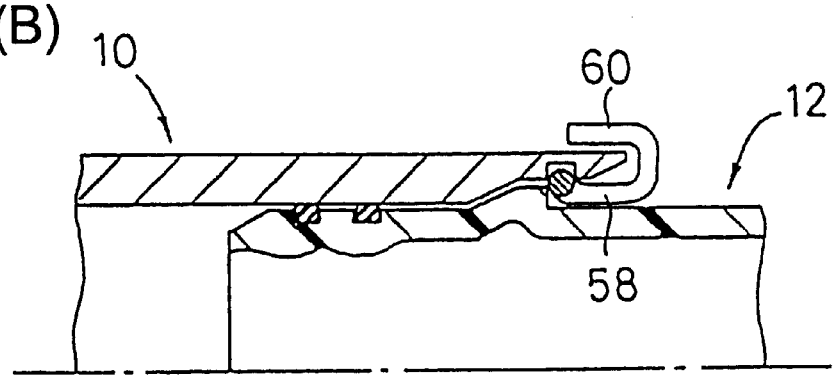

FIG. 17(A) shows the modification in which the operation handle 54 of the lock ring is in the shape having the curved return portion 56 curved in a radially outside direction. FIG. 17(B) shows the modification in which the operation handle 58 of the lock ring is in the shape having the curved rising portion 60 which is exposed on the outer peripheral surface of the mating member 10.

Figure 17C:
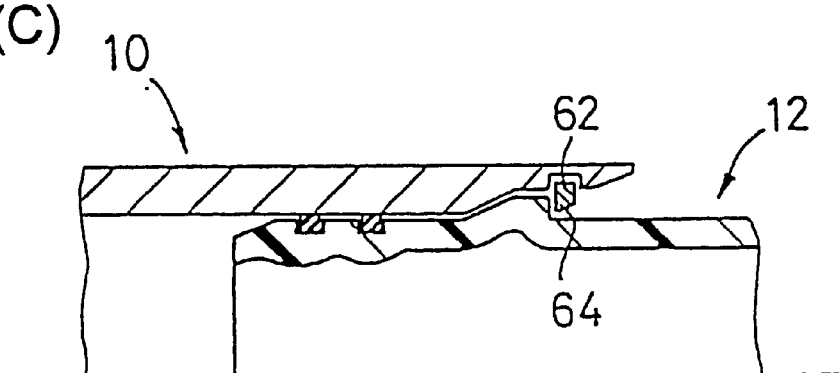
Figure 17D:
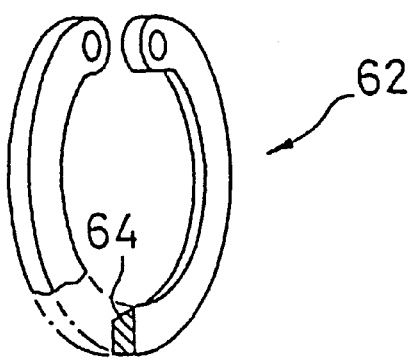

FIG. 17(C) shows the modification in which the lock ring 62 has a rectangular shape in its cross section and the inner peripheral surface of the lock ring 62 has tapered surface 64 whose diameter is gradually enlarged toward the opening end of the mating member 10.

The above-mentioned lock rings are secured to the engaging groove of the mating member 10 prior to the insertion of the tip portion of the hose 12.

Figure 18A:
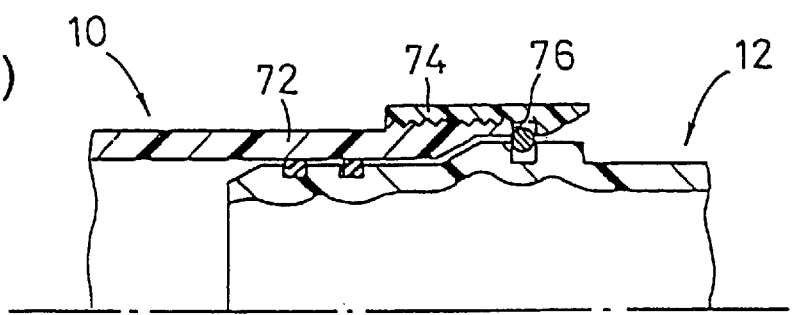
FIGS. 18(A) and (B) are drawings for showing two kinds of other representative mating members which are used for the hose connecting structure of the Third Embodiment.
Figure 18B:
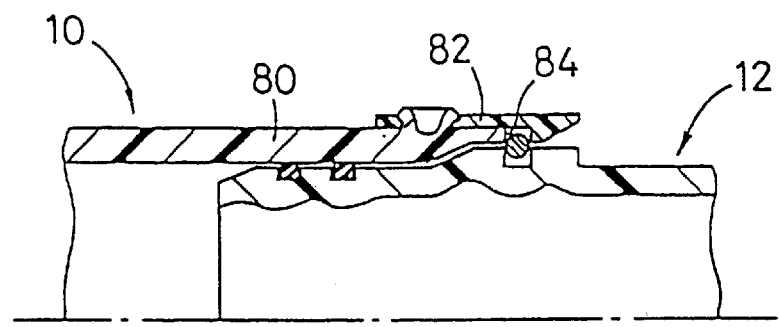
FIG. 18(B) is a cross sectional view when the other mating member is used.

FIG. 18 shows some modifications of the mating member 10. In FIG. 18(A), the edge portion member 74 as the separate member is fixed to the body 72 of the mating member 10, comprising resin, by screwing. The engaging groove 76 is composed of the body 72 and the tip portion member 74. In FIG. 18(B), a part of the body portion 80 of the mating member 10 comprising resin projects to the outside from the through hole. The body portion 80 and the edge portion member 82 are mutually fixed and the engaging groove 84 is composed of the body portion 80 and the edge portion member 82.

The Fourth Embodiment

The hose connecting structure in the Fourth Embodiment of this invention will be hereinafter described with reference to FIG. 19. The hose connecting structure of this Embodiment comprises a hose 10, a mating member 22 and two O-rings 14 and 14 and a lock ring 30.

The hose 10 is a blow molded hose having a predetermined curved shape which is formed by blow molding the whole of the hose. This hose 12 has a bellows portion 13 at the middle portion thereof. This bellows portion mainly comprises a soft resin material and the rest of the portion mainly comprises a hard resin material. The cross-sectional structure of the hose 12 can be a single layer structure or a lamination layer structure having a plurality of layers.

On edge portion periphery surface 15 of the hose 10, two O-ring grooves 12 and 12 are formed and two O-rings 14 and 14 are attached to the O-ring grooves 12 and 12 respectively. The edge portion periphery surface 15 of the hose 10 engages with the inner surface 17 of the mating member 22 through these O-rings 14 and 14. When the O-ring 14 is used for a filler hose, it is better to use materials such as NBR and FKM which are superior in oil resistance and gasoline resistance. O-ring 14 can comprise other materials.

The hose 10 is provided with a flange portion 16 formed at the region which is near to the rear side of the O-rings 12 and 12, and this flange portion 16 is formed by a part of the hose 10 projecting in a radially outside direction.

The edge side surface of this flange portion 16 comprises a tapered guide surface 18 whose diameter is gradually enlarged toward the edge side of the hose 10. This guide surface 18 also functions as the stopper surface which controls an excess push.

The first engaging groove 20 is formed at the outer surface of the portion which is at the edge side compared with the position of the O-ring grooves 14 and 14.

The mating member 22 comprises metal and has a pipe shape. The mating member comprises two parts, namely, a body 24 and the edge portion member 26. This edge portion member 26 is fixed to the body 24 by screwing. The body 24 and the edge portion member 26 form the second engaging groove 28 which corresponds to the first engaging groove 20 at the hose 10.

Figure 20A:
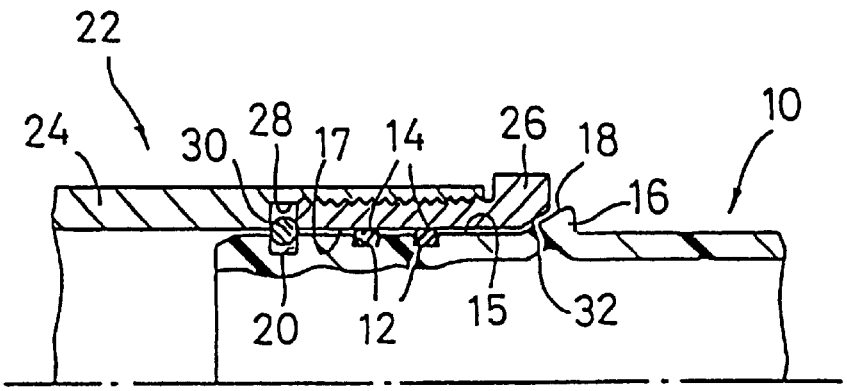
FIGS. 20(A) to (D) are drawings for showing other representative hoses and other representative mating members which are used for the hose connecting structure of the Fourth Embodiment.

The second engaging groove 28 and the first engaging groove 20 are moved together in the axial direction through the lock ring 30 which can be elastically deformed in the radial direction. The hose 10 is prevented from being disengaged from the mating member 22. This state is shown in FIG. 20(A).

Said edge portion member 26 is treated as the sealing surface whose inner surface is in contact with the O-rings 14 and 14. At the edge portion (in FIG. 20, the right edge portion) of the edge portion member 26, a tapered guide surface 32, which corresponds to the guide surface 18 of the hose, is formed.

This guide surface 32 also functions to control an excess push of the hose 10 together with the guide surface 18 of the hose's flange portion 16.

Figure 19:
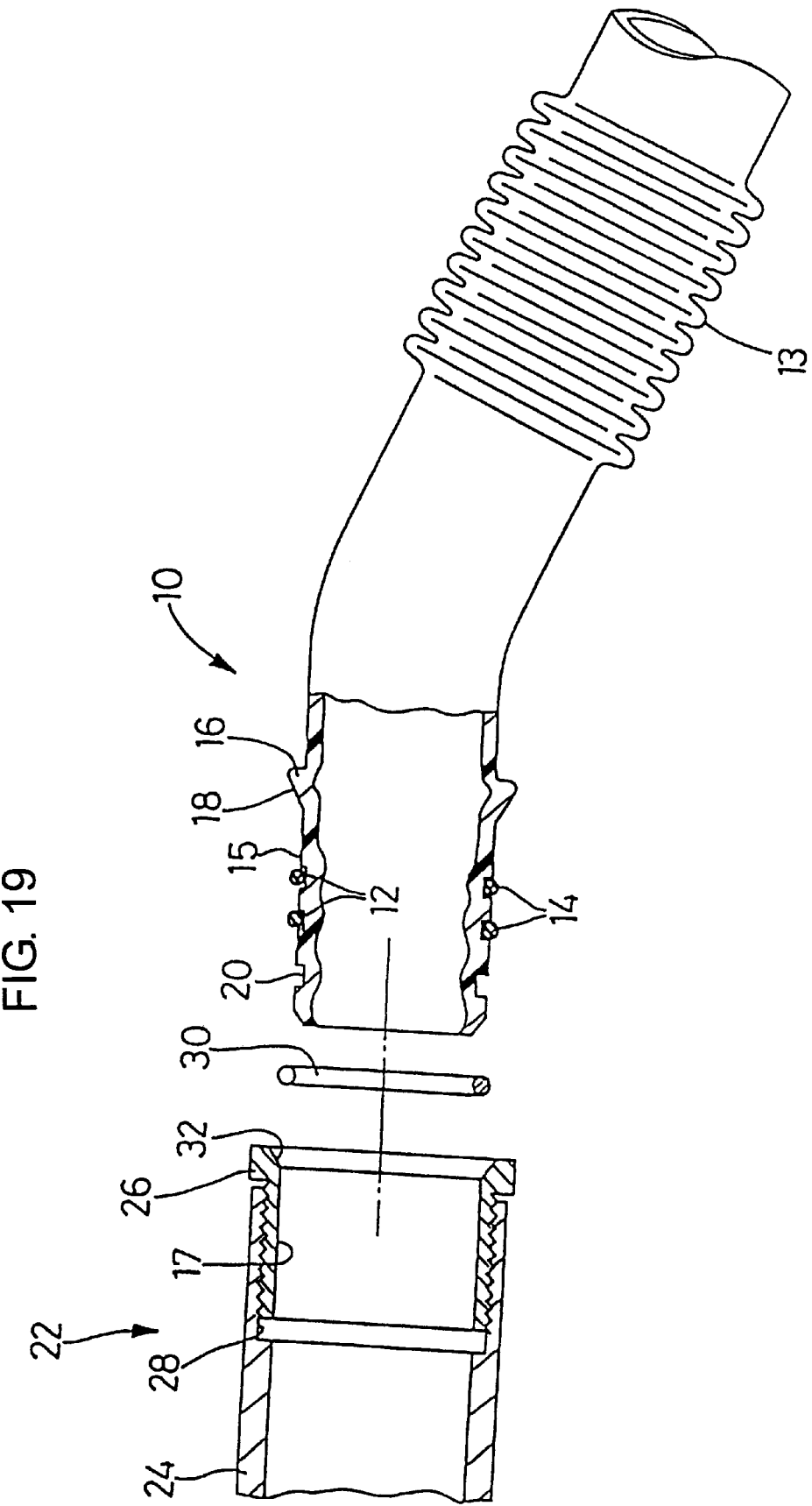
FIG. 19 is a drawing for showing the hose connecting structure of the Fourth Embodiment according to the present invention.

In the hose connecting structure of this embodiment, as shown in FIG. 19, the lock ring 30 which is separated from the hose is attached to the first engaging groove 20 of the hose at first. In this state, the edge portion of the hose 10 is pushed into the inside of the mating member 22. The diameter of the lock ring 30 is once reduced by the effect of the guide surface 32 of the tip of the mating member 22. The edge portion of the hose 10 together with the hose 10 is inserted into the inside of the mating member 22. Then when the edge portion of the hose 10 reaches the second engaging groove 28, the edge portion of the hose 10 is subjected to expanding deformation by its elasticity and part of it gets into the inside of the second engaging groove 28. Namely, the first engaging groove 20 at the side of the hose 10 and the second engaging groove 28 at the side of the mating member 22 are engaged in the axial direction through the lock ring 30. Accordingly, the hose 10 is prevented from being disengaged.

It may be also possible to conduct the insertion and connection of the hose 10 by holding the lock ring 30 by the second engaging groove 28 of the mating member 22.

In the hose connecting structure of this embodiment, when the edge portion of the hose 10 is pushed into the inside of the mating member 22, O-rings 14 and 14 don't pass through the second engaging groove 28. Accordingly, O-rings 14 and 14 are not damaged by the contact of the O-rings 14 and 14 and the second engaging groove 28 or by the connection being made. Accordingly the sealing capacity is not damaged by the position of the O-rings 14 and 14.

The opening of the second engaging groove 28 can be provided at the same radial position as the position of the sealing surface which is in contact with the O-rings 14 and 14. Accordingly, the structure and the shape of the second engaging groove 28 and the periphery of it can be simply formed.

For example as shown in FIG. 15, the first engaging groove 30 at the side of the hose 12 is provided at the rear side compared with the O-rings 22 and 22, and the second engaging groove 40 of the side of the mating member 10 is provided at the corresponding position of the first engaging groove 30. In this case, when the edge portion of the hose 12 is pushed, O-rings 22 and 22 pass through the second engaging groove 40, so the opening of the second engaging groove 40 must be placed at the position running off in a radially outside direction.

As shown in FIG. 100, the above-mentioned structure complicates the structure around the second engaging groove 108 and it also enlarges the peripheral diameter of the second engaging groove 108.

The present embodiment doesn't cause the above-mentioned nonconformity.

When the hose 10 needs to be pulled out from the mating member 22, the edge portion member 26 is removed as the separate member from the body portion 24 of the mating member 22 and the hose 10 can be pulled out from the body portion 24.

In the hose connecting structure of this embodiment, there is no disadvantage that the hose 10 is disengaged from the mating member 22 owing to an accidental external force.

This embodiment has another advantage in that it is easy to treat the sealing surface at the side of the mating member 22 which is in contact with the O-rings 14 and 14. In this embodiment, the inner surface of the edge portion member 26 forms the sealing surface. Accordingly, it is possible to treat the sealing surface in the state in which the edge portion member 26 is separated from the body portion 24.

In the hose connecting structure of this embodiment, the edge portion of the hose 10 is engaged with the mating member 22 through the O-rings 14 and 14. Accordingly, the sealing is secured without the elastic contacting of the hose 10 and the mating member 22, so even though the edge portion of the hose 10 comprises a hard resin material, sufficient sealing can be obtained. The selecting of materials of the hose 10 and its edge portion can be conducted more freely.

In the hose connecting structure of this embodiment, the edge portion of the hose, O-ring grooves 14 and 14, the flange portion 16, and the first engaging groove 20 are formed by blow molding. Accordingly, they are formed at the same time as the body portion of the hose 10 is formed by the same blow molding. Accordingly it is advantageous in reducing production cost.

Figure 20B:
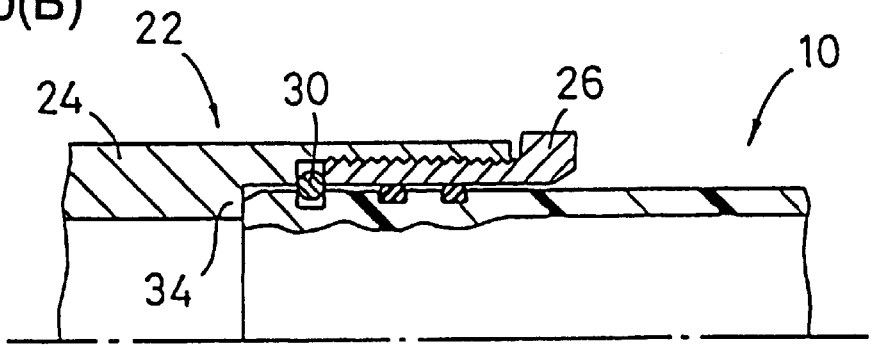

Next, FIGS. 20(B), (C) and (D) show other modifications of the hose 10 and the mating member 22 in this embodiment.

In FIG. 20(B), a stepped portion 34 is provided at the mating member 22 and this stepped portion 34 functions as the stopper portion 34 to control an excess push of the hose 10. The flange portion 16 shown in FIG. 20(A) is not provided at the hose 10.

Figure 20C:
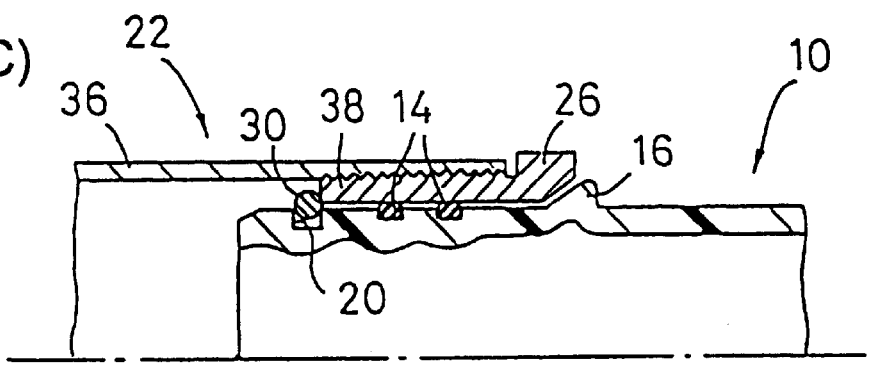

In FIG. 20(C), the edge portion member 26 which is screwed in the body 36 of the mating member 22 projects in a radially inside direction, and this forms the engaging groove 38 as the second engaging portion. FIG. 20(C) shows the example in which the edge surface of the engaging projection 38 is engaged with the first engaging groove 20 at the side of the hose 10 through the lock ring 30.

Figure 20D:
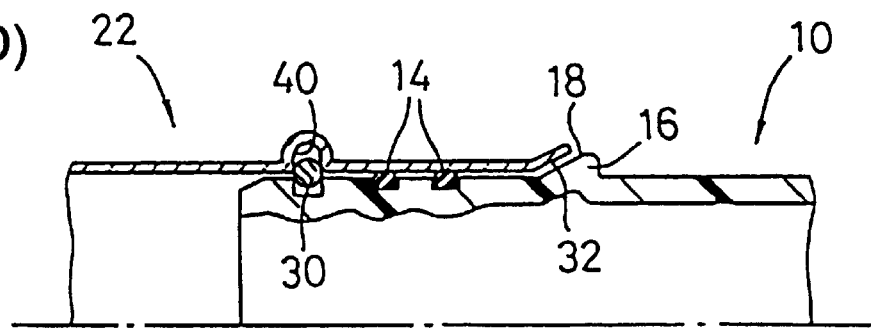

Furthermore, FIG. 20(D) shows the modification in which the part of the inner surface of the mating member 22 projects radially outside in the ring shape and the second engaging groove 40 is formed at the inner surface side of this projection. The edge portion of the mating member 22 is expanded to have an enlarged diameter in the tapered shape, and the guide surface 32 which also functions as a stopper surface is formed there.

The Fifth Embodiment

Figure 21A:
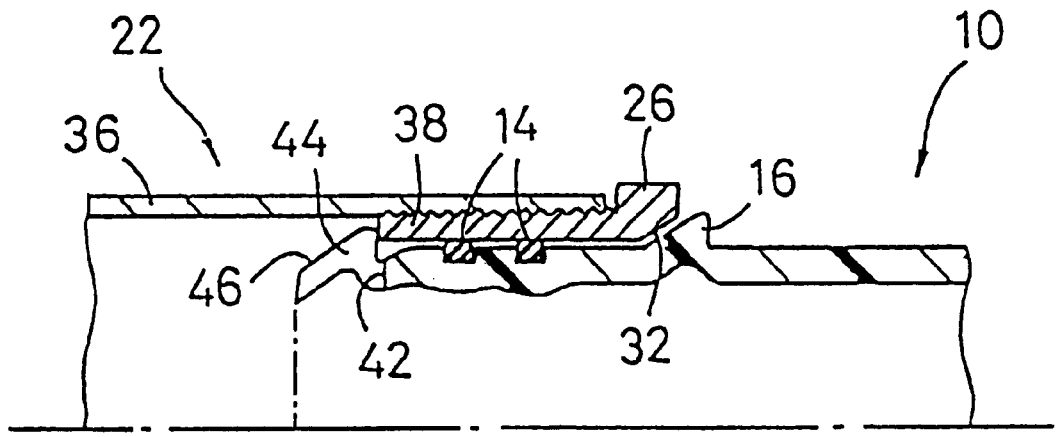
FIGS. 21(A) and (B) are drawings for showing the hose connecting structure of the Fifth Embodiment according to the present invention.

The hose connecting structure of the Fifth Embodiment of the present invention is shown in FIG. 21. As shown in FIG. 21(A), the hose connecting structure of this embodiment comprises a hose 10, a mating member 22 and two O-rings 14 and 14. The edge of the hose 10 is expanded to have an enlarged diameter and also provided with a plurality of slits 42 at the enlarged-diameter portion around the circumference. This forms a plurality of elastic engaging claws 44. These elastic engaging claws 44 are directly engaged with the engaging protection 38 of the mating member 22 and hose 10 is prevented from being disengaged.

Figure 21B:
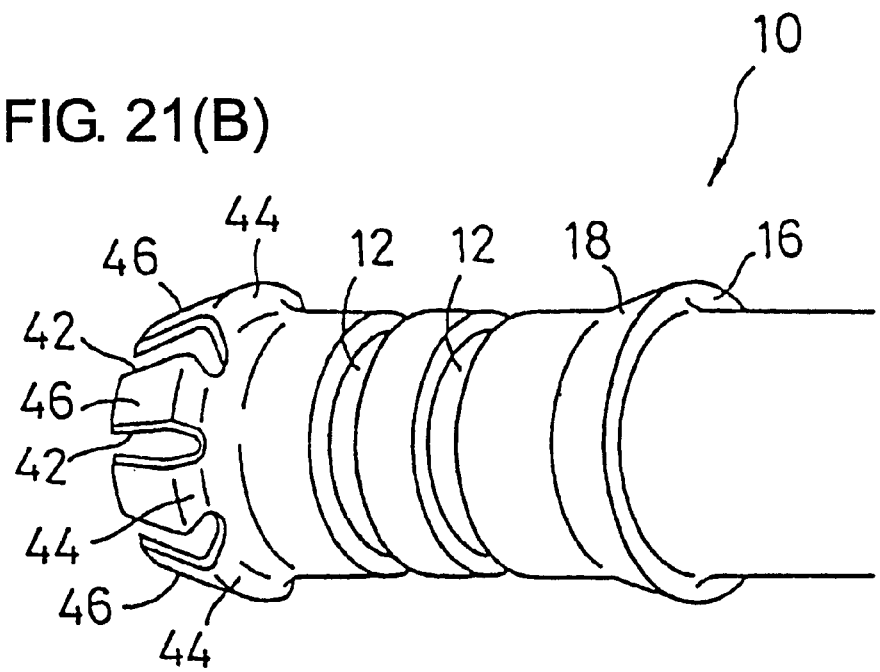
FIG. 21(B) is a perspective view for showing the edge portion of the resin hose.

As shown in FIG. 21(B), at the elastic engaging claws 44, the guide surfaces 46 whose diameter are gradually reduced as they reach the edge side are formed. These guide surfaces 46 function to conduct the deformation of reducing diameter to the elastic claws of the hose 10 together with the guide surface 32 of the mating member 22 when the hose 10 is pushed into the inside of the mating member 22.

In the stepped portion 34 is provided at the mating member 22 to function as the stopper for controlling the excess push of the hose, as shown in FIG. 20(B), it is possible to eliminate the flange portion 16 shown in FIG. 21(A) in this embodiment.

FIG. 22 shows other representative mating members. In FIG. 22(A), the edge portion member 26 is fixed by screwing to the body 34 so as to press a ring sealing member 48. In FIG. 22(B), an edge portion member 52 is inserted into the body 34 so as to press a sealing member 50 and be pressed by a bolt 54.

Figure 22A:
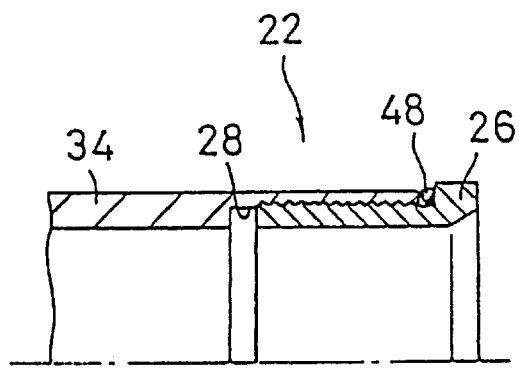
FIGS. 22(A) to (D) are drawings for showing other representative hoses and other representative mating members which are used for the hose connecting structure of the Fifth Embodiment.
Figure 22B:
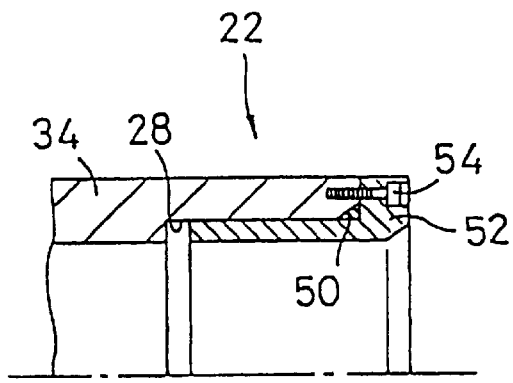
Figure 22C:
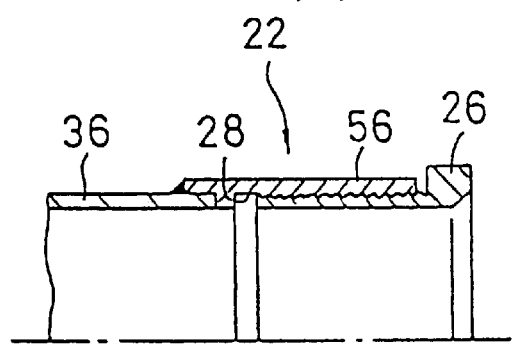
Figure 22D:
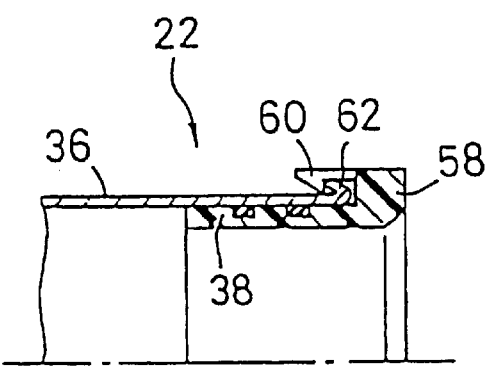

In FIG. 22(C), a separate member 56 is fixed to the body 36 by welding and the edge portion 26 is fixed by screwing to this separate member 56. In FIG. 22(D), the edge portion member 58 comprising resin is inserted into the body 36, the edge portion member is fixed to the body 36 by engaging claws 60 and 62 and so an engaging projection 38 is formed.

Figure 22E:
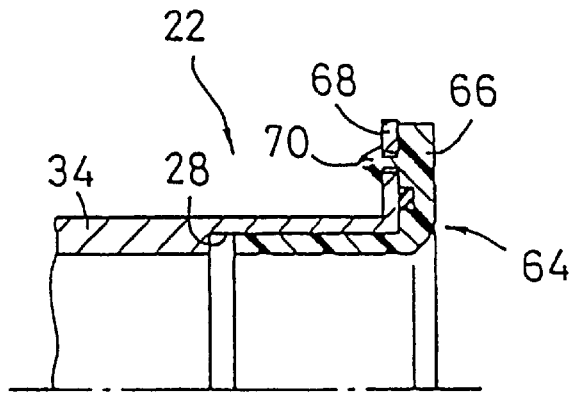
FIG. 22(E) is a main cross sectional view for showing a further hose and a further mating member.

In FIG. 22(E), a flange 66 of an edge portion member 64 is adhered to a flange 68 formed at the body 34, a projection 70 provided at the flange 68 projects outwardly compared with the through hole of the flange 68 provided at the side of the body 34, and so this edge portion member 64 is fixed to the body 34.

Figure 22F:
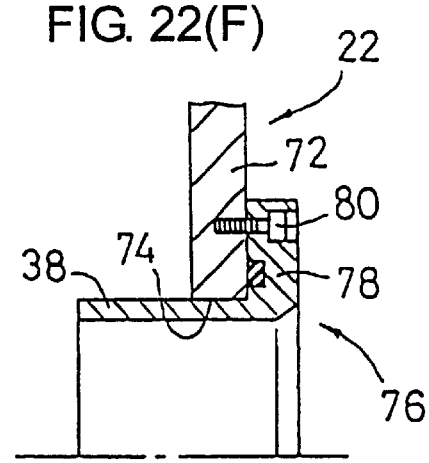
FIG. 22(F) is a main cross sectional view for showing a further hose and a further mating member.

Furthermore in FIG. 22(F), a cylinder member 76 is inserted into an opening 74 of a plate-shaped body 72 and this portion is fixed to a body 72 by a bolt 80.

In the hose connecting structure of the Fourth Embodiment and Fifth Embodiment, it is essential that the engaging member is positioned at an edge side compared with the portion at which the sealing member is held. It is preferable to use the blow-molded hose whose outer surface having high dimensional accuracy is used as the engaging surface. In these embodiments, it is also possible to use hoses formed by methods other than blow molding or insert the inner surface of the hose into the outer surface of the mating member so as to connect them.

In the case of using hoses other than blow molded hoses, it is possible to use the hose whose only edge portion is injection molded or to hold an O-ring for sealing at the side of the mating member.

The Sixth Embodiment

Figure 23A:
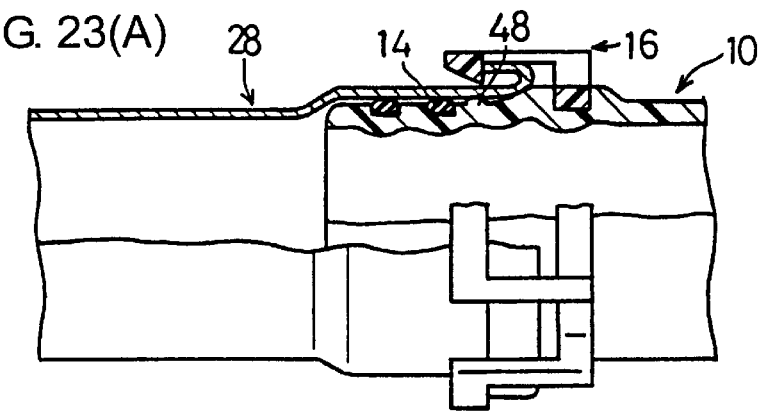
FIGS. 23(A) and (B) are drawings for showing the hose connecting structure of the Sixth Embodiment according to the present invention.
Figure 23B:
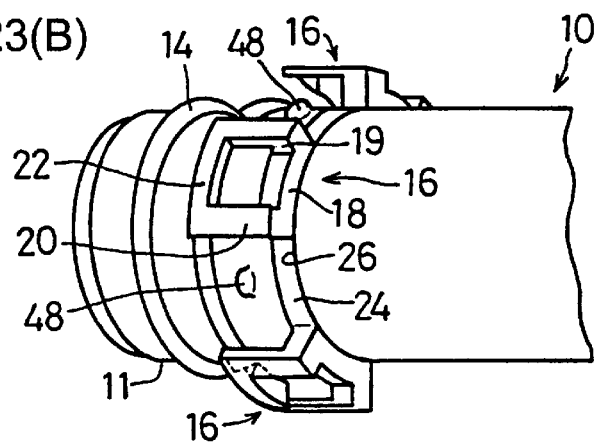
FIG. 23(B) is a perspective view for showing the edge portion of the resin hose.

FIG. 23 shows the representative modification showing the connecting structure of the resin hose, of this invention, which is provided with the function of preventing backlash. The connecting structure shown in FIG. 23 is the improvement of the structure shown in FIG. 1(A). Only the improved parts will be hereinafter described. The rest of the parts are the same structure as that of the First Embodiment. As shown in FIG. 23(B), four projections 48 are provided in this embodiment. These projections 48 are provided at regular intervals around the outer peripheral surface of the hose 10 which is positioned between the first engaging portion 16 of the hose 10 and O-rings 14 and 14. The diameter passing through the apices of these projections is larger than the inner diameter of the inner peripheral surface of the mating member 28 which is engaged with these projections. Accordingly, in the state in which the tip of the hose 10 is inserted into and engaged to the opening of the mating member 28, these projections 48 are pressed by the inner peripheral surface of the mating member 28 and elastically deformed. Owing to this elastic deformation, the hose 10 and the mating member 28 are engaged without having the backlash in the direction which is perpendicular to the axis.

Figure 24A:
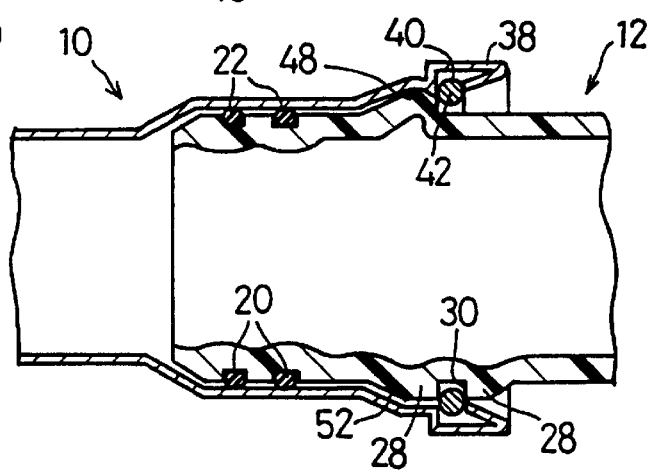
FIGS. 24(A) and (B) are drawings for showing the modifications of the hose connecting structure of the Sixth Embodiment.
Figure 24B:
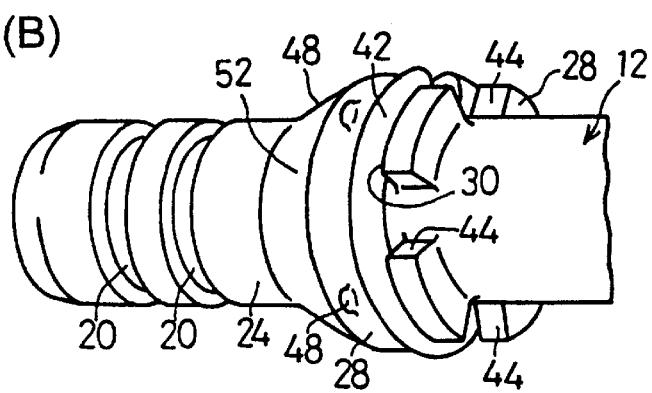
FIG. 24(B) is a perspective view for showing the edge portion of the resin hose.

The above-mentioned projections 48 which prevent backlash in the direction which is perpendicular to the axis are not limited to apply to the connecting structure of the resin hose shown in FIG. 1. Fore instance, these projections may be applied to the connecting structure of the resin hose shown in FIG. 15(A). FIG. 24(A) and 24(B) show the above-mentioned modification. In this modification, four projections 48 are provided at the outer peripheral surface of the hose 12.

Figure 25A:
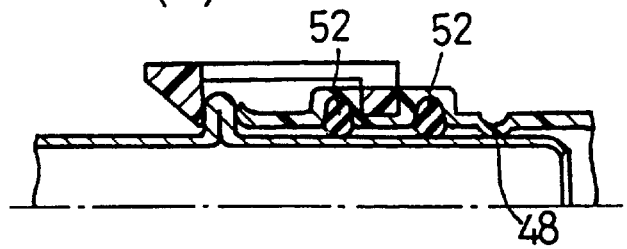
FIGS. 25(A) to (C) are drawings for showing further modifications of the hose connecting structure of the Sixth Embodiment.
Figure 25B:
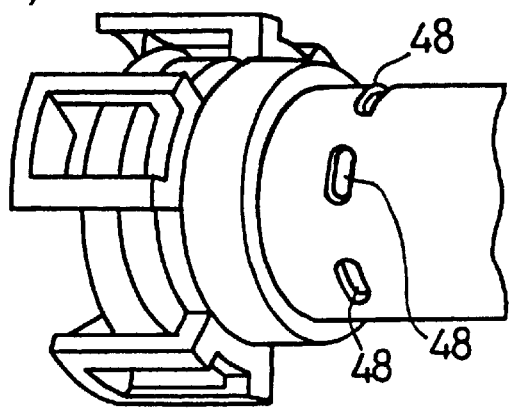
Figure 25C:
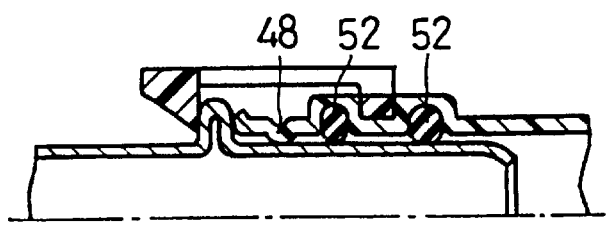

FIGS. 25(A) and 25(B) show another modification in which the projections 48 are provided on another connecting structure. In this modification, the peripheral surface of the resin hose is the engaging surface. In blow molding, the inner peripheral surface of the blow molded hose is not subjected to die forming on the surface of the forming die. Accordingly, dimensional accuracy is low in blow molding. But owing to these projections 48, the backlash between the hose and the mating member in the vertical direction against the axial direction is prevented from being generated. Furthermore, the sealing capacity is obtained by adopting the Y-shaped seal ring 52. FIG. 25(C) shows the modification in which the positions of forming projection 48 are shifted.

Figure 26:
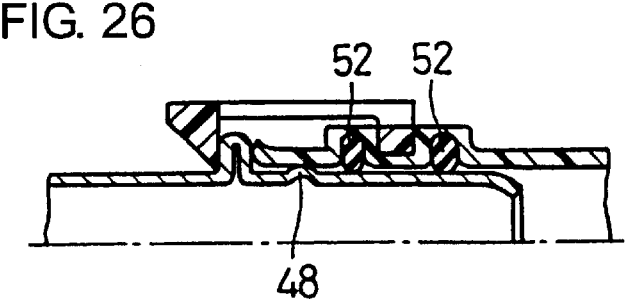
FIG. 26 is a cross sectional view for showing a further modification of the hose connecting structure of the Sixth Embodiment.

In FIG. 26, the projections 48 are formed at the mating member 48. Owing to these projections 48, the engaging surface of the resin hose is pressed, elastically deformed and constantly connected with the mating member. Accordingly the backlash is prevented from being generated.

The Seventh Embodiment

Figure 27A:
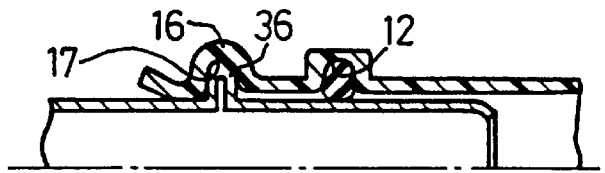
FIGS. 27(A) and (B) are drawings for showing the hose connecting structure of the Seventh Embodiment according to the present invention.

FIG. 27(A) shows another embodiment which prevents the backlash at the engaging portion in the direction which is perpendicular to the axis. In this connecting structure of the resin hose, the engaging portion 16 of the resin hose is utilized. In this resin hose, an O-ring groove 12 is formed at the inner peripheral surface side of the resin hose, and the first engaging portion 16 is formed at the tip portion thereof. The first engaging portion 16 comprises a plurality of arms divided in the circumferential direction by the slits extending in the axial direction. Each of the arms extend at the inner peripheral surface side and in the circumferential direction, so as a whole, an engaging groove 17 which extends around the inner peripheral surface is formed. The maximum inside diameter at the bottom of this engaging groove 17 is smaller than the maximum outside diameter of the ring projection which comprises the second engaging portion 36 of the mating member. Accordingly, when the first engaging portions 16 and the engaged portion 36 are engaged, the diameter of the first engaged portion 16 is elastically enlarged. This elastic deformation prevents the backlash in the direction which is perpendicular to the axis from being generated.

Figure 27B:
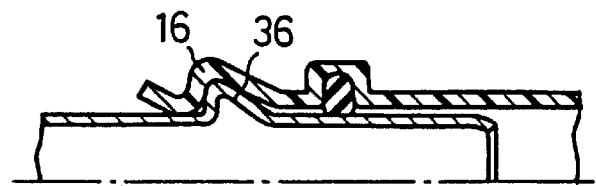
FIG. 27(B) is a main cross sectional view for showing the modification.

FIG. 27(B) shows the modification of FIG. 27(A). In this modification, only the shapes of the first engaging portion 16 and the second engaging portion 36 are different from those shown in FIG. 27(A). So in the same way as that in FIG. 27(A), the diameter of the first engaging portion 16 is elastically enlarged and this elastic deformation prevents the backlash in the direction which is perpendicular to the axis from being generated.

Figure 28A:
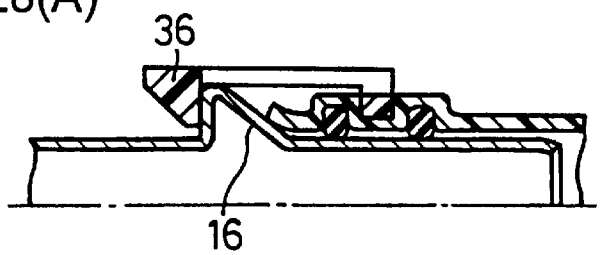
FIGS. 28(A) to (C) are drawings for showing three kinds of modifications of the hose connecting structure of the Seventh Embodiment.

FIG. 28(A) shows still another modification. The elastic deformation of the second engaging portion 36 is utilized in this modification. When no force is affected on the second engaging portion 36, the claw portion at the tip thereof is inclined to the shaft center direction. So the second engaging portion is engaged with the first engaging portion and the diameter of the second engaging portion is elastically enlarged. This elastic deformation prevents backlash in the direction which is perpendicular to the axis from being generated.

Figure 28B:
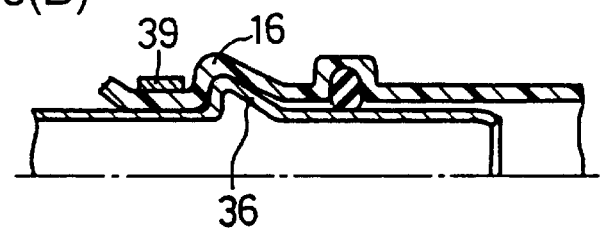

FIG. 28(B) shows still another modification. A band is provided at the peripheral surface of the tip portion of the first engaging groove 16. The first engaging portion 16 is pressed in the shaft center direction and elastically deformed so that it is connected with the outer peripheral surface of the mating member. This prevents the backlash in the direction which is perpendicular to the axis from being generated.

Figure 28C:
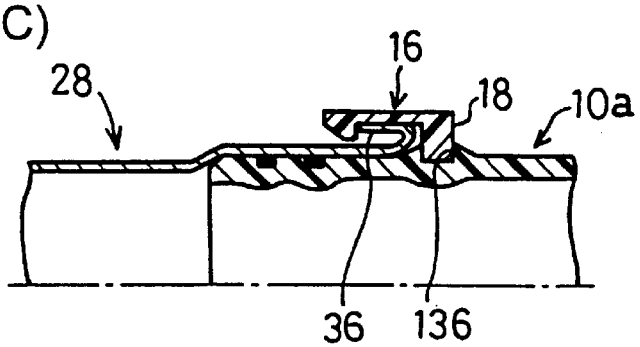

FIG. 28(C) shows still another modification. In this modification, the elastic deformation of the first engaging portion 16 and the second engaging portion 36 formed by metallic pipe is utilized. The cross section of the second engaging portion 36 is bent so as to be formed in a U shape. The second engaging portion 36 is compressed in the direction which is perpendicular to the axis by the surface of the shaft center side of the first engaging portion 16 and the outer peripheral surface of the resin hose. This prevents the backlash at the connecting portion from being generated.

Figure 29A:
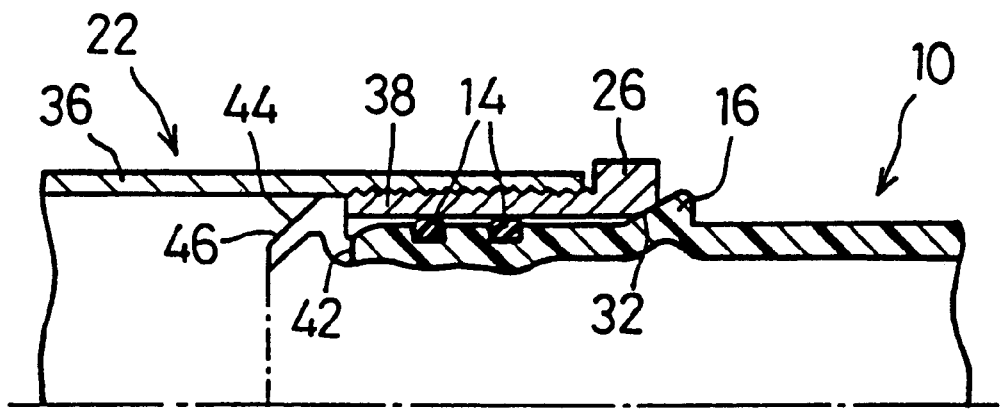
FIG. 29 is a drawing for showing a further modification of the hose connecting structure of the Seventh Embodiment.

FIG. 29 shows the modification in which the outer peripheral surface of the resin hose is the engaging surface. The first engaging portion 44 at the tip portion is pressed by the inner surface of he mating member and it is elastically deformed in the shaft center direction. This prevents the backlash in the direction which is perpendicular to the axis from being generated.

The Eighth Embodiment

Figure 30A:
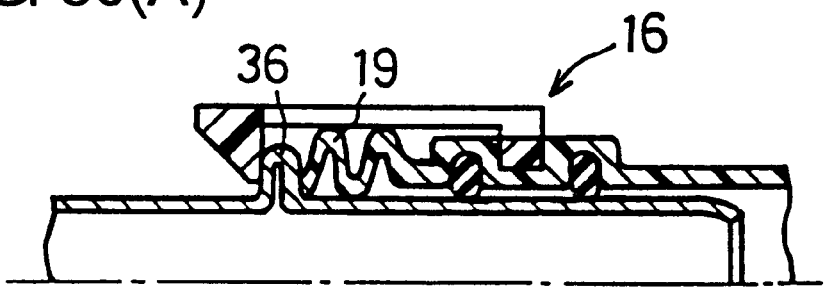
FIGS. 30(A) and (B) are drawings for showing the hose connecting structure of the Eighth Embodiment according to the present invention.
Figure 30B:
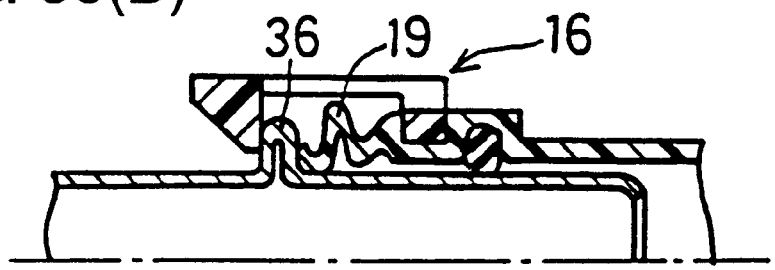
FIG. 30(B) is a main cross sectional view of the modification.

FIG. 30 shows the embodiment in which the backlash at the engaging portion in the axial direction is prevented from being generated. Both in FIGS. 30(A) and 30(B), a bellows portion 19 is formed at the tip portion of the resin hose. This bellows portion is compressed and elastically deformed in the axial direction. In FIGS. 30(A) and 30(B), the bellows portion 19 is pressed in the axial direction and the tensile stress as its reaction force is transferred to the first engaging portion 16 in the axial direction.

Figure 31:
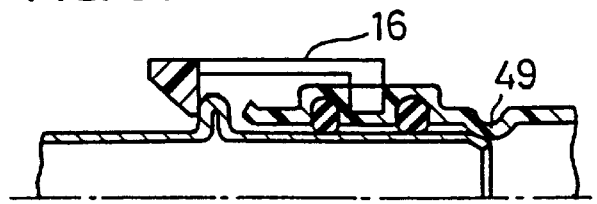
FIG. 31 is a drawing for showing the modification of the hose connecting structure of the Eight Embodiment.

FIG. 31 shows another modification. In this modification, a ring projection 47 which projects to the inner peripheral surface side of the resin hose is provided. The elastic deformation of this projection 47 is utilized. When the mating member is engaged, the tip of the mating member comes in contact with the inclined surface at the tip side of the projection 47, and presses it in the axial direction. This causes the elastic deformation of the projection 47 and at the same time the portion of the resin hose, which is positioned between the projection 47 and the base of the first engaging portion 16, is elastically extended. The tensile stress is acted on the first engaging portion in the axial direction. The engaging portion of the mating member is compressed in the axial direction. This prevents the backlash in the axial direction from being generated.

Figure 32:
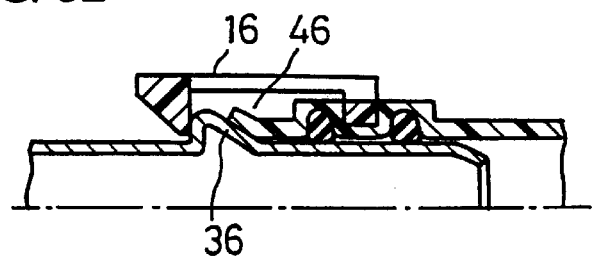
FIG. 32 is a drawing for showing a further modification of the hose connecting structure of the Eighth Embodiment.

FIG. 32 shows still another modification. In this modification, the tip of the resin hose is pressed in the axial direction to the taper-shaped slope of the second engaging portion 36 of the mating member. Accordingly, the tip portion of the resin hose is elastically compressed and deformed in the axial direction. The tensile stress in the axial direction is transferred to the first engaging portion 16. The second engaging portion of the mating member is compressed from both sides in the axial direction.

Figure 33A:
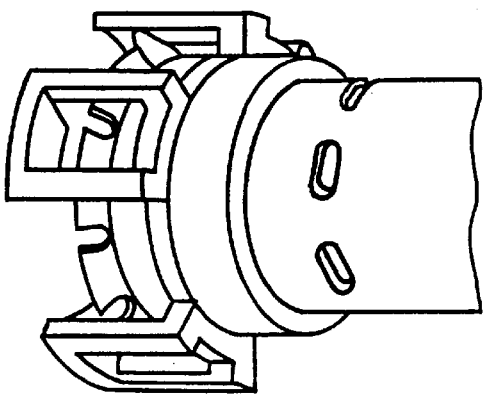
FIGS. 33(A) and (B) are drawings for showing further modifications of the hose connecting structure of the Eighth Embodiment.
Figure 33B:
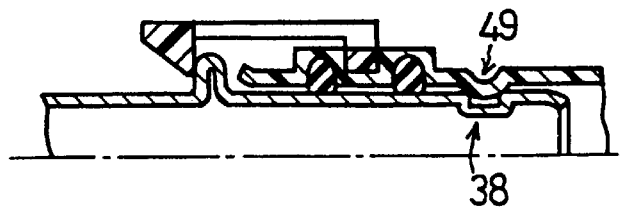
FIG. 33(B) is a perspective view for showing the edge portion of the hose.
Figure 33C:
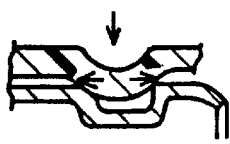
FIG. 33(C) is a main enlarged cross sectional view.

FIG. 33 shows still another modification. An irregular engagement is utilized in this modification. As shown in FIGS. 33(A) and 33(B), on the engaging surface of the resin hose, relatively wide projection 49 which goes around the inner peripheral surface thereof is formed. At the engaging portion of the mating member, a groove 38, whose cross section is rectangular and into which the top of the projection 49 enters, is formed. In the state in which the projection 49 and the groove 38 are engaged, as shown in FIG. 33(C) showing the enlarged main part, the slopes on both sides of the top of the projection 49 are in contact with both edge surfaces of the groove 38 whose cross section is a rectangle. And also these slopes are pressed in the axial direction. Accordingly this prevents the backlash in the axial direction from being generated.

The Ninth Embodiment

FIG. 34 shows the embodiment in which the outer peripheral surface of the resin hose is the engaging surface and in which the backlash at the engaging portion in the axial direction is prevented from being generated. FIG. 34(A) shows the modification in which the ring projection 49, provided on the outer peripheral surface, is utilized. This projection 49 is pressed by the tip portion of the mating member and is deformed by compressing in the axial direction. The tensile stress is acted on the first engaging portion 16 in the axial direction. Accordingly the backlash in the axial direction is prevented from being generated. In this case, ring projection 49 is compressed in the vertical direction against the axial direction, so the backlash in the vertical direction against the axial direction is prevented.

Figure 34A:
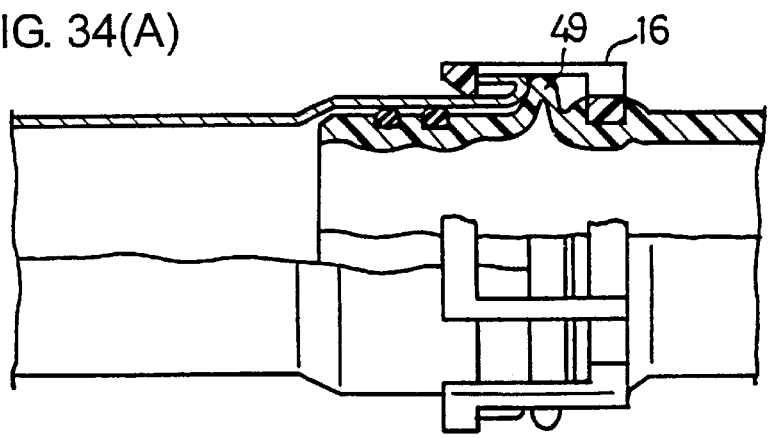
FIGS. 34(A) to (D) are drawings for showing the hose connecting structure of the Ninth Embodiment and the modification.
Figure 34B:
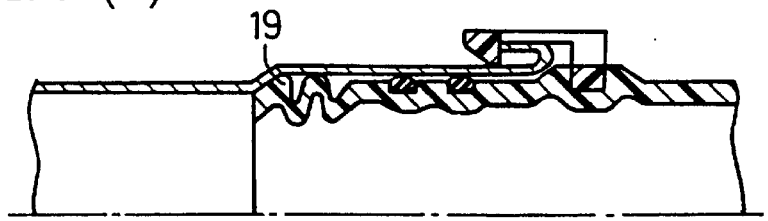

FIG. 34(B) shows the modification in which a bellows portion 19, which is provided on the tip portion of the resin hose, is utilized. The bellows portion 19 is compressed between the enlarged-diameter portion of the mating member and the base of the first engaging portion 16 and it is elastically deformed by compressing. The tensile stress is acted on the first engaging portion 16 and on the engaging portion of the mating member.

Figure 34C:
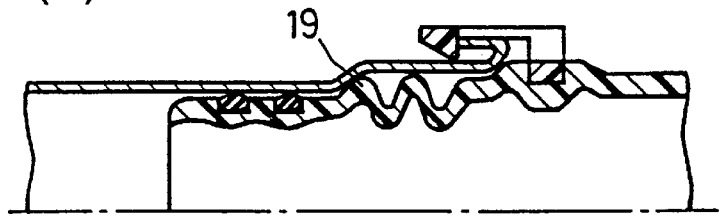
Figure 34D:
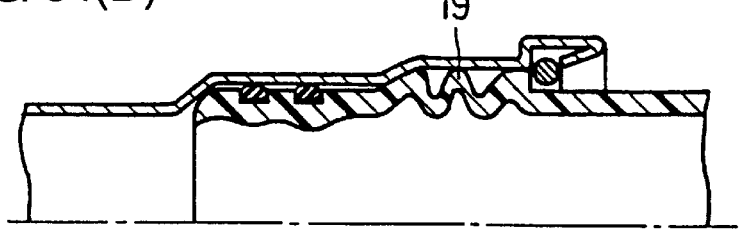

FIG. 34(C) also shows the modification in which the bellows portion 19 is utilized. The position in which the bellows portion 19 is formed is different from that shown in FIG. 34(B) but the bellows portion 19 has the same function as that shown in FIG. 34(B). FIG. 34(D) also shows the bellows portion 19 whose position is different from that shown in FIG. 34(B) but whose function is the same as that shown in FIG. 34(B).

Figure 35A:
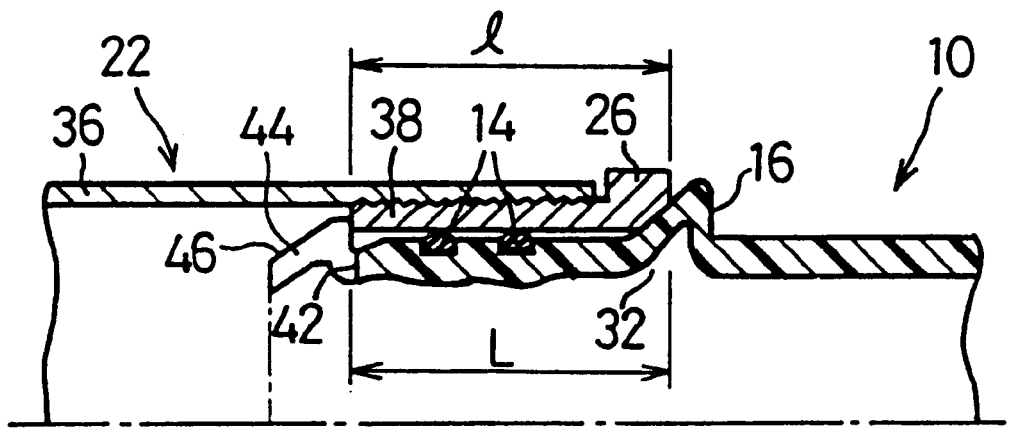
FIGS. 35(A) and (B) are drawings for showing a further modification of the hose connecting structure of the Ninth Embodiment.
Figure 35B:
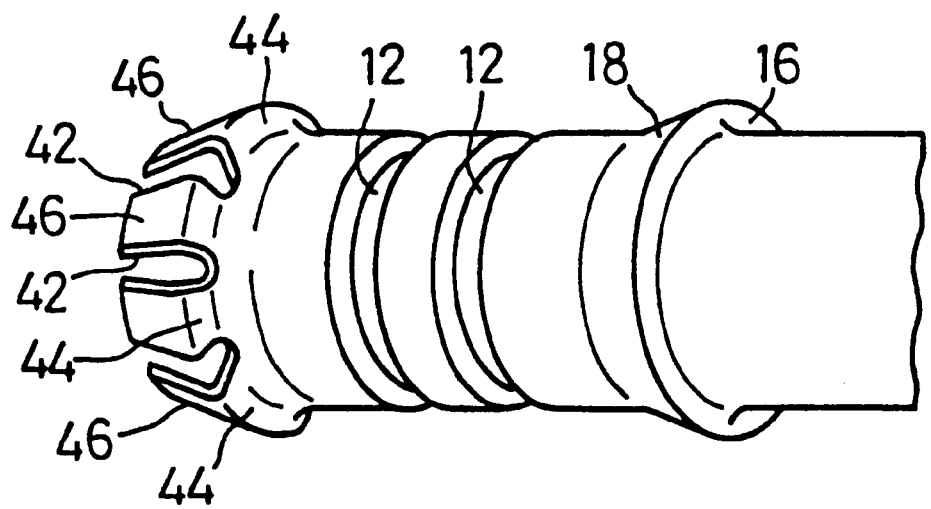
FIG. 35(B) is a perspective view of the edge portion of the hose.

FIGS. 35(A) and 35(B) show the modification in which the first engaging portion 46 is provided on the tip of the resin hose. In this resin hose, the portion between the first engaging portion 46 and the ring slope is elastically extended. The compressive force is acted on the engaging portion of the mating member.

Figure 36:
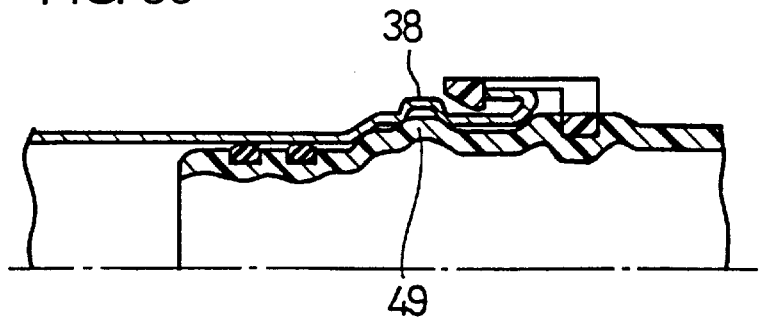
FIG. 36 is a cross sectional view for showing the hose connecting structure of a further modification of the Ninth Embodiment.

FIG. 36 shows the modification in which the same principle as that in the modification shown in FIG. 33 is utilized. In FIG. 36, the engaging surface of the resin hose is the outer peripheral surface, so the projection 49 is outwardly convexly shaped.

The Tenth Embodiment

Next, the modifications in which a plurality of mechanisms for preventing backlash are provided in the axial direction will be hereinafter explained.

Figure 37:
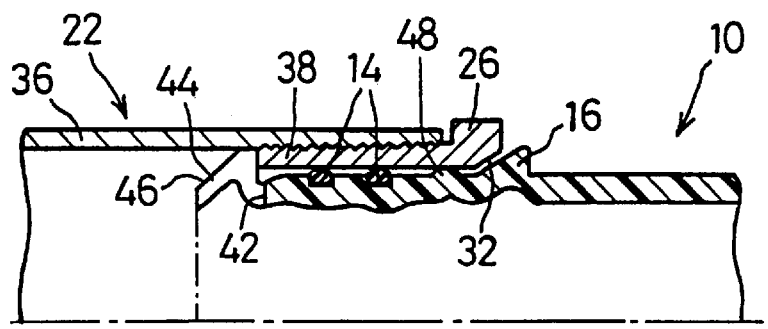
FIG. 37 is a main cross sectional view for showing the hose connecting structure of the Tenth Embodiment according to the present invention.

In FIG. 37, two mechanisms for preventing backlash in the direction which is perpendicular to the axis are provided at intervals in the axial direction. One of these mechanisms is composed of the first engaging portion 44. The first engaging portion 44 is elastically deformed in the shaft center direction and prevents the backlash at this portion in the direction which is perpendicular to the axis from being generated. The other one is a projection 48 provided in the ring shape. This projection 48 is deformed by compressing and prevents the backlash at this portion from being generated.

Figure 38:
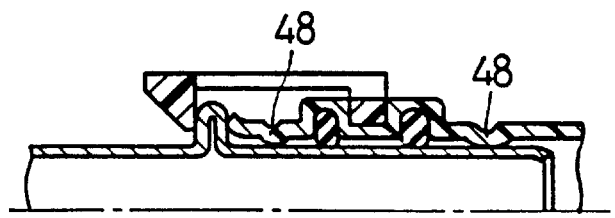
FIG. 38 is a main cross sectional view for showing the hose connecting structure of the modification of the Tenth Embodiment.

FIG. 38 shows another modification. In this modification, two pairs of projections 48 are provided at the interval in the axial direction.

Figure 39:
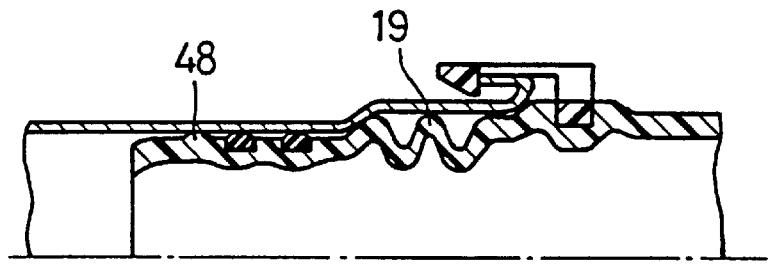
FIG. 39 is a main cross sectional view for showing the hose connecting structure of the other modification of the Tenth Embodiment.

FIG. 39 shows another modification in which the projection for preventing the backlash in the direction which is perpendicular to the axis and a bellows portion 19 for preventing the backlash in the axial direction are provided.

The Eleventh Embodiment

Next the method of producing the resin hose of this invention will be hereinafter described.

FIG. 40(A) is the cross-sectional view omitting a part of a resin hose 10 which is produced by the method of this embodiment.

This resin hose 10 is the hose used as a filler hose for an automobile. This resin hose 10 comprises a body portion 12 and a pair of connecting edge portions 14 and 14. The whole of this resin hose comprises resin. The body portion 12 is obtained by cutting at the predetermined part of a compact portion 13 which is formed by blow molding the resin shown in FIG. 40(B) and which is long and in the straight pipe shape. The whole part of the body portion 12 is in the shape of a bellows.

The connecting edge portions 14 and 14 are formed by injection molding the resin material in the state in which the body portion 12 is set in a metal mold. The length of these connecting edge portions 14 and 14 in the axial direction is preferably about 50 mm.

In this hose, the pipe shaped mating member is inserted into the inner surface of the connecting edge portions 14 and 14, and in this state, the connecting edge portions 14 and 14 and the mating member are connected by fastening by a clamp member which is attached at the outer peripheral surfaces of the connecting edge portions 14 and 14. When the mating member is inserted into the inner surfaces of the connecting edge portions 14 and 14 and is connected with the connecting edge portions, sufficient adhering of both of them is obtained. The roughness and the dimensional accuracy is fixed so as to obtain sufficient adhering.

In this embodiment, the connecting edge portions 14 and 14 are formed by injection molding, so the inner surfaces 16 and 16 of the connecting edge portions can be finished to have the predetermined accuracy at the same time of molding.

The finish processing of the inner surfaces of the connecting edge portions 14 and 14 can be conducted by polishing the inner surface thereof. Also mandrel dies in a heated state are inserted into the inner surfaces of the connecting edge portions 14 and 14, and the inner surfaces can be molded to the desired accuracy.

The connecting edge portions 14 and 14 preferably comprise soft resin materials. Depending on the cases the connecting edge portions 14 and 14 may comprise hard resin materials.

The bellows shaped portion namely the body portion 12 comprises a soft resin material. The wall thickness is not more than t=4.0 mm. It is preferably not more than t=2 mm.

The body portion 12 comprises a hard resin material. In this case, the wall thickness is preferably not more than t=2 mm and more preferably not more than t=1.0 mm.

The body portion can be a lamination layer structure comprising an internal layer and external layer. In this case, the internal layer can comprise a hard resin material and the external layer can comprise a soft resin material. The whole wall thickness is not more than t=4 mm and is preferably not more than t=2.0 mm. The percentage of the wall thickness of the internal layer is preferably 50% of the whole wall thickness.

In forming the body portion 12, a blow molding method using an ordinary metal mold may be adopted. Or the extruding continuous blow molding, which continuously conducts molding while continuously conducting the extruding of a parison, may also be adopted.

The body portion of the hose 10 of this embodiment is in a bellows shape. Accordingly when it is installed to the mating member, it can be installed as it is deformed in the predetermined shape by utilizing the flexibility of the body portion 12.

The Twelfth Embodiment

Next another method of producing the resin hose of this invention will be hereinafter described.

Figures 41A, 41B:
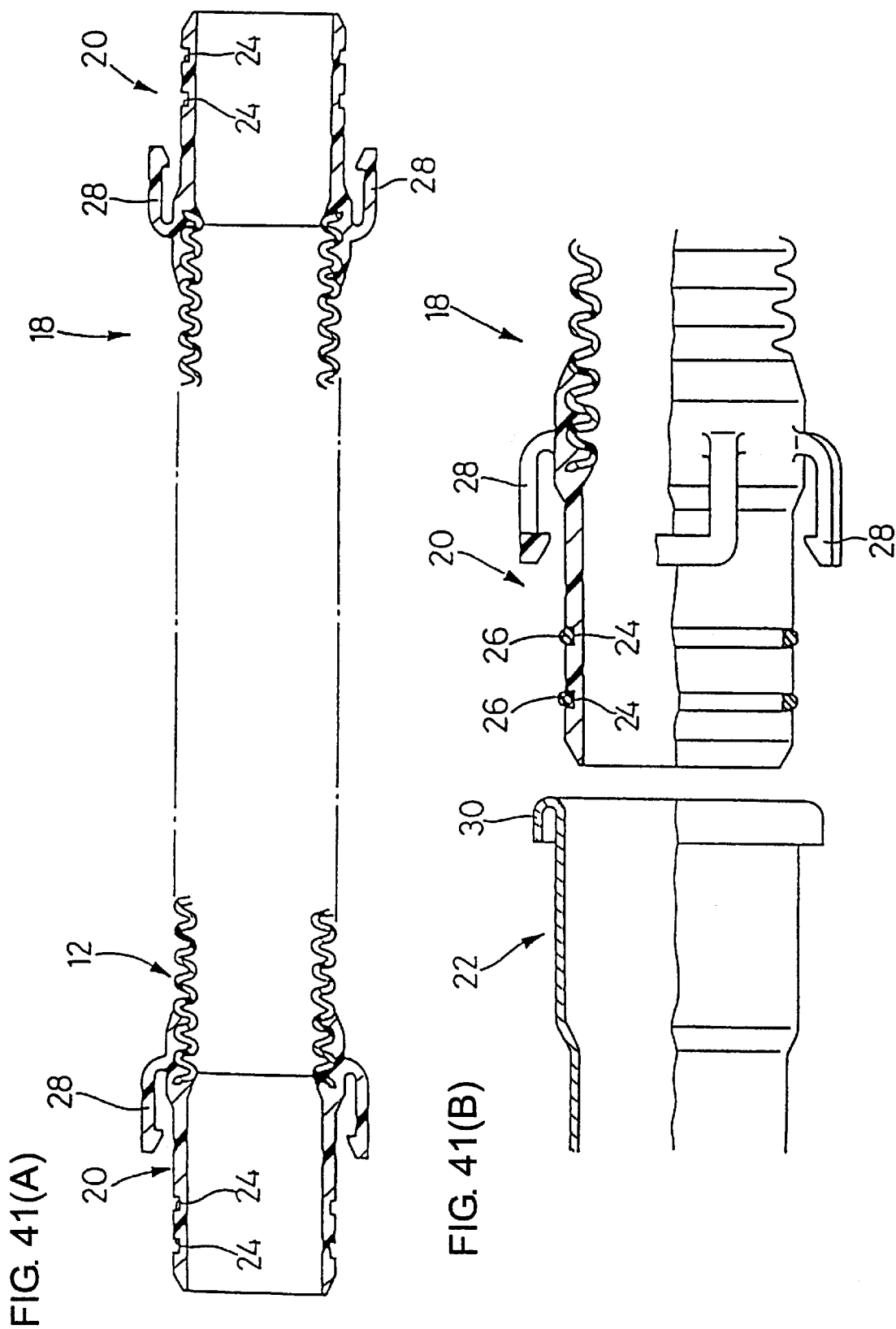
FIGS. 41(A) and (B) are drawings for showing the resin hose which is formed by the method of forming the hose of the Twelfth Embodiment.
FIG. 41(B) is a main cross sectional view when the resin hose is connected to the mating member.

FIG. 41(A) is the cross-sectional view omitting a part of a resin hose 18 which is produced by the method of this embodiment. The body portion 12 of this hose 18 is obtained by cutting at the predetermined part of the long and straight pipe shaped compact portion 13 which is formed by blow molding the resin shown in FIG. 40(B) as in the case of the Sixth Embodiment. The hose 18 is formed by injection molding the connecting edge portions 20 and 20 in the state in which the body portion 12 is set in a metal mold.

As shown in FIG. 41(B) showing the enlarged main part of the connecting portions, in this hose 18, the pipe shaped connecting edge portions 20 and 20 are inserted into the inner surface of the mating member, and in this state, connecting edge portions 20 and 20 are connected with the mating member. Accordingly, O-ring grooves 24 are formed on the outer peripheral surface of the connecting edge portions 20 and 20 and O-rings 26 are held there. The outer peripheral surface of the connecting edge portions 20 and 20 are inserted into the inner peripheral surface of the mating member 22 through O-rings 26.

In the hose 18 of this embodiment, since the sealing capacity at the connecting portion is secured without elastic adhering of the connecting edge portions 20 and 20 and the mating member 22, the connecting edge portions 20 and 20 can comprise and preferably comprise hard resin materials.

At the connecting edge portions 20 and 20, elastic engaging claws 28 are provided near to the O-rings 26. These elastic engaging claws are fixed to a hook 30 provided at the mating member 22. Accordingly the hose is prevented from being disengaged from the mating member 22.

These elastic engaging claws are formed integrally with the edge connecting portions 20 and 20 and at the same time as the edge connecting portions are formed by injection molding.

Also in this embodiment, a long compact portion 13 is cut at the predetermined parts thereof and the connecting edge portions 20 and 20 are formed at these parts. Accordingly the predetermined length of the hose 18 can be obtained and it can be deformed in the predetermined shape by utilizing the flexibility of the body portion 12 when the hose is assembled.

The Thirteenth Embodiment

Another method of producing the resin hose of this invention will be hereinafter described.

FIG. 42(A) is the cross-sectional view omitting a part of a resin hose 32 which is produced by the method of this embodiment.

In this embodiment, a long compact portion 31 shown in FIG. 42(B) is used as the body portion 34. Most of the compact portion 31 is formed in the bellows shape and short straight-shaped portions 36 and 36 are formed between the bellows portions 33 and 33. The body portion 34 is obtained by cutting the straight-shaped portions 36 and 36 of this body portion. The body portion 34 is fixed to the metal mold and the connecting edge portion 14 is formed by injection molding, so the hose 32 comprising the body portion 34 and the connecting edge portions 14 and 14 are produced.

Figure 43:
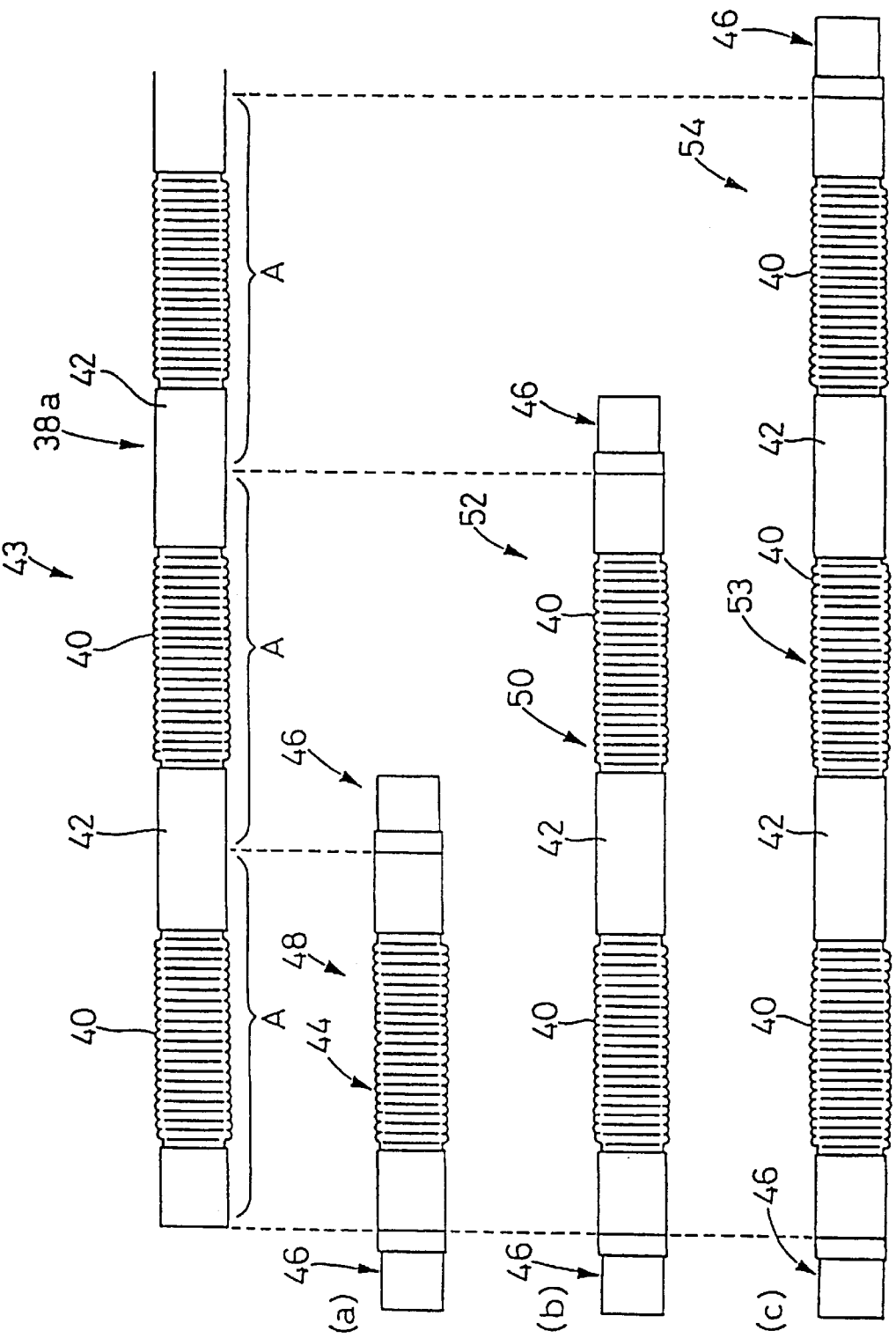
FIG. 43 is a cross sectional view for showing the hose which is used for the method of forming the hose of the Thirteenth Embodiment.

FIG. 43 shows a long compact portion 43 which is formed to have bellows portions 40 and relatively long straight-shaped portions 42 lined by turns. FIG. 43 also shows three kinds of hoses 48, 52 and 54 which are respectively produced by using three kinds of body portions 44, 50 and 53 obtained by cutting different lengths of this long compact portion 43.

The hose 48 is produced by the following processes: the long compact portion 43 is cut at the straight-shaped portion 42 so the body portion of the hose 44 is composed of only one repeated unit A; and the connecting edge portions 46 and 46 are formed by injection molding at both ends of the body portion. The hose 52 is produced by the following processes: the long compact 43 portion is cut at the straight-shaped portion 42 to have two repeated units A and A, so the body portion of the hose 50 is composed of two repeated units A; and the connecting edge portions 46 and 46 are formed by injection molding at both ends of the body portion. The hose 54 is produced by the following processes: the long compact portion 43 is cut at the straight-shaped portion 42 to have three repeated units A, so the body portion of the hose 53 is composed of three repeated units A; and the connecting edge portion 46 and 46 are formed by injection molding at both ends of the body portion.

The Fourteenth Embodiment

Another method of producing the resin hose of this invention will be hereinafter described.

Figure 44A:
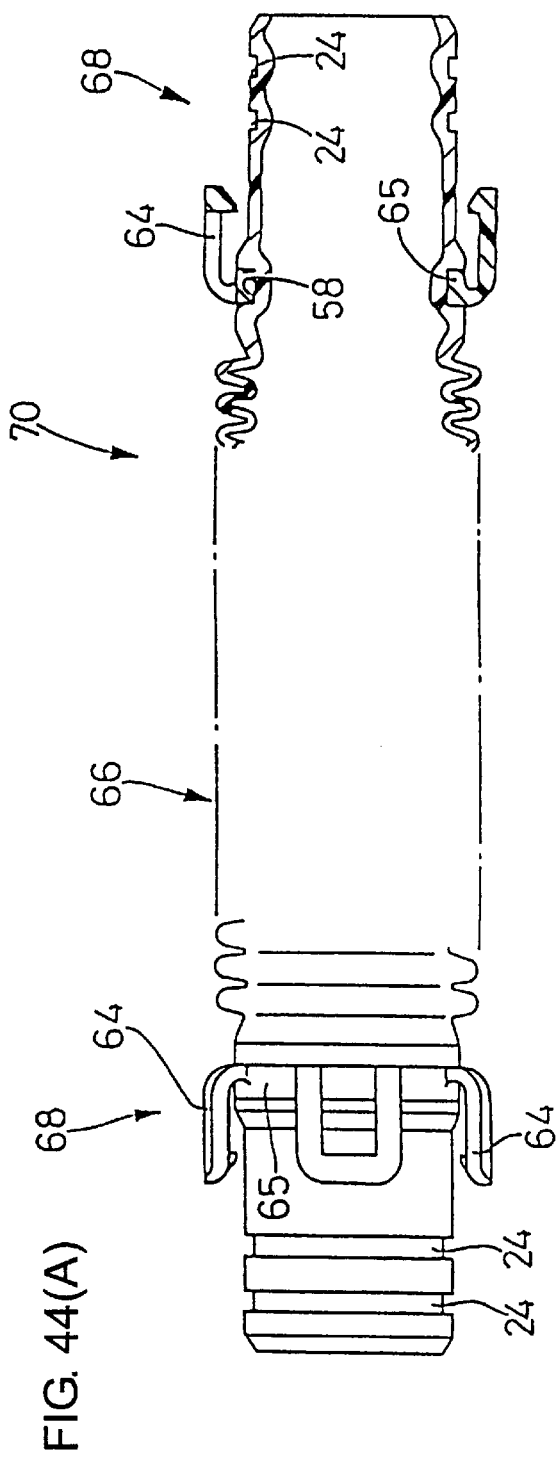
FIGS. 44(A) and (B) are drawings for showing the resin hose which is formed by the method of forming the hose of the Fourteenth Embodiment.

FIG. 44(A) is the cross-sectional view omitting a part of a resin hose 70 which is produced by the method of this embodiment.

Figure 44B:
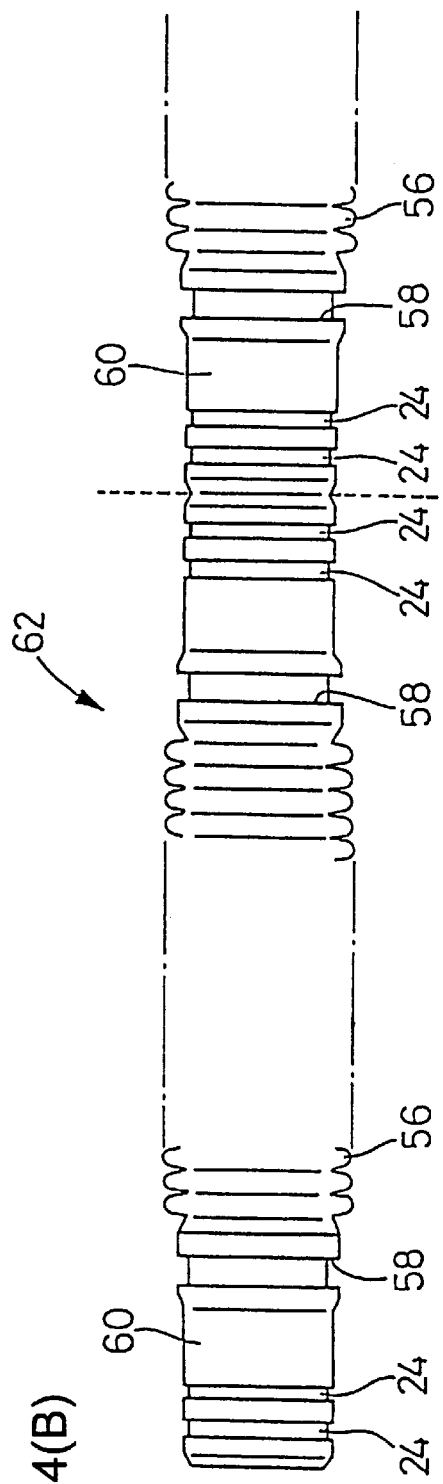
FIG. 44(B) is a plan view for showing the body portion of the hose which is used for the method of forming the hose.

In this embodiment, a long compact portion 62 which is shown in FIG. 44(B) is used as the connecting edge portions 68 and 68 excluding the body portion 66 and elastic engaging claws 64. This compact portion 62 is formed to have the bellows portions 56 and straight-shaped portions 60 including O-ring grooves 24 and the ring grooves 58 lined by turns. This hose 70 is produced by the following processes: the long compact portion 62 is cut at the straight-shaped portion 60 and fixed in a metal mold; elastic claws 64 and ring connecting portion which connect these claws are formed by injection molding so that the resin material gets into the inside of ring grooves 58.

In this embodiment, the main part of the connecting edge portion 68 is formed in advance when the long compact portion 62 is formed. Only the rest of the elastic engaging claws 64 and a connecting portion 65 are formed by injection molding and comprise the connecting edge portion 68.

The Fifteenth Embodiment

Another method of producing the resin hose of this invention will be hereinafter described.

FIG. 45(A) is the cross-sectional view omitting a part of a resin hose 79 which is produced by the method of this embodiment.

In this embodiment, a long compact portion 76 is extrusion blow molded so that bellows portion 72 and straight-shaped portions 74 are lined by turns. Next shown in FIG. 45(B), this compact portion 76 is cut at the straight-shaped portion and as shown in FIG. 45(C) a mandrel die is inserted into the heated straight-shaped portions. The inner surface of the straight shaped portions 74 are conducted by polishing so as to have the shape and roughness corresponding to the outer molded surface of the mandrel die 78. Accordingly the hose 79 is produced.

The Sixteenth Embodiment

This embodiment produces a hose 90 having a branch portion 86.

Figure 46A:
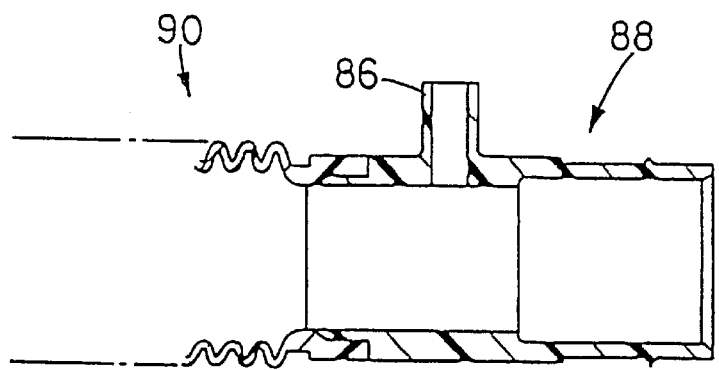
FIGS. 46(A) and (B) are drawings for showing the resin hose which is formed by the method of forming the hose of the Sixteenth Embodiment.
Figure 46B:
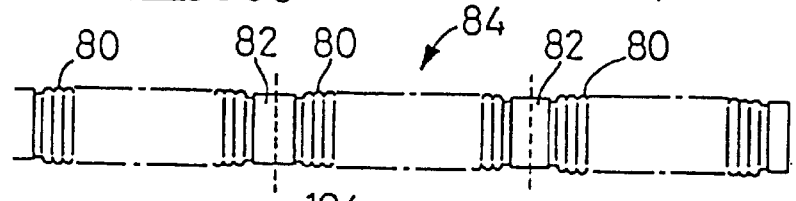
FIG. 46(B) is an explanatory drawing for showing the method of forming the body portion of the resin hose.

In this method, the hose 90 is produced by the following processes: A long compact portion 84, in which bellows portions 80 and straight-shaped portions 82 are formed to be lined by turns as shown in FIG. 46(B), is produced at first. Then, this long compact portion 84 is cut at the straight-shaped portion. At each of the obtained cut portions, cylindrical portions having branch portions 86 are injection molded to form the connecting edge portions 88 as shown in FIG. 46(A).

Figure 47A:
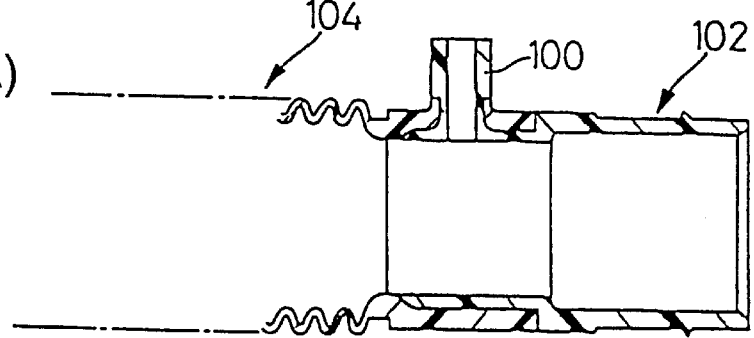
FIGS. 47(A) and (B) are drawings for showing the modification of the resin hose which is formed by the method of forming the hose of the Sixteenth Embodiment.
Figure 47B:
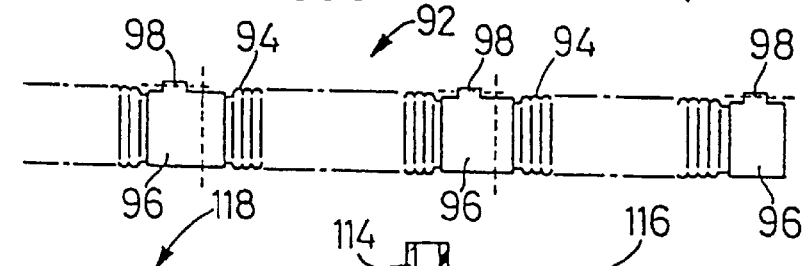
FIG. 47(B) is an explanatory drawing for showing the method of forming the body portion of the resin hose.
Figure 48A:
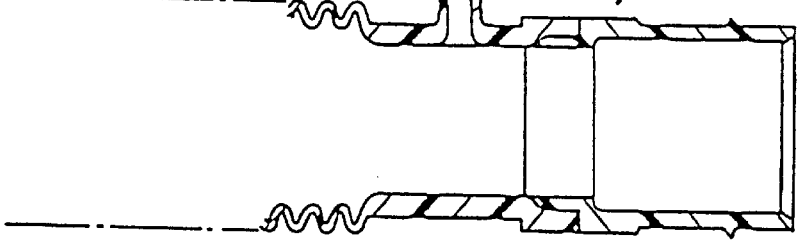
FIGS. 48(A) and (B) are drawings for showing the other modification of the resin hose which is formed by the method of forming the hose of the Sixteenth Embodiment.
Figure 48B:
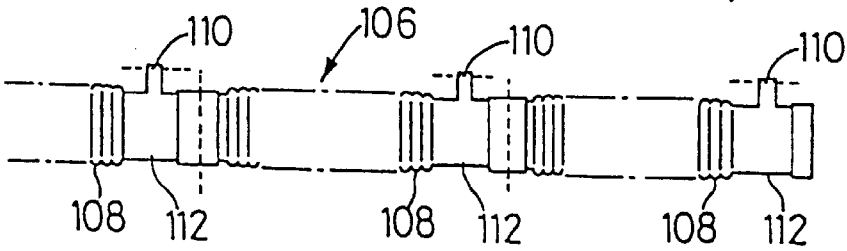
FIG. 48(B) is an explanatory drawing for showing the method of forming the body portion of the resin hose.

FIGS. 47 and 48 show modifications of the Sixteenth Embodiment.

In the modification shown in FIG. 47, a hose 104 is produced by the following processes: At first, a long compact portion 92 which comprises bellows portions 94 and straight-shaped portions 96, which are provided with projections 98 projecting radially outside, lined by turns is formed. The long compact portion 92 and the projection 98 is cut at the position of the straight-shaped portion 96. Then, an opening is provided by cutting the projection 98. As shown in FIG. 47(A), a cylindrical portion, having a branch portion 100 and also including this opening, is formed by injection molding and this comprises a connection edge portion 102.

Furthermore, in the modification shown in FIG. 48, a hose 118 is produced by the following processes: At first, a long compact portion 106 which comprises bellows portions 108 and straight-shaped portions 112, which are provided with projections 98 projecting radially outside, lined by turns is formed. Then these straight portions 112 are cut and the parts of projections 110 are also cut. These cut products are fixed to the metal mold. The cylindrical portion is formed by injection molding and this comprises a connecting edge portion 116 having a branch portion 114.

Once of the preferred Embodiments of this injection has been detailed so far, but this invention is not limited thereto and may be realized in other forms. The bellows portion and the straight-shaped portion may comprise different kinds of resin material. For instance, the bellows portion may comprise a soft resin material and the straight-shaped portion may comprise a hard resin material. Also the cross-sectional structure of each of these portions may be various types of lamination layer structures.

Furthermore, in the above embodiments and their modifications, all long compact portions are cut and comprise the produced hose used as their lengths. In some cases, the long compact portion may be cut in each of its repeated units, these units are connected in the axial direction and may comprise the hose.

Having now fully described the invention, it will be apparent to one of ordinary skill in the art that many changes and modifications can be made thereto without departing from the spirit or scope of the invention as set forth herein.

The Seventeenth Embodiment

Figure 49A:
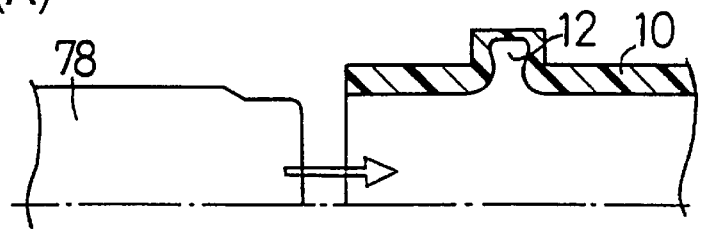
FIGS. 49(A) to (F) show the remolding method of the inner periphery surface of the edge portion of the hose of the Seventeenth Embodiment.
Figure 49B:
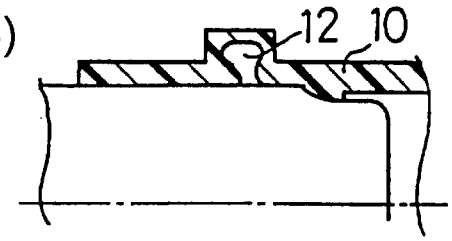

The Seventeenth Embodiment discloses the method for remolding the inner periphery surface of the resin hose in which the inner periphery surface of the edge portion of the hose is used as the engaging surface. FIG. 49(A) shows the condition before the heating mandrel 78 for the remolding is inserted into the edge opening of the resin hose 10. As shown in FIG. 49(B), the heating mandrel 78 is inserted to dissolve the inner periphery surface of the edge portion of the resin hose 10. After that, the inner periphery surface is cooled and has excellent dimensional accuracy.

Figure 49C:
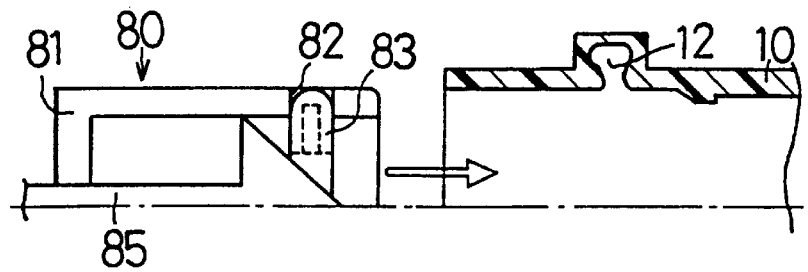
Figure 49D:
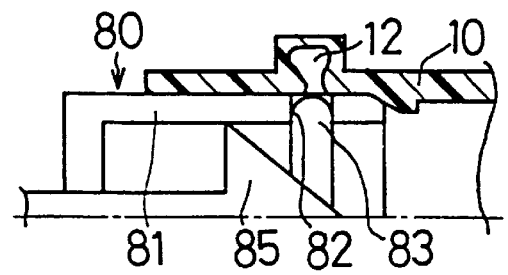
Figure 49E:
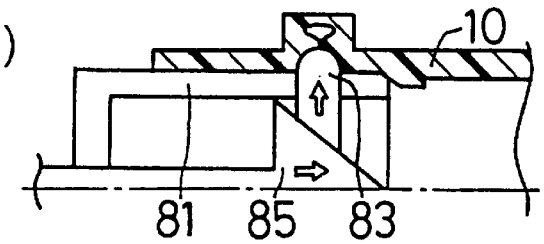
Figure 49F:
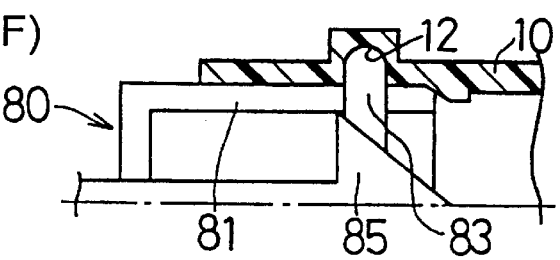

FIGS. 49(C) to (F) show the process for remolding the sealing groove 12 after the inner periphery surface is remolded. FIG. 49(C) shows the resin hose 10 and a molding apparatus 80 before the sealing groove is molded. The molding apparatus comprises an outer tube 81 having the same outer diameter as that of the inner periphery surface 11 of the remolded resin hose, a hole 82 which penetrates in the vertical direction against the axial direction of the outer tube, a pair of head portions 83 and 83 for molding which is inserted and held, and a driving shaft portion 85 in which the tip portion for projecting the head portion 83 in the centrifugal direction is projected in the shape of an arrow and in which the trailed slope surface is used as a cam surface. A heater 84 for heating is disposed inside the tip portion of the head portion 83, and the pair of head portions 83 and 83 are compressed by a tensile spring (not shown ) to be close to each other. As shown in FIG. 49(D), the molding apparatus 80 is inserted in the axial hole of the resin hose 10 to match the position of the sealing groove 12 and the hole 82. The head portion 83 is heated by the heater 84 to rotate the molding apparatus 80 coaxially to the resin hose 10. The driving shaft portion 85 is actuated in the axial direction, and the pair of head portions 83 and 83 are projected from the hole 82 to form the sealing groove 12. This condition is shown in FIG. 49(E). After that, the head portion 83 is projected to the predetermined position to reform the sealing groove 12. This condition is shown in FIG. 49(F). The head portion 83 is again inserted into the hole 82, and the molding apparatus 80 is drawn out from the resin hose 10, thereby finishing the molding.

What is claimed is:

1. A hose connecting structure for providing a connection for a tubular hose used in an automobile with a tubular mating member, comprising said tubular hose having a tubular wall including an intermediate portion and two end portions formed integrally by molding a plastic resin material, the tubular wall including a lamination layer structure comprised of a plurality of layers and having a mold-formed outer surface and an inner surface substantially parallel to the mold-formed outer surface, the inner surface defining an essentially tubular interior extending axially through the tubular hose and being coaxial with an axis thereof, one of said two end portions having an annular engaging outer groove and an annular seal ring mounting groove formed on the mold-formed outer surface of the tubular wall formed by a substantially constant thickness, the tubular interior of the one end portion having a variant interior of which an inner diameter varying positionally depending on axial location of the one end portion corresponding to an outer diameter of a variant exterior of the mold-formed outer surface to thereby have a substantially constant thickness at a region of the variant exterior;

said tubular mating member including an opening end portion having an inner peripheral surface provided with an annular engaging inner groove and receiving the one end portion of said tubular hose telescopically into the opening end portion;

a sealing ring mounted on the annular seal ring mounting groove on the one end portion of said tubular hose and contacting with the inner peripheral surface of the opening end portion of said tubular mating member; and a locking ring held in the cooperating annular grooves between the one end portion of said tubular hose and the opening end portion of said tubular mating member, and being deformable in a radial direction to thereby connect the end portion of said tubular hose and the opening end portion of said tubular mating member with each other.

2. A hose connecting structure according to claim 1, wherein said locking ring is mounted in one of said cooperating annular grooves, said locking ring being radially compressed during insertion of the one end portion of said tubular hose into the opening end portion of said tubular mating member and then said locking ring returning to an initial state when the one end portion is inserted into the opening end portion to an axial position where the one of said cooperating annular grooves and the other of said cooperating annular grooves coincide with each other, and having said locking ring engage with the other of said cooperating annular grooves of said tubular mating member.

3. A hose connecting structure according to claim 1, wherein on the one end portion of said tubular hose, one of said cooperating annular grooves is more axially spaced than the annular seal ring mounting groove from an end surface of the one end portion.

4. A hose connecting structure according to claim 2, wherein on the one end portion of said tubular hose, a ring-shaped projection is formed on the mold-formed outer surface adjacent to the intermediate portion, and one of the cooperating annular grooves being formed on the ring shaped projection.

5. A hose connecting structure according to claim 4, wherein a guide surface is formed on an outer surface of the ring-shaped projection, and an enlarged diameter portion being formed at the opening end portion of said tubular mating member.

6. A hose connecting structure according to claim 5, wherein said tubular mating member is made of a resin tube, and the other of the cooperating annular grooves of said tubular mating member being formed at a tip portion of the opening end portion.

7. A hose connecting structure according to claim 2, wherein the one of the cooperating annular grooves of said tubular hose has a depth to allow radial compression of said locking ring when the one end portion of the tubular hose is inserted into the opening end portion of said tubular mating member.

8. A hose connecting structure according to claim 1, wherein said locking ring is mounted in one of said cooperating annular grooves, said locking ring being radially expanded during inserting of the one end of said tubular hose into the opening end portion of said tubular mating member and then said locking ring returning to an initial state when the one end portion is inserted into the opening end portion to an axial position where the one of the cooperating annular grooves and the other of the cooperating annular grooves coincide with each other, and having said locking ring engage with the one of said cooperating annular grooves of said tubular hose.

9. A hose connecting structure according to claim 1, wherein on the one end portion of said tubular hose, one of the cooperating annular grooves is less spaced than the annular seal ring mounting groove from an end surface of the end portion.

10. A hose connecting structure according to claim 9, wherein an another tubular seal member is screwed to an inside of the opening end portion of said tubular mating member, the other of the cooperating annular grooves of said tubular mating member being formed by an end surface of the another tubular member.

11. A hose connecting structure according to claim 1, wherein the inner diameter of the variant interior of the one end portion is reduced at a region where the seal ring mounting groove is formed on the mold-formed outer surface.

12. A hose connecting structure according to claim 4, wherein the inner diameter of the variant interior of the one end portion is enlarged at a region where the ring-shaped projection is formed on the mold-formed outer surface.

13. A hose connecting structure according to claim 12, wherein a bottom surface of one of the cooperating annular grooves on the one end portion has an outer diameter substantially the same as an outer diameter of the mold-formed outer surface of the one end portion where the seal ring mounting groove is not formed.

* * * * *